(12) United States Patent
Eba et al.

(10) Patent No.: US 12,122,032 B2
(45) Date of Patent: Oct. 22, 2024

(54) ELECTRIC WORK MACHINE AND ELECTRIC DRIVER DRILL

(71) Applicant: MAKITA CORPORATION, Anjo (JP)

(72) Inventors: Yukiko Eba, Anjo (JP); Takao Kuroyanagi, Anjo (JP)

(73) Assignee: MAKITA CORPORATION, Anjo (JP)

( * ) Notice: Subject to any disclaimer, the term of this patent is extended or adjusted under 35 U.S.C. 154(b) by 202 days.

(21) Appl. No.: 18/073,107

(22) Filed: Dec. 1, 2022

(65) Prior Publication Data

US 2023/0191580 A1    Jun. 22, 2023

(30) Foreign Application Priority Data

Dec. 16, 2021  (JP) .................................. 2021-204441
Nov. 16, 2022  (JP) .................................. 2022-183333

(51) Int. Cl.
*B25F 5/00* (2006.01)
*B25B 21/00* (2006.01)
*F16H 3/66* (2006.01)

(52) U.S. Cl.
CPC ............ *B25F 5/001* (2013.01); *B25B 21/008* (2013.01); *F16H 3/666* (2013.01)

(58) Field of Classification Search
CPC ......... B25B 21/008; B25F 5/001; F16H 3/666
See application file for complete search history.

(56) References Cited

U.S. PATENT DOCUMENTS

2021/0170564 A1* 6/2021 Gehret ................... B25F 5/001
2021/0330306 A1   10/2021 Walton et al.

FOREIGN PATENT DOCUMENTS

JP         2021-171857 A     11/2021

* cited by examiner

*Primary Examiner* — Daniel Jeremy Leeds
(74) *Attorney, Agent, or Firm* — Oliff PLC

(57) ABSTRACT

An electric work machine includes: a motor; a first planetary gear mechanism; a second planetary gear mechanism; a spindle; a first speed switch mechanism including a first internal gear of a first stage unit and a second internal gear of a second stage unit; and a second speed switch mechanism. The first speed switch mechanism performs switching between a first speed reducing mode in which rotation of the second internal gear is prevented and rotation of the first internal gear is allowed and a second speed reducing mode in which rotation of the first internal gear is prevented and rotation of the second internal gear is allowed. The second speed switch mechanism performs switching between an enabled mode in which rotation of an internal gear of the second planetary gear mechanism is prevented and a disabled mode in which the rotation of the internal gear is allowed.

14 Claims, 46 Drawing Sheets

FIG.11
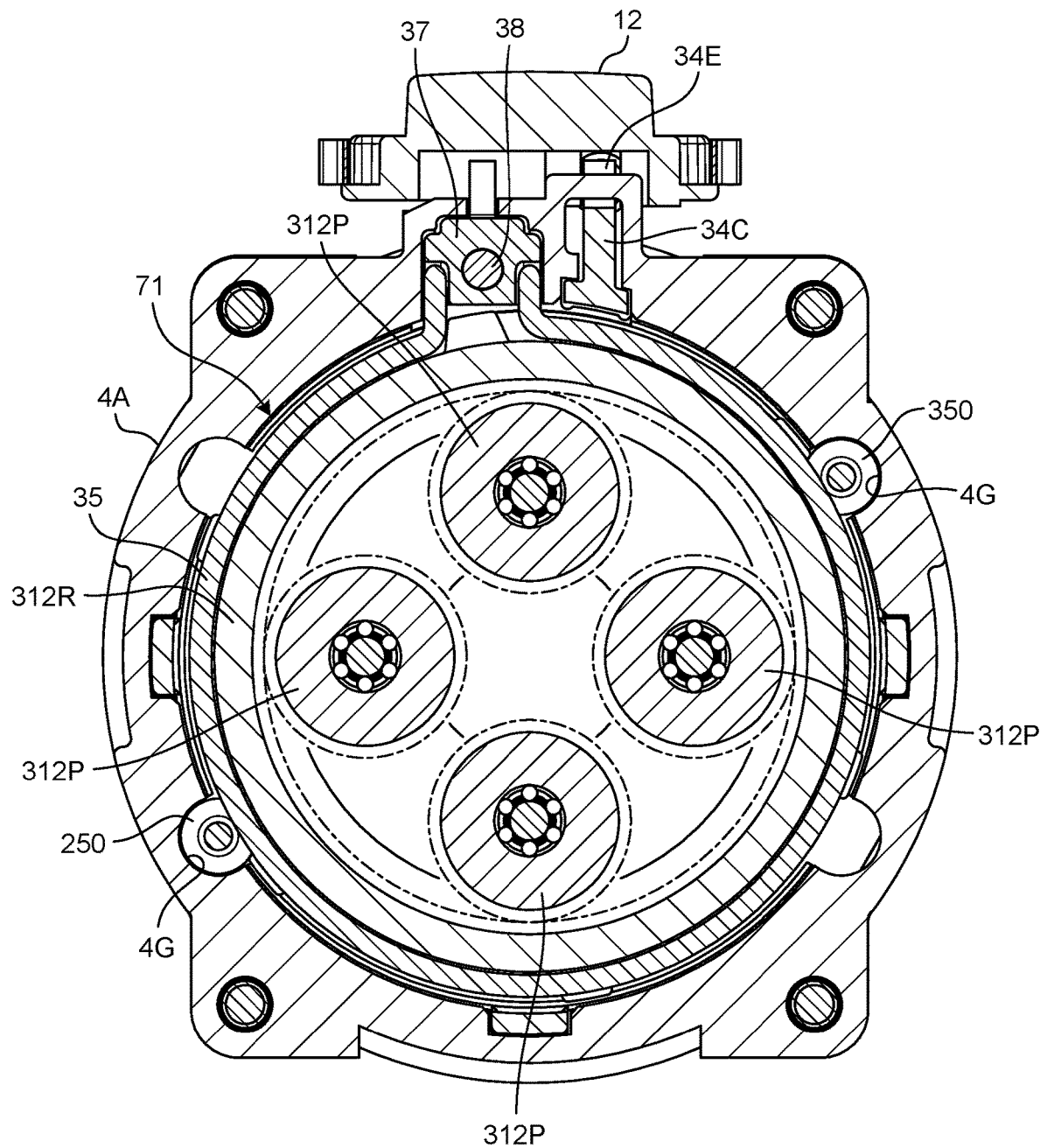
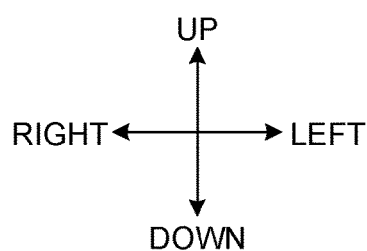

FIG.27
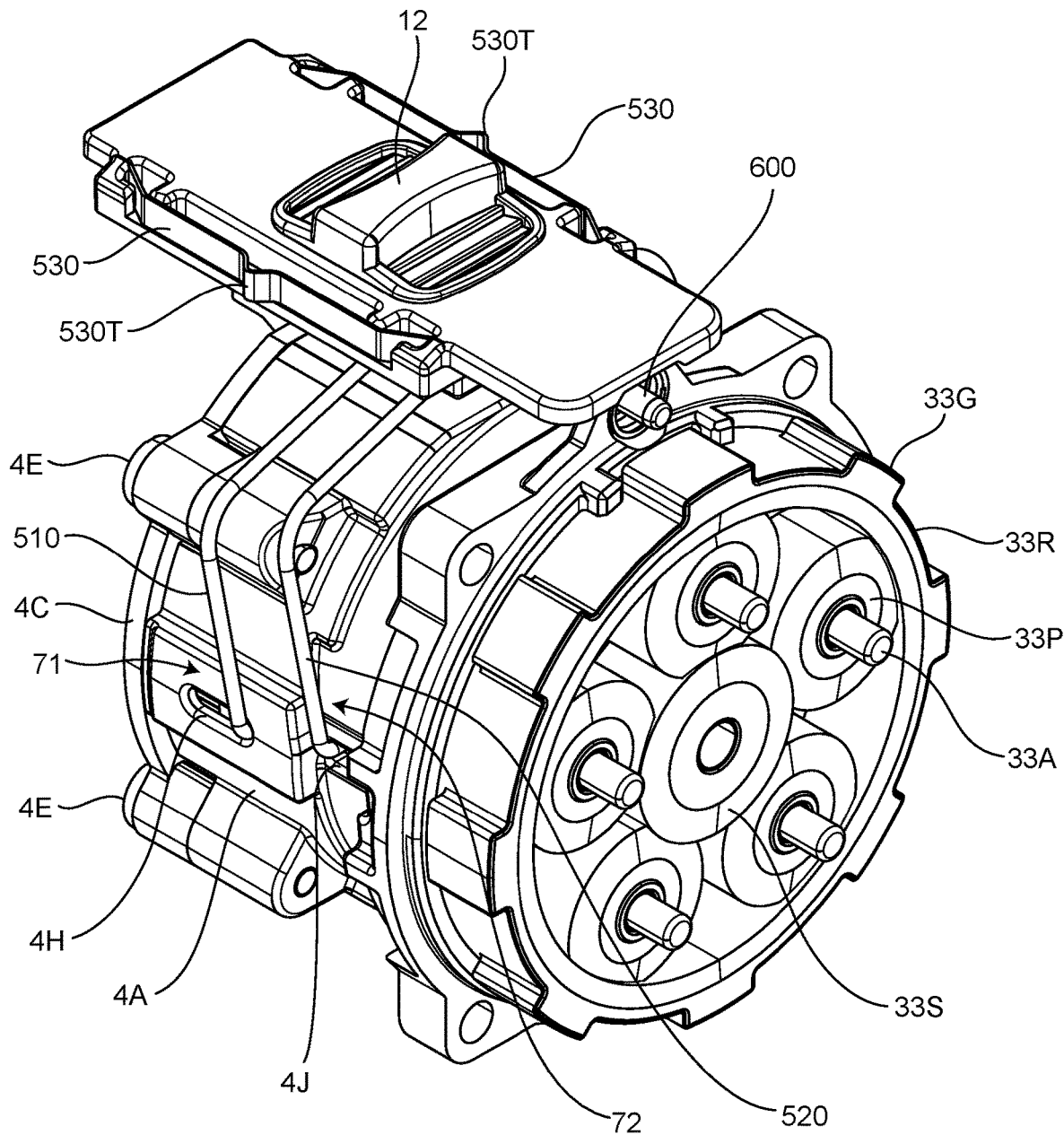
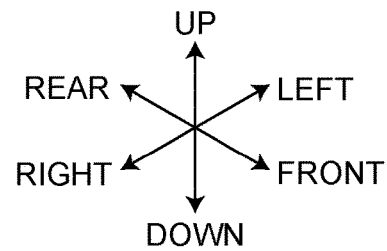

FIG.28
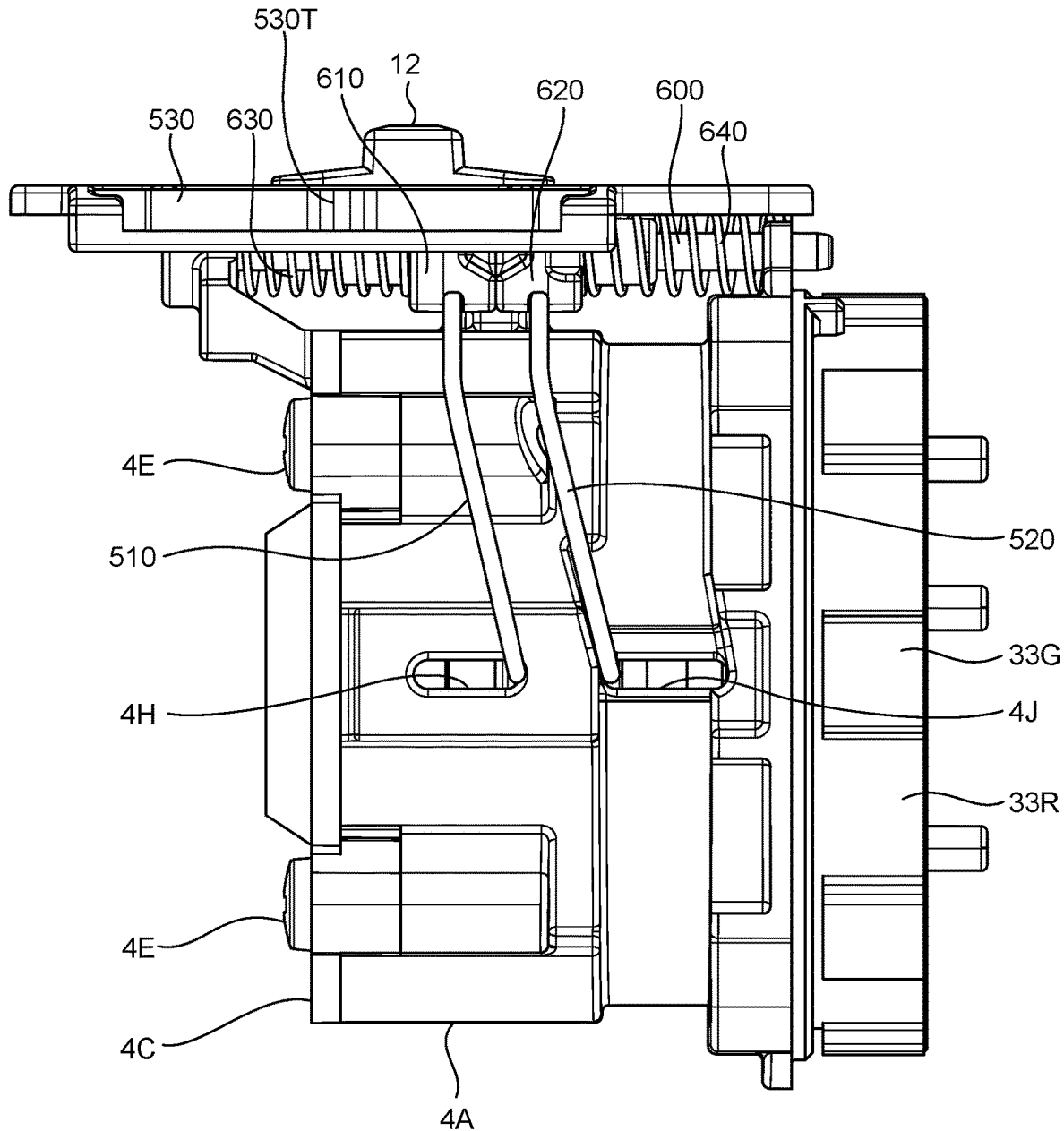
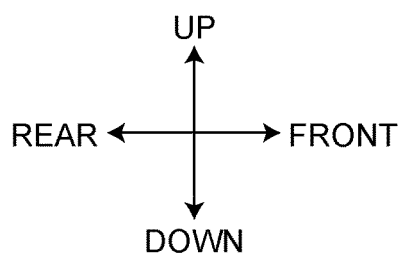

FIG.31
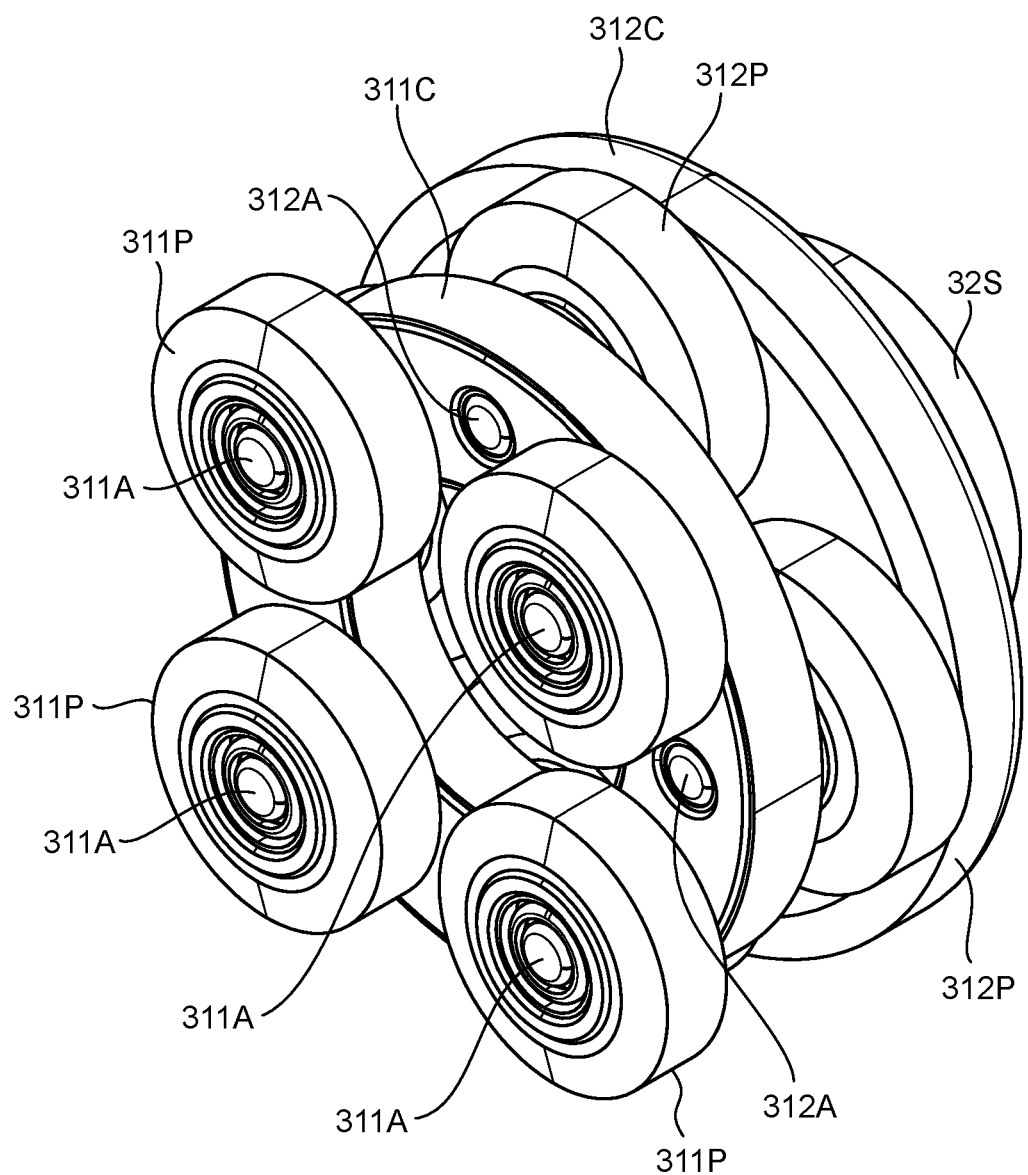
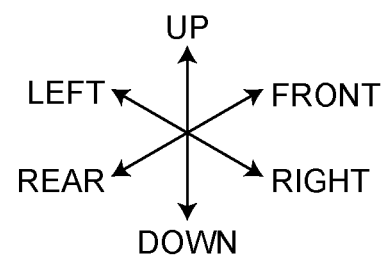

FIG.32
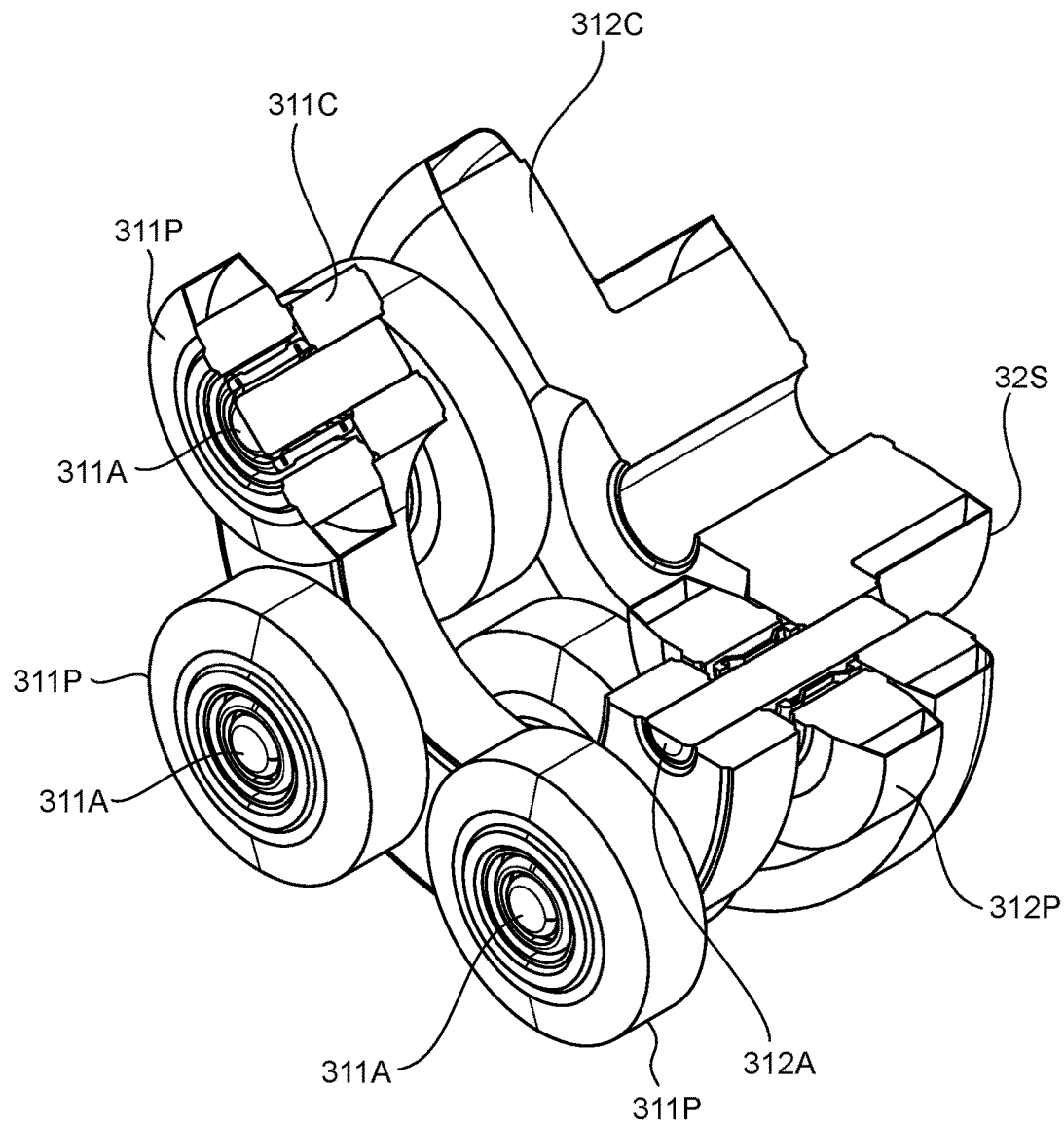
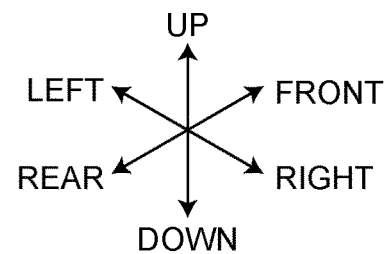

FIG.33
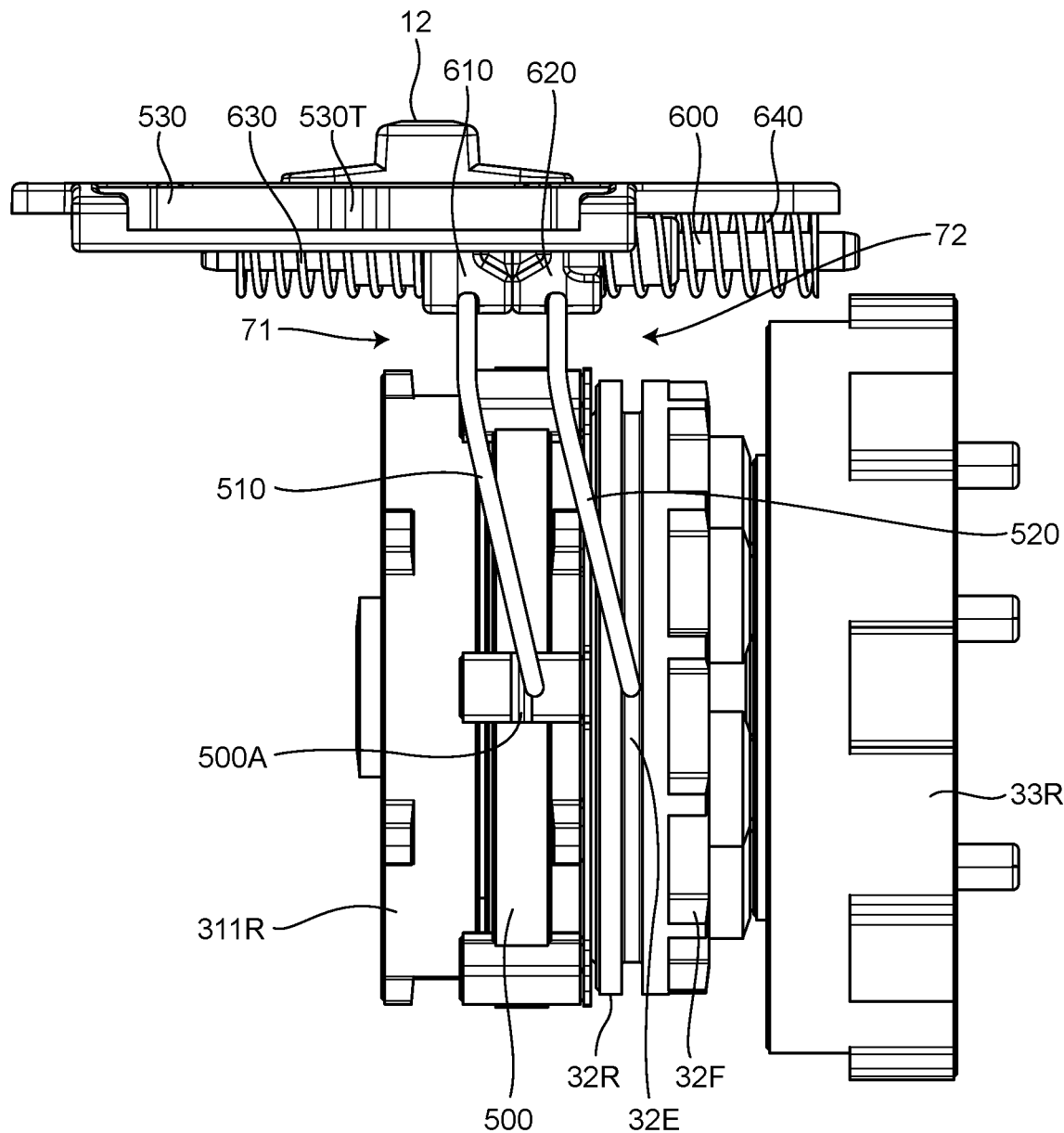
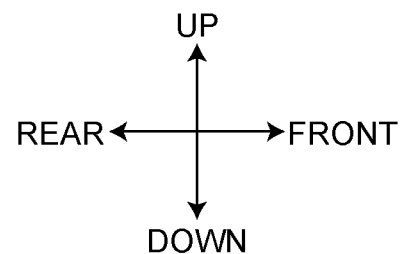

FIG.38 [FIRST SPEED]

ELECTRIC WORK MACHINE AND ELECTRIC DRIVER DRILL

CROSS-REFERENCE

The present application claims priority to Japanese Patent Applications No. 2021-204441 filed on Dec. 16, 2021, and No. 2022-183333 filed on Nov. 16, 2022, the contents of both of which are incorporated herein by reference.

TECHNICAL FIELD

A technique disclosed in the present disclosure relates to an electric work machine and an electric driver drill.

BACKGROUND ART

In the technical field related to electric work machines, a driver drill capable of switching a speed mode of a planetary gear between a high speed mode and a low speed mode as disclosed in Japanese Laid-open Patent Application No. 2021-171857 is known.

In Japanese Laid-open Patent Application No. 2021-171857, when the planetary gear is set to the high speed mode, although the driver drill can perform an operation at high speed, it may be difficult for the driver drill to perform an operation that requires high torque. When the planetary gear is set to the low speed mode, although the driver drill can perform an operation that requires high torque, it may be difficult for the driver drill to perform an operation at high speed.

It is an object of the technique disclosed in the present specification to provide an electric work machine capable of setting an appropriate speed mode in accordance with details of an operation.

SUMMARY

It is one non-limiting object of the present disclosure to disclose techniques for providing an electric work machine capable of setting an appropriate speed mode in accordance with details of an operation.

The present disclosure discloses an electric work machine. The electric work machine may include a motor, a first planetary gear mechanism, and a second planetary gear mechanism. The first planetary gear mechanism may include a first stage unit including a plurality of first planetary gears disposed around a sun gear rotated by the motor and a first internal gear disposed around the first planetary gears; and a second stage unit including a plurality of second planetary gears disposed around the sun gear and a second internal gear disposed around the second planetary gears. A reduction ratio of the first stage unit and the reduction ratio of the second stage unit may be different from each other. The second planetary gear mechanism may be disposed forward of the first planetary gear mechanism and operated by a rotational force of the first planetary gear mechanism. The electric work machine may include a spindle rotated by a rotational force of the motor transmitted through the second planetary gear mechanism. The electric work machine may include a first speed switch mechanism configured to perform switching between a first speed reducing mode in which rotation of the second internal gear is prevented and rotation of the first internal gear is allowed and a second speed reducing mode in which the rotation of the first internal gear is prevented and the rotation of the second internal gear is allowed. The electric work machine may include a second speed switch mechanism configured to perform switching between an enabled mode in which rotation of an internal gear of the second planetary gear mechanism is prevented and a disabled mode in which the rotation of the internal gear is allowed.

The technique disclosed in the present disclosure provides an electric work machine capable of setting an appropriate speed mode in accordance with details of an operation.

BRIEF DESCRIPTION OF THE DRAWINGS

FIG. 11 is a sectional view of a speed reducing mechanism according to the first embodiment;

FIG. 27 is a front perspective view of a part of a driver drill according to a third embodiment;

FIG. 28 is a side view of a part of the driver drill according to the third embodiment;

FIG. 31 is a rear perspective view of a part of the speed reducing mechanism according to the third embodiment;

FIG. 32 is a cutaway rear perspective view of a part of the speed reducing mechanism according to the third embodiment;

FIG. 33 is a side view of a first speed switch mechanism and a second speed switch mechanism according to the third embodiment;

The accompanying drawings are intended to depict exemplary embodiments of the present invention and should not be interpreted to limit the scope thereof. Identical or similar reference numerals designate identical or similar components throughout the various drawings.

DETAILED DESCRIPTION

Figure 1:
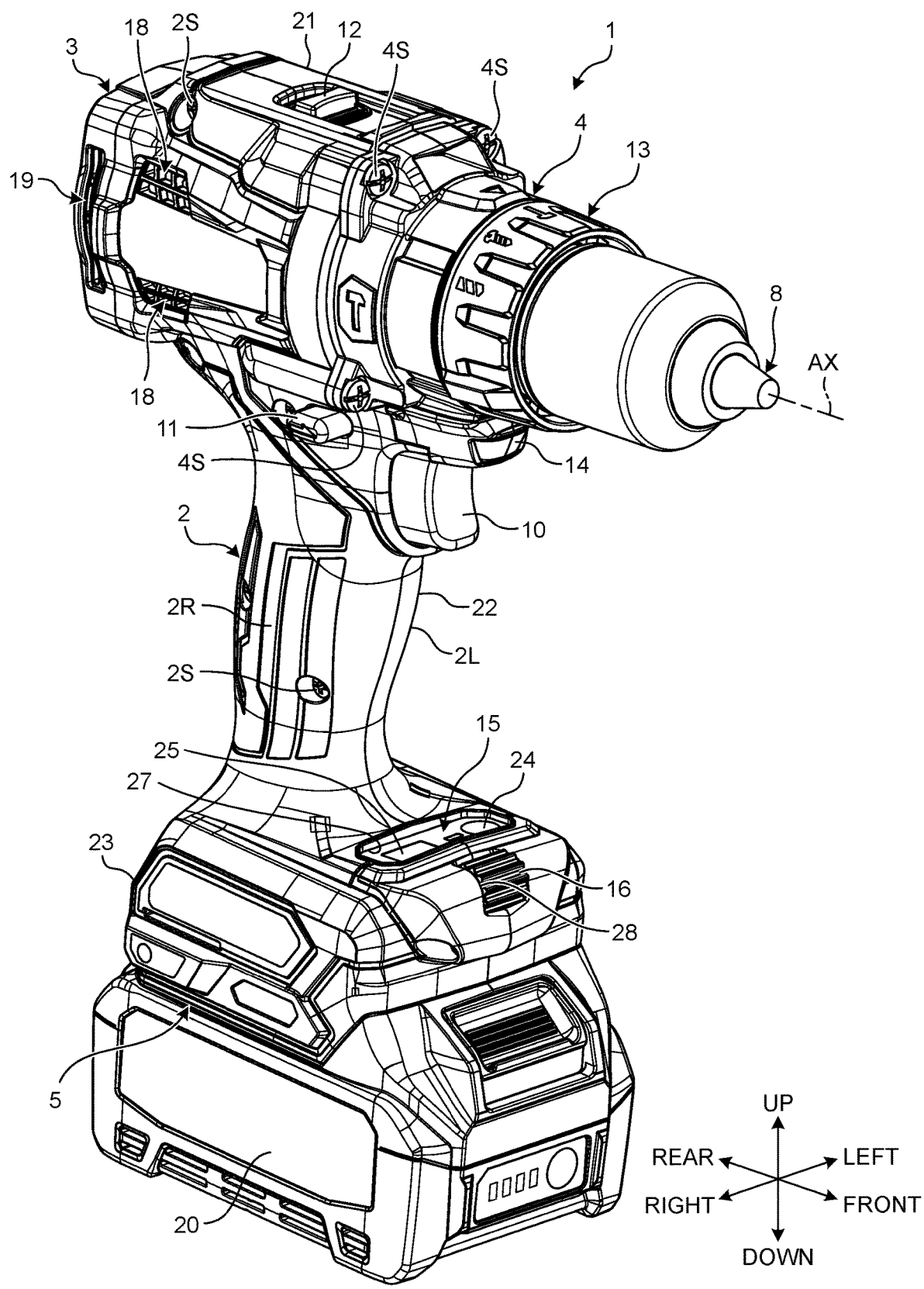
FIG. 1 is a front perspective view of a driver drill according to a first embodiment.

In one or more embodiments, an electric work machine may include a motor, a first planetary gear mechanism, and a second planetary gear mechanism. The first planetary gear mechanism may include a first stage unit and a second stage unit, the first stage unit including a plurality of first planetary gears disposed around a sun gear rotated by the motor and a first internal gear disposed around the first planetary gears, the second stage unit including a plurality of second planetary gears disposed around the sun gear and a second internal gear disposed around the second planetary gears. A reduction ratio of the first stage unit may be different from a reduction ratio of the second stage unit. The second planetary gear mechanism may be disposed forward of the first planetary gear mechanism and operated by a rotational force of the first planetary gear mechanism. The electric work machine may include a spindle rotated by a rotational force of the motor transmitted through the second planetary gear mechanism. The electric work machine may include a first speed switch mechanism configured to perform switching between a first speed reducing mode in which rotation of the second internal gear is prevented and rotation of the first internal gear is allowed and a second speed reducing mode in which the rotation of the first internal gear is prevented and the rotation of the second internal gear is allowed. The electric work machine may include a second speed switch mechanism configured to perform switching between an enabled mode in which rotation of an internal gear of the second planetary gear mechanism is prevented and a disabled mode in which the rotation of the internal gear is allowed.

In the above configuration, the first planetary gear mechanism includes the first stage unit and the second stage unit. The reduction ratio of the first stage unit is different from the reduction ratio of the second stage unit. The speed mode of the electric work machine is switched between a low speed mode, a medium speed mode, and a high speed mode by switching the first planetary gear mechanism to one of the first speed reducing mode and the second speed reducing mode and by switching the second planetary gear mechanism to one of the enabled mode and the disabled mode. This enables an operator to set the electric work machine to an appropriate speed mode in accordance with details of an operation.

In one or more embodiments, the sun gear may have a larger-diameter portion, and a smaller-diameter portion located forward of the larger-diameter portion. The first planetary gears may be disposed around the larger-diameter portion. The second planetary gears may be disposed around the smaller-diameter portion.

In the above configuration, since the sun gear has the larger-diameter portion and the smaller-diameter portion, the difference between the reduction ratio of the first stage unit and the reduction ratio of the second stage unit can be created.

In one or more embodiments, the first internal gear may have a cam tooth on an outer circumferential face thereof, and the second internal gear may have a cam tooth on an outer circumferential face thereof. The first speed switch mechanism may have a contact member coming into contact with either the cam tooth of the first internal gear or the cam tooth of the second internal gear.

In the above configuration, the contact member coming into contact with the cam tooth of the first internal gear prevents the rotation of the first internal gear. The contact member coming into contact with the cam tooth of the second internal gear prevents the rotation of the second internal gear.

In one or more embodiments, the first internal gear and the second internal gear may each be accommodated in a casing. The casing may have a guide groove configured to guide the contact member. The contact member may move to a position facing the outer circumferential face of the first internal gear and a position facing the outer circumferential face of the second internal gear while being guided by the guide groove.

In the above configuration, the contact member can smoothly move in the front-rear direction while being guided by the guide groove. Further, the contact member disposed in the guide groove is prevented from moving in the circumferential direction.

In one or more embodiments, the first speed switch mechanism may include an annular member coupled to the contact member and disposed around at least one of the first internal gear and the second internal gear. The annular member moving in the front-rear direction may cause the contact member to move.

In the above configuration, when a plurality of the contact members are provided and spaced in the circumferential direction, the annular member is coupled to each of the contact members. Moving the annular member moves the contact members simultaneously.

In one or more embodiments, the electric work machine may include a speed switch lever connected to the annular member. Operating the speed switch lever to be moved in the front-rear direction may cause the annular member to move.

In the above configuration, the speed mode is switched by operating the speed switch lever in the front-rear direction.

In one or more embodiments, the second speed switch mechanism may include a speed switch member connected to each of the speed switch lever and the internal gear of the second planetary gear mechanism, and a cam ring configured to receive the internal gear inserted into the cam ring to prevent the rotation of the internal gear. Operating the speed switch lever to be moved in the front-rear direction may cause switching between a state in which the internal gear is inserted into the cam ring and a state in which the internal gear is removed from the cam ring.

In the above configuration, the speed mode is switched by operating the speed switch lever in the front-rear direction.

In one or more embodiments, the motor may include a stator, and a rotor including a rotor shaft and rotating relative to the stator. The sun gear may be provided on a front end portion of the rotor shaft.

In the above configuration, the rotational force of the rotor shaft is directly transmitted to the first planetary gear mechanism.

In one or more embodiments, the electric work machine may include a third planetary gear mechanism disposed forward of the second planetary gear mechanism and operated by a rotational force of the second planetary gear mechanism. The spindle may be coupled to the third planetary gear mechanism.

In the above configuration, the rotation speed of the spindle is reduced by the third planetary gear mechanism.

Hereinbelow, embodiments of the present disclosure will be described with reference to the drawings. However, the present disclosure is not limited thereto. Elements of the embodiments described below can be appropriately combined. Some of the elements may not be used.

In the embodiments, the positional relationship between parts will be explained using words such as left, right, front, rear, up, and down. These words indicate positions or directions relative to the center of the electric work machine.

The electric work machine includes the motor. In the embodiments, a direction parallel to a rotation axis AX of the motor is referred to as the axial direction as appropriate, a direction around the rotation axis AX is referred to as the circumferential direction or the rotation direction as appropriate, and a radiation direction from the rotation axis AX is referred to as the radial direction as appropriate.

In the embodiments, the rotation axis AX extends in the front-rear direction. The axial direction corresponds to the front-rear direction. One side in the axial direction is the front side, and the other side in the axial direction is the rear side. In the radial direction, a position close to the rotation axis AX or a direction toward the rotation axis AX is referred to as inside in the radial direction, and a position far from the rotation axis AX or a direction away from the rotation axis AX is referred to as outside in the radial direction.

First Embodiment

A first embodiment will be described. In the embodiment, the electric work machine is a driver drill, which is a kind of drilling machine.

Summary of Driver Drill

Figure 2:
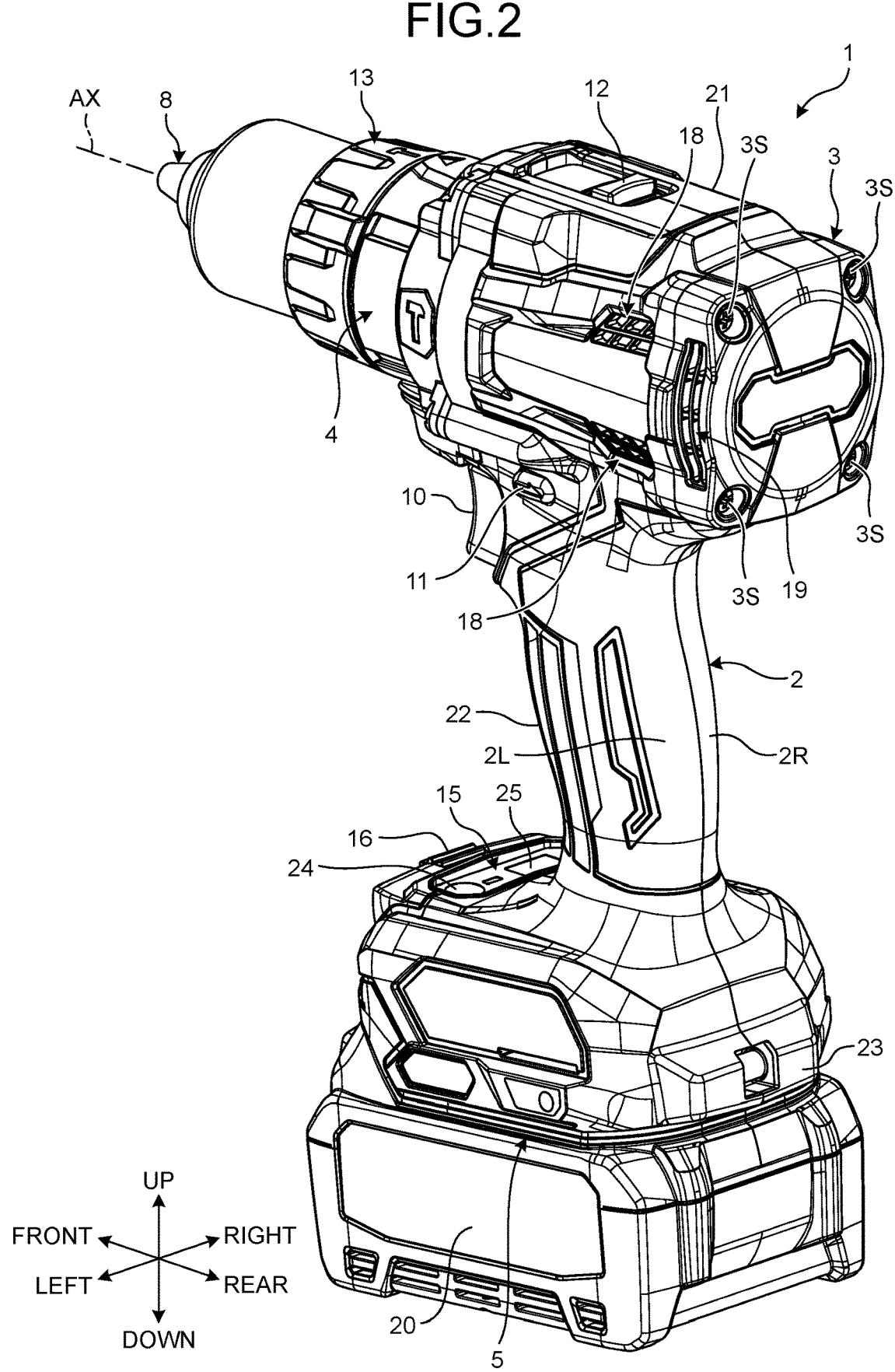
FIG. 2 is a rear perspective view of the driver drill according to the first embodiment.
Figure 3:
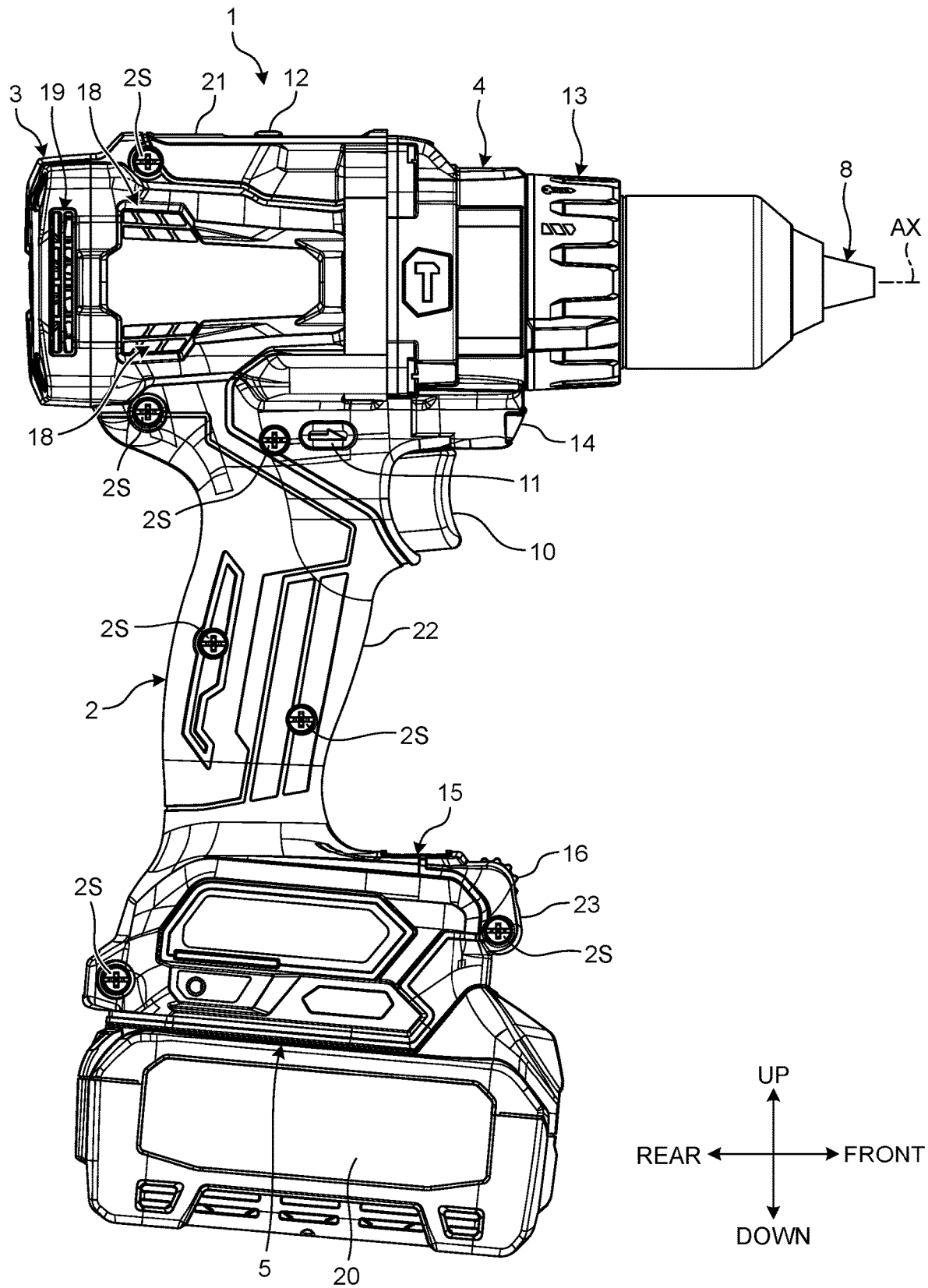
FIG. 3 is a side view of the driver drill according to the first embodiment.
Figure 4:
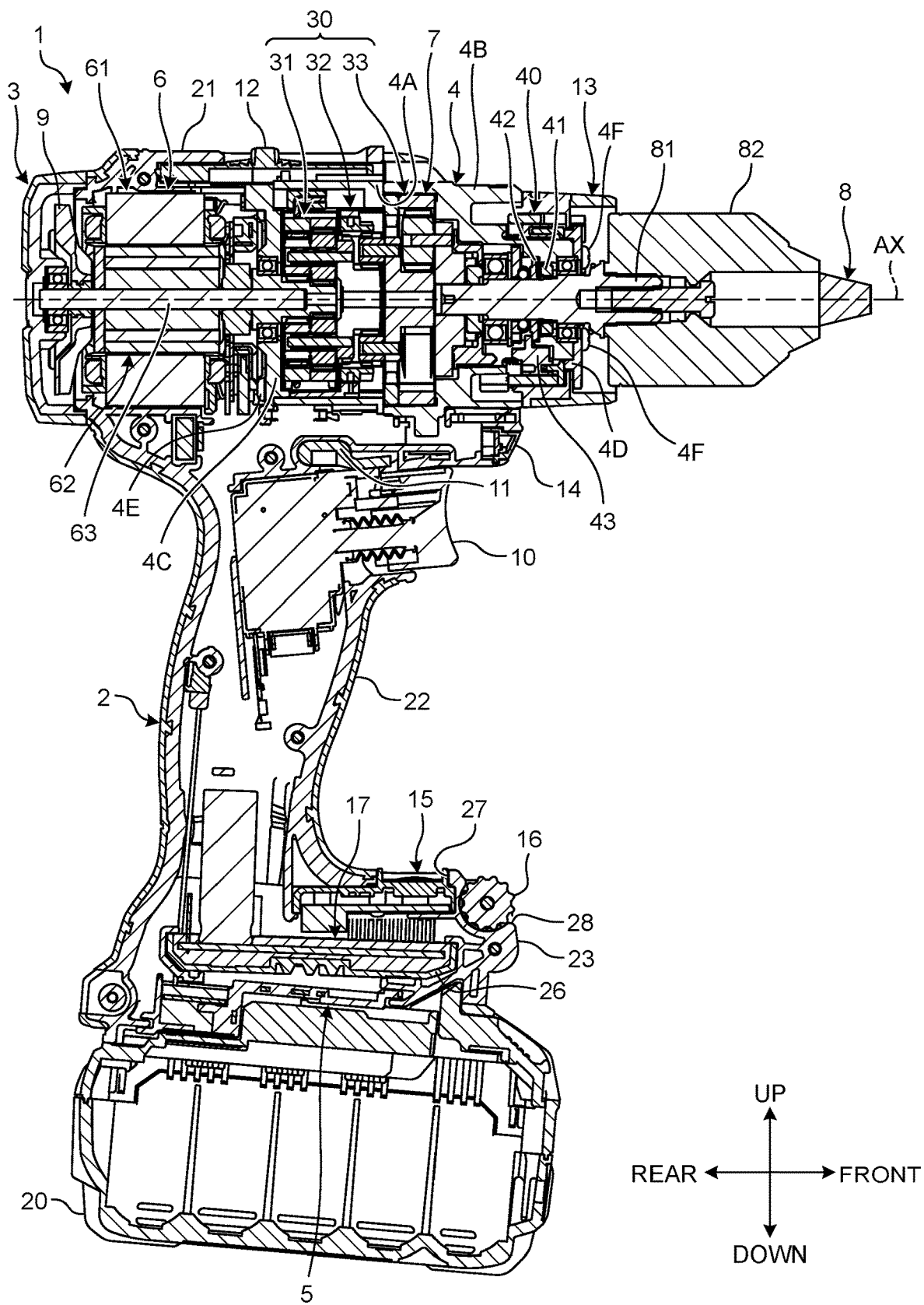
FIG. 4 is a sectional view of the driver drill according to the first embodiment.

FIG. 1 is a front perspective view of a driver drill 1 according to the embodiment. FIG. 2 is a rear perspective view of the driver drill 1 according to the embodiment. FIG. 3 is a side view of the driver drill 1 according to the embodiment. FIG. 4 is a sectional view of the driver drill 1 according to the embodiment. In the embodiment, the driver drill 1 is a vibration driver drill.

As illustrated in FIGS. 1, 2, 3, and 4, the driver drill 1 includes a housing 2, a rear cover 3, a casing 4, a battery mount 5, a motor 6, a power transmission mechanism 7, an output unit 8, a fan 9, a trigger lever 10, a forward-reverse switch lever 11, a speed switch lever 12, a mode switch ring 13, a light 14, an interface panel 15, a dial 16, and a controller 17.

The housing 2 is made of a synthetic resin. In the embodiment, the housing 2 is made of nylon. The housing 2 includes a left housing 2L and a right housing 2R. The left housing 2L and the right housing 2R are fastened together with a screw 2S. The housing 2 is formed by fastening the left housing 2L and the right housing 2R together.

The housing 2 includes a motor housing 21, a grip 22, and a battery holder 23.

The motor housing 21 accommodates the motor 6. The motor housing 21 has a cylindrical shape.

The grip 22 is gripped by an operator. The grip 22 is disposed below the motor housing 21. The grip 22 extends downward from the motor housing 21. The trigger lever 10 is disposed on a front portion of the grip 22.

The battery holder 23 accommodates therein the controller 17. The battery holder 23 is disposed on a lower portion of the grip 22. The battery holder 23 is connected to a lower end portion of the grip 22. In each of the front-rear direction and the right-left direction, the outer dimension of the battery holder 23 is larger than the outer dimension of the grip 22.

The rear cover 3 is made of a synthetic resin. The rear cover 3 is disposed behind the motor housing 21. The rear cover 3 accommodates therein the fan 9. The rear cover 3 is disposed covering a rear opening of the motor housing 21. The rear cover 3 is fixed to the motor housing 21 with a screw 3S.

The motor housing 21 has an inlet 18. The rear cover 3 has an outlet 19. Air in a space outside the housing 2 flows into an internal space of the housing 2 through the inlet 18. Air in the internal space of the housing 2 flows out to the space outside the housing 2 through the outlet 19.

The casing 4 accommodates therein the power transmission mechanism 7. The casing 4 includes a first casing 4A, a second casing 4B, a bracket plate 4C, and a stop plate 4D. The second casing 4B is disposed in front of the first casing 4A. The mode switch ring 13 is disposed in front of the second casing 4B. The first casing 4A is made of a synthetic resin. The second casing 4B is made of metal. In the embodiment, the second casing 4B is made of aluminum. The casing 4 is disposed in front of the motor housing 21. The first casing 4A and the second casing 4B each have a cylindrical shape.

The first casing 4A is fixed to a rear end portion of the second casing 4B. The bracket plate 4C is disposed covering a rear end opening of the first casing 4A. The bracket plate 4C is fixed to a rear end portion of the first casing 4A with a screw 4E. The stop plate 4D is disposed covering a front end opening of the second casing 4B. The stop plate 4D is fixed to a front end portion of the second casing 4B with a screw 4F.

The casing 4 is disposed covering a front opening of the motor housing 21. The first casing 4A is disposed inside the motor housing 21. The second casing 4B is fixed to the motor housing 21 with a screw 4S.

The battery mount 5 is formed on a lower portion of the battery holder 23. The battery mount 5 is connected to a battery pack 20. The battery pack 20 is mounted on the battery mount 5. The battery pack 20 is detachably mounted on the battery mount 5. The battery pack 20 includes a secondary battery. In the embodiment, the battery pack 20 includes a rechargeable lithium ion battery. The battery pack 20 mounted on the battery mount 5 can supply the driver drill 1 with power. The motor 6 is driven based on power supplied from the battery pack 20. The interface panel 15 and the controller 17 are operated based on power supplied from the battery pack 20.

The motor 6 is a power source of the driver drill 1. The motor 6 is an inner-rotor brushless motor. The motor 6 is accommodated in the motor housing 21. The motor 6 includes a stator 61 having a cylindrical shape, and a rotor 62 disposed inside the stator 61. The rotor 62 rotates relative to the stator 61. The rotor 62 includes a rotor shaft 63 extending in the axial direction.

The power transmission mechanism 7 is disposed in front of the motor 6. The power transmission mechanism 7 is accommodated in the casing 4. The power transmission mechanism 7 couples the rotor shaft 63 and the output unit 8 to each other. The power transmission mechanism 7 transmits power generated by the motor 6 to the output unit 8. The power transmission mechanism 7 includes a plurality of gears.

The power transmission mechanism 7 includes a speed reducing mechanism 30 and a vibration mechanism 40.

The speed reducing mechanism 30 reduces the speed of rotation of the rotor shaft 63 and causes the output unit 8 to rotate at a rotation speed lower than the rotation speed of the rotor shaft 63. In the embodiment, the speed reducing mechanism 30 includes a first planetary gear mechanism 31, a second planetary gear mechanism 32, and a third planetary gear mechanism 33. At least a part of the first planetary gear mechanism 31 is disposed forward of the motor 6. The second planetary gear mechanism 32 is disposed forward of the first planetary gear mechanism 31. The third planetary gear mechanism 33 is disposed forward of the second planetary gear mechanism 32. The first planetary gear mechanism 31 is operated by a rotational force of the motor 6. The second planetary gear mechanism 32 is operated by a rotational force of the first planetary gear mechanism 31. The third planetary gear mechanism 33 is operated by a rotational force of the second planetary gear mechanism 32.

The vibration mechanism 40 vibrates the output unit 8 in the axial direction. The vibration mechanism 40 includes a first cam 41, a second cam 42, and a vibration switch ring 43.

The output unit 8 is disposed more forward than the motor 6. The output unit 8 is rotated by the rotational force of the motor 6. The output unit 8 with a bit attached rotates based on the rotational force transmitted from the motor 6 through the power transmission mechanism 7. The output unit 8 includes a spindle 81 that rotates about the rotation axis AX based on the rotational force transmitted from the motor 6, and a chuck 82 to which a bit is attached. At least a part of the spindle 81 is disposed more forward than the third planetary gear mechanism 33. The spindle 81 is coupled to the third planetary gear mechanism 33. The spindle 81 is rotated by the rotational force of the motor 6 transmitted through the first planetary gear mechanism 31, the second planetary gear mechanism 32, and the third planetary gear mechanism 33.

The fan 9 is disposed behind the motor 6. The fan 9 generates an air current for cooling the motor 6. The fan 9 is fixed to at least a part of the rotor 62. The fan 9 is fixed to a rear portion of the rotor shaft 63. The fan 9 is rotated by rotation of the rotor shaft 63. The rotation of the rotor shaft 63 causes the fan 9 to rotate together with the rotor shaft 63. The rotation of the fan 9 causes air in the space outside the housing 2 to flow into the internal space of the housing 2 through the inlet 18. The air that has flowed into the internal space of the housing 2 flows through the internal space of the housing 2, thereby cooling the motor 6. The air that has flowed through the internal space of the housing 2 flows out to the space outside the housing 2 through the outlet 19.

The trigger lever 10 is operated to start the motor 6. The trigger lever 10 is provided on an upper portion of the grip 22. A front end portion of the trigger lever 10 projects forward from the front portion of the grip 22. The trigger lever 10 is movable in the front-rear direction. The trigger lever 10 is operated by the operator. Operating the trigger lever 10 to be moved rearward causes the motor 6 to start. Releasing the operation on the trigger lever 10 stops the motor 6.

The forward-reverse switch lever 11 is operated to switch the rotation direction of the motor 6. The forward-reverse switch lever 11 is provided on the upper portion of the grip 22. A left end portion of the forward-reverse switch lever 11 projects to the left from a left portion of the grip 22. A right end portion of the forward-reverse switch lever 11 projects to the right from a right portion of the grip 22. The forward-reverse switch lever 11 is movable in the right-left direction. The forward-reverse switch lever 11 is operated by the operator. Operating the forward-reverse switch lever 11 to be moved to the left causes the motor 6 to rotate in a forward direction. Operating the forward-reverse switch lever 11 to be moved to the right causes the motor 6 to rotate in a reverse direction. Switching the rotation direction of the motor 6 switches the rotation direction of the spindle 81.

The speed switch lever 12 is operated to change a speed mode of the speed reducing mechanism 30. The speed switch lever 12 is provided on an upper portion of the motor housing 21. The speed switch lever 12 is movable in the front-rear direction. The speed switch lever 12 is operated by the operator. The speed mode of the speed reducing mechanism 30 includes a low speed mode, a medium speed mode, and a high speed mode. The low speed mode refers to a speed mode in which the output unit 8 is rotated at low speed. The medium speed mode refers to a speed mode in which the output unit 8 is rotated at medium speed. The high speed mode refers to a speed mode in which the output unit 8 is rotated at high speed. A movable range of the speed switch lever 12 is defined in the front-rear direction. By operating the speed switch lever 12 to be moved to the front of the movable range, the speed mode of the speed reducing mechanism 30 is set to the low speed mode. By operating the speed switch lever 12 to be moved to the middle of the movable range, the speed mode of the speed reducing mechanism 30 is set to the medium speed mode. By operating the speed switch lever 12 to be moved to the rear of the movable range, the speed mode of the speed reducing mechanism 30 is set to the high speed mode.

The mode switch ring 13 is operated to change an operation mode of the vibration mechanism 40. The mode switch ring 13 is disposed in front of the casing 4. The mode switch ring 13 is turnable. The mode switch ring 13 is operated by the operator. The operation mode of the vibration mechanism 40 includes a vibration mode and a non-vibration mode. The vibration mode refers to an operation mode in which the output unit 8 is vibrated in the axial direction. The non-vibration mode refers to an operation mode in which the output unit 8 is not vibrated in the axial direction. By operating the mode switch ring 13 to be placed at a vibration mode position in the turning direction, the operation mode of the vibration mechanism 40 is set to the vibration mode. By operating the mode switch ring 13 to be placed at a non-vibration mode position in the turning direction, the operation mode of the vibration mechanism 40 is set to the non-vibration mode.

The light 14 emits illumination light that illuminates ahead of the driver drill 1. The light 14 includes, for example, a light emitting diode (LED). The light 14 is disposed on a front lower portion of the motor housing 21. The light 14 is disposed above the trigger lever 10.

The interface panel 15 is provided on the battery holder 23. The interface panel 15 includes an operation device 24 and a display device 25. The interface panel 15 has a plate-like shape. The operation device 24 includes an operation button. Examples of the display device 25 include a segment display including a plurality of segment light emitters, a flat panel display such as a liquid crystal display, and an indicator display with a plurality of light emitting diodes arranged thereon.

The battery holder 23 has a panel opening 27. The panel opening 27 is formed on the upper face of the battery holder 23 at a position forward of the grip 22. At least a part of the interface panel 15 is disposed in the panel opening 27.

The operation device 24 is operated to change a driving mode of the motor 6. The operation device 24 is operated by the operator. The driving mode of the motor 6 includes a drill mode and a clutch mode. The drill mode refers to a driving mode in which the motor 6 is driven regardless of torque acting on the motor 6 in driving the motor 6. The clutch mode refers to a driving mode in which the motor 6 is stopped when torque acting on the motor 6 exceeds a torque threshold in driving the motor 6.

The dial 16 is operated to change a driving conditions of the motor 6. The dial 16 is disposed on a front portion of the battery holder 23. The dial 16 is turnably supported on the battery holder 23. The dial 16 is turnable by 360° or more. The dial 16 is operated by the operator. The driving conditions of the motor 6 include the torque threshold. The dial 16 is operated to change the torque threshold in the clutch mode set by the operation device 24.

The battery holder 23 has a dial opening 28. The dial opening 28 is formed in a front right portion of the battery holder 23. At least a part of the dial 16 is disposed in the dial opening 28.

The controller 17 includes a computer system. The controller 17 outputs control commands for controlling the motor 6. At least a part of the controller 17 is accommodated in a controller case 26. The controller 17 held in the controller case 26 is accommodated in the battery holder 23. The controller 17 includes a circuit board with a plurality of electronic components mounted thereon. Examples of the electronic components mounted on the circuit board include a processor such as a central processing unit (CPU), a nonvolatile memory such as a read only memory (ROM) or a storage, a volatile memory such as a random access memory (RAM), a transistor, a capacitor, and a resistor.

The controller 17 sets the driving conditions of the motor 6 in accordance with the operation on the dial 16. As described above, the driving conditions of the motor 6 include the torque threshold. The controller 17 sets the torque threshold in accordance with the operation on the dial 16 in the clutch mode.

In the clutch mode, the controller 17 stops the motor 6 when torque acting on the motor 6 exceeds the set torque threshold in driving the motor 6.

The controller 17 causes the display device 25 to display the set driving conditions of the motor 6. The controller 17 causes the display device 25 to display the set torque threshold.

Motor and Power Transmission Mechanism

Figure 5:
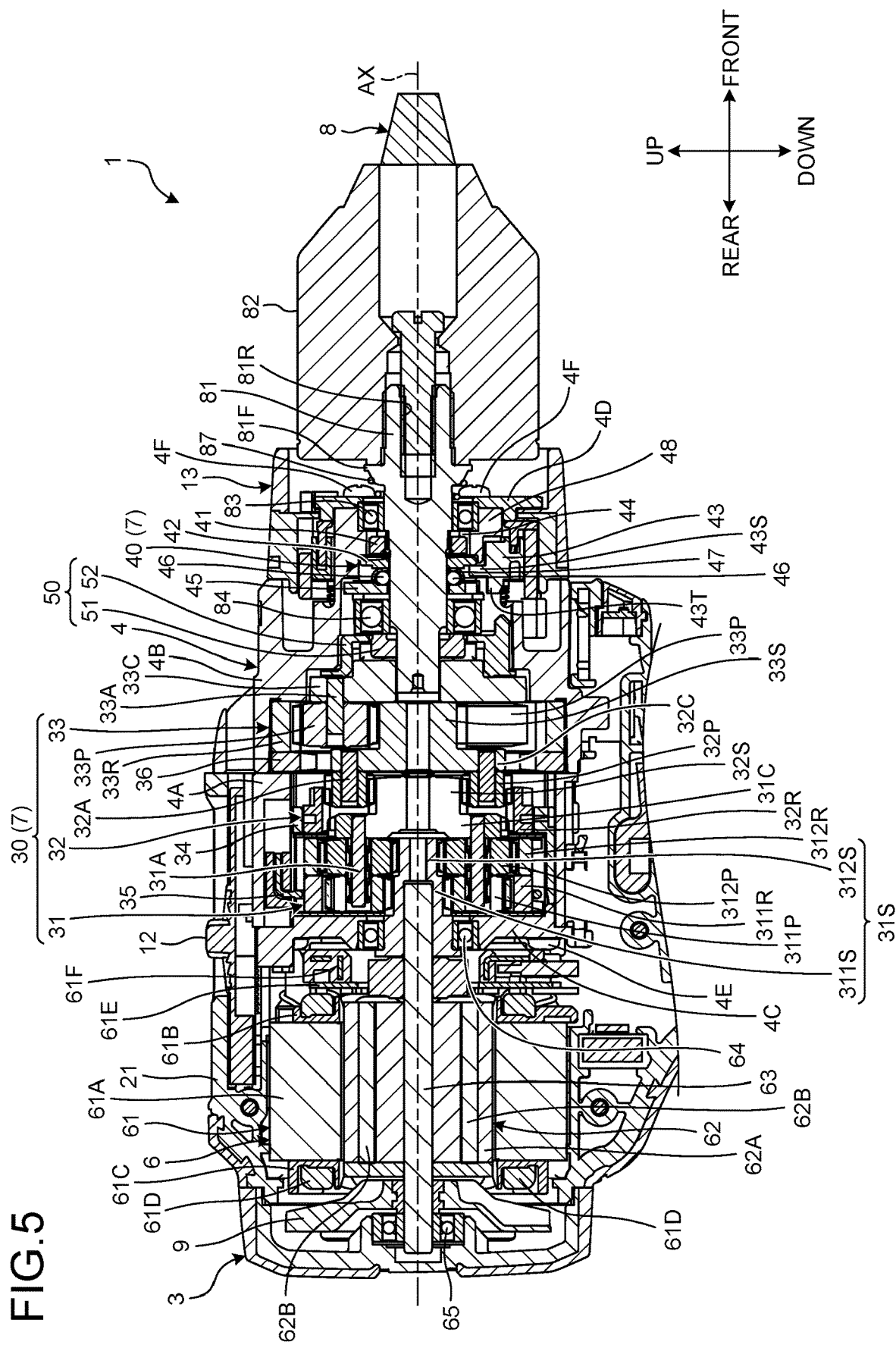
FIG. 5 is a sectional view of a part of the driver drill according to the first embodiment.

FIG. 5 is a sectional view of a part of the driver drill 1 according to the embodiment. As illustrated in FIG. 5, the motor 6 includes the stator 61 having a cylindrical shape, and the rotor 62 disposed inside the stator 61. The rotor 62 includes the rotor shaft 63 extending in the axial direction.

The stator 61 includes a stator core 61A including a plurality of laminated steel sheets, a front insulator 61B disposed on a front portion of the stator core 61A, a rear insulator 61C disposed on a rear portion of the stator core 61A, a plurality of coils 61D wound around the stator core 61A with the front insulator 61B and the rear insulator 61C interposed therebetween, a sensor circuit board 61E mounted on the front insulator 61B, and a short-circuit member 61F supported on the front insulator 61B. The sensor circuit board 61E includes a plurality of rotation detecting elements that detect rotation of the rotor 62. The short-circuit member 61F connects the coils 61D through fusing terminals. The short-circuit member 61F is connected to the controller 17 through lead wires.

The rotor 62 rotates about the rotation axis AX. The rotor 62 includes the rotor shaft 63, a rotor core 62A disposed around the rotor shaft 63, and a plurality of permanent magnets 62B held on the rotor core 62A. The rotor core 62A has a cylindrical shape. The rotor core 62A includes a plurality of laminated steel sheets. The rotor core 62A has through holes extending in the axial direction. The through holes are formed in the circumferential direction. Each of the permanent magnets 62B is disposed in a corresponding one of the through holes of the rotor core 62A.

The rotation detecting elements of the sensor circuit board 61E detect magnetic fields of the permanent magnets 62B to detect rotation of the rotor 62. The controller 17 supplies a driving current to the coils 61D based on data detected by the rotation detecting elements.

The rotor shaft 63 rotates about the rotation axis AX. The rotation axis AX of the rotor shaft 63 coincides with the rotation axis of the output unit 8. A front portion of the rotor shaft 63 is rotatably supported by a bearing 64. A rear portion of the rotor shaft 63 is rotatably supported by a bearing 65. The bearing 64 is held on the bracket plate 4C disposed in front of the stator 61. The bearing 65 is held on the rear cover 3. A front end portion of the rotor shaft 63 is located more forward than the bearing 64. The front end portion of the rotor shaft 63 is disposed inside the internal space of the casing 4.

A pinion gear 31S is provided on the front end portion of the rotor shaft 63. The pinion gear 31S functions as a sun gear of the first planetary gear mechanism 31. The pinion gear 31S is rotated by the motor 6. The pinion gear 31S has a larger-diameter portion 311S, and a smaller-diameter portion 312S located forward of the larger-diameter portion 311S. The rotor shaft 63 is coupled to the first planetary gear mechanism 31 of the speed reducing mechanism 30 through the pinion gear 31S.

The first planetary gear mechanism 31 includes a plurality of planetary gears 311P, a plurality of planetary gears 312P disposed forward of the planetary gears 311P, a first carrier 31C supporting each of the planetary gears 311P and the planetary gears 312P, an internal gear 311R disposed around the planetary gears 311P, and an internal gear 312R disposed around the planetary gears 312P.

The second planetary gear mechanism 32 includes a sun gear 32S, a plurality of planetary gears 32P disposed around the sun gear 32S, a second carrier 32C supporting the planetary gears 32P, and an internal gear 32R disposed around the planetary gears 32P.

The third planetary gear mechanism 33 includes a sun gear 33S, a plurality of planetary gears 33P disposed around the sun gear 33S, a third carrier 33C supporting the planetary gears 33P, and an internal gear 33R disposed around the planetary gears 33P.

The spindle 81 is coupled to the third carrier 33C through a spindle lock mechanism 50. The spindle lock mechanism 50 includes a lock cam 51 disposed around the spindle 81, and a lock ring 52 supporting the lock cam 51 in a rotatable manner. The lock ring 52 is disposed inside the second casing 4B. The lock ring 52 is fixed to the second casing 4B. Rotation of the third carrier 33C causes the spindle 81 to rotate.

The spindle 81 is rotatably supported by a bearing 83 and a bearing 84. The spindle 81 supported by the bearing 83 and the bearing 84 is movable in the front-rear direction.

The spindle 81 has a flange 81F. A coil spring 87 is disposed between the flange 81F and the bearing 83. The flange 81F is in contact with a front end portion of the coil spring 87. The coil spring 87 generates an elastic force to move the spindle 81 forward.

The chuck 82 is capable of holding a bit. The chuck 82 is coupled to a front portion of the spindle 81. The spindle 81 has a screw hole 81R in its front end. Rotation of the spindle 81 causes the chuck 82 to rotate. The chuck 82 rotates with a bit held thereon.

The first cam 41 and the second cam 42 of the vibration mechanism 40 are each disposed inside the second casing 4B. In the front-rear direction, the first cam 41 and the second cam 42 are each disposed between the bearing 83 and the bearing 84.

The first cam 41 has a ring-like shape. The first cam 41 is disposed around the spindle 81. The first cam 41 is fixed to the spindle 81. The first cam 41 rotates together with the spindle 81. The first cam 41 has cam teeth on its rear face.

The first cam 41 is supported by a stop ring 44. The stop ring 44 is disposed around the spindle 81. In the front-rear direction, the stop ring 44 is disposed between the first cam 41 and the bearing 83.

The second cam 42 has a ring-like shape. The second cam 42 is disposed behind the first cam 41. The second cam 42 is disposed around the spindle 81. The second cam 42 is rotatable relative to the spindle 81. The second cam 42 has cam teeth on its front face. The cam teeth on the front face of the second cam 42 mesh with the cam teeth on the rear face of the first cam 41. The second cam 42 has a tab on its rear face.

In the front-rear direction, a support ring 45 is disposed between the second cam 42 and the bearing 84. The support ring 45 is disposed inside the second casing 4B. The support ring 45 is fixed to the second casing 4B. A plurality of steel balls 46 are disposed on the front face of the support ring 45. A washer 47 is disposed between the steel ball 46 and the second cam 42. The second cam 42 is rotatable with its front-rear movements restricted in a space defined by the support ring 45 and the washer 47.

The vibration switch ring 43 performs switching between the vibration mode and the non-vibration mode. The mode switch ring 13 is coupled to the vibration switch ring 43 through a cam ring 48. The mode switch ring 13 and the cam ring 48 are integrally rotatable. The vibration switch ring 43 is movable in the front-rear direction. The vibration switch ring 43 has a projection 43T. The projection 43T is inserted into a guide hole provided in the second casing 4B. The vibration switch ring 43 can move in the front-rear direction while being guided by the guide hole of the second casing 4B. The projection 43T restricts rotation of the vibration switch ring 43. By operating the mode switch ring 13 by the operator, the vibration switch ring 43 moves in the front-rear direction. The vibration switch ring 43 moves in the front-rear direction between a forward position and a backward position located rearward of the forward position to cause switching between the vibration mode and the non-vibration mode. Operating the mode switch ring 13 causes switching between the vibration mode and the non-vibration mode.

The vibration mode includes a state in which rotation of the second cam 42 is restricted. The non-vibration mode includes a state in which the rotation of the second cam 42 is allowed. The rotation of the second cam 42 is restricted when the vibration switch ring 43 moves to the forward position. The rotation of the second cam 42 is allowed to rotate when the vibration switch ring 43 moves to the backward position.

In the vibration mode, at least a part of the vibration switch ring 43 moved to the forward position comes into contact with the second cam 42. The contact between the vibration switch ring 43 and the second cam 42 restricts the rotation of the second cam 42. When the motor 6 is driven in a state in which the rotation of the second cam 42 is restricted, the first cam 41 fixed to the spindle 81 rotates while making contact with the cam teeth of the second cam 42. Accordingly, the spindle 81 rotates while vibrating in the front-rear direction.

In the non-vibration mode, the vibration switch ring 43 moved to the backward position separates from the second cam 42. The separation between the vibration switch ring 43 and the second cam 42 allows the rotation of the second cam 42. When the motor 6 is driven in a state in which the rotation of the second cam 42 is allowed, the second cam 42 rotates together with the first cam 41 and the spindle 81. Accordingly, the spindle 81 rotates without vibrating in the front-rear direction.

The vibration switch ring 43 is disposed around the first cam 41 and the second cam 42. The vibration switch ring 43 has a facing portion 43S facing the rear face of the second cam 42. The facing portion 43S projects inward in the radial direction from a rear portion of the vibration switch ring 43.

When the mode switch ring 13 is operated to move the vibration switch ring 43 to the forward position, the facing portion 43S of the vibration switch ring 43 comes into contact with the tab on the rear face of the second cam 42. This restricts the rotation of the second cam 42. In this manner, by operating the mode switch ring 13 to move the vibration switch ring 43 to the forward position, the vibration mechanism 40 is switched to the vibration mode.

When the mode switch ring 13 is operated to move the vibration switch ring 43 to the backward position, the facing portion 43S of the vibration switch ring 43 is separated from the second cam 42. This allows the rotation of the second cam 42. In this manner, by operating the mode switch ring 13 to move the vibration switch ring 43 to the backward position, the vibration mechanism 40 is switched to the non-vibration mode.

Speed Reducing Mechanism

Figure 6:
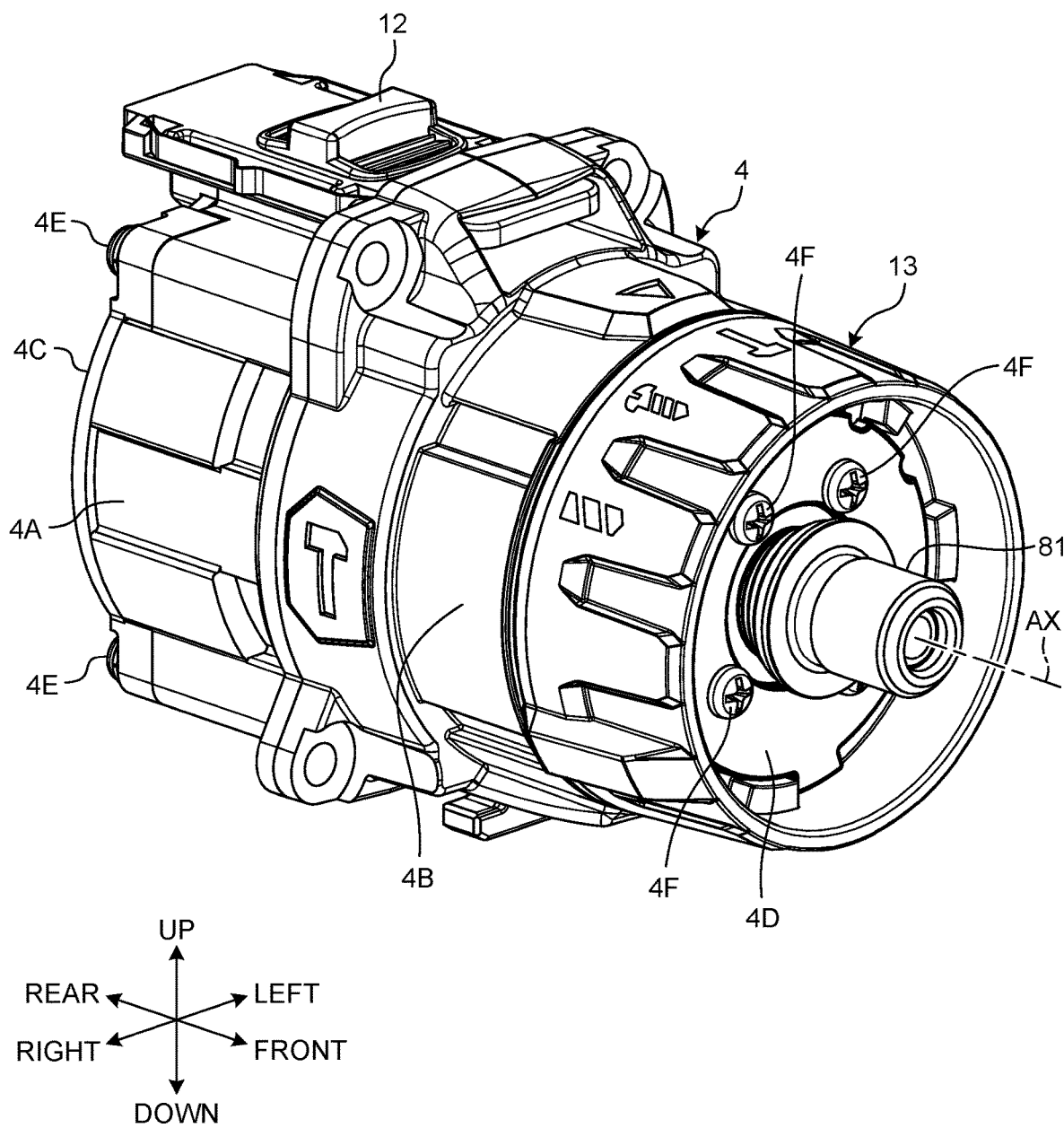
FIG. 6 is a front perspective view of a part of the driver drill according to the first embodiment.
Figure 7:
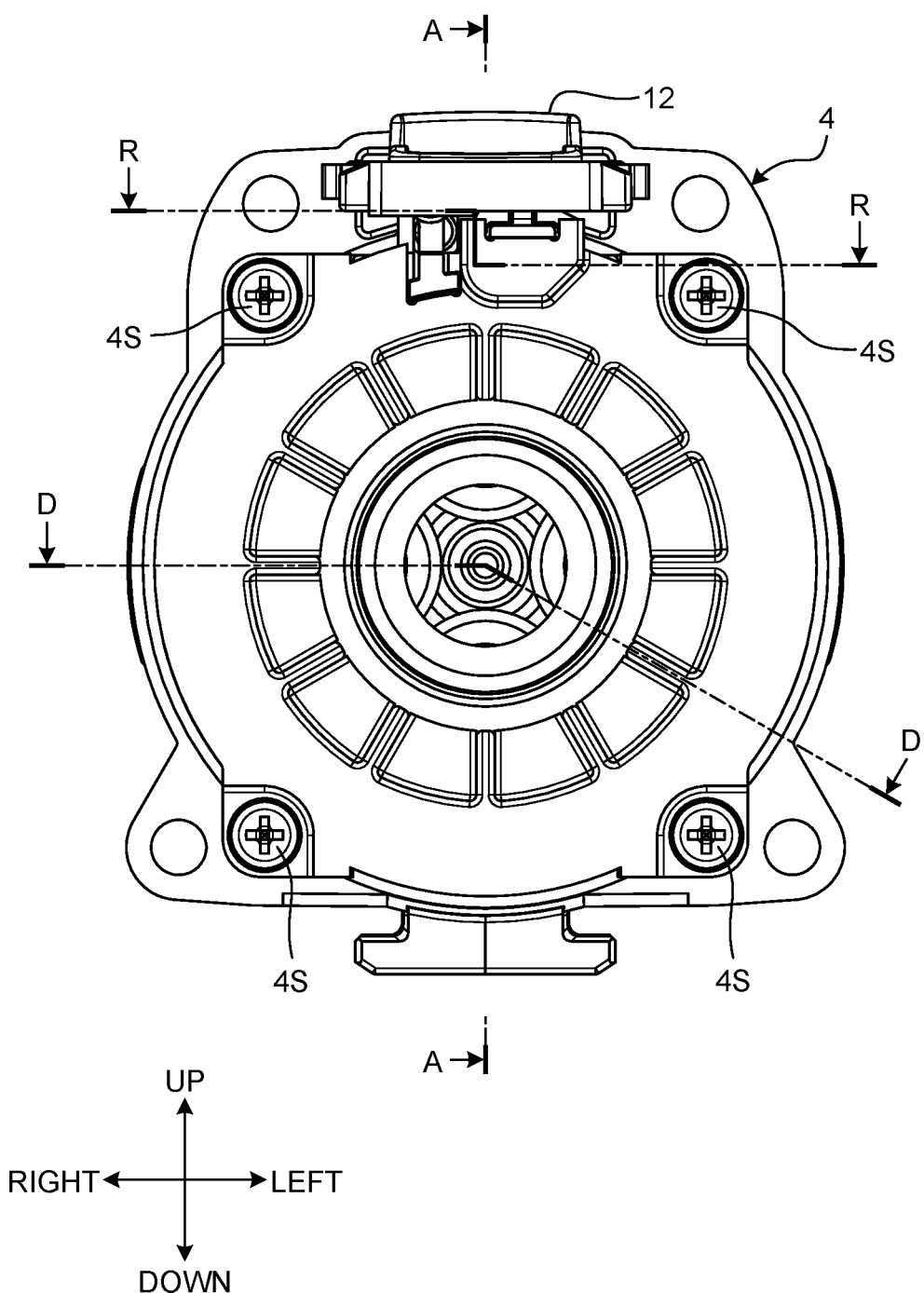
FIG. 7 is a front view of a part of the driver drill according to the first embodiment.
Figure 8:
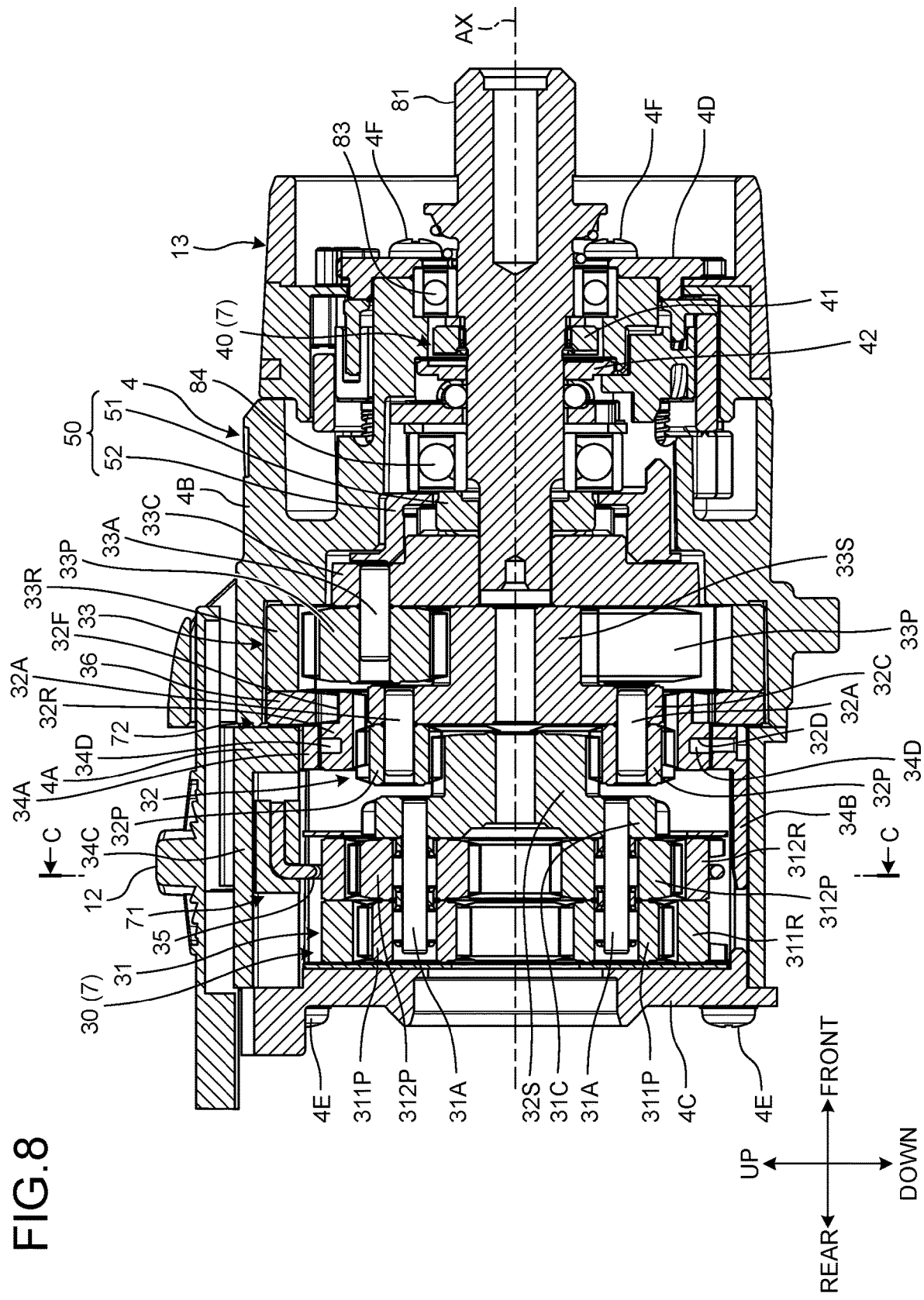
FIG. 8 is a sectional view of a power transmission mechanism according to the first embodiment.
Figure 9:
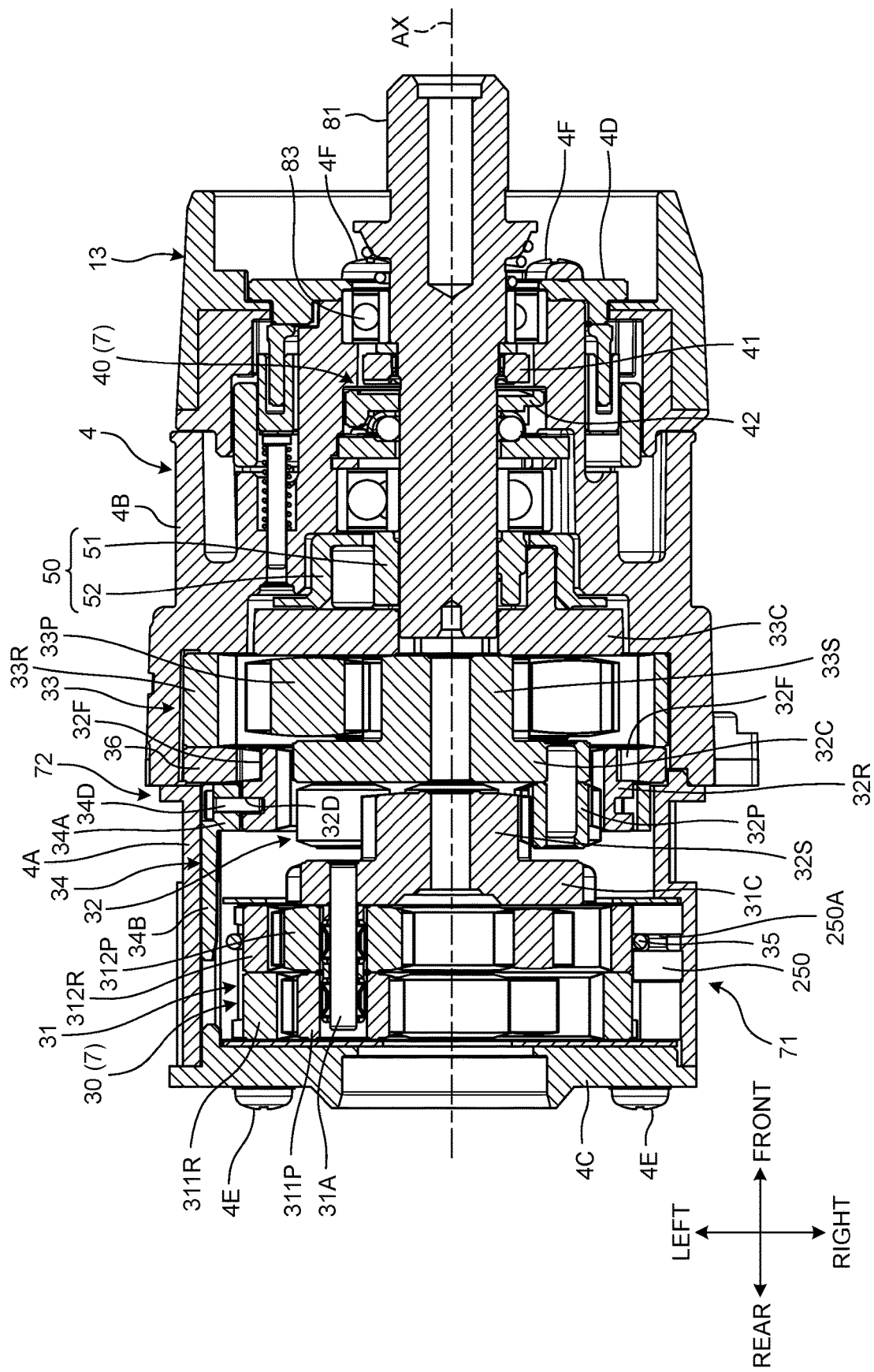
FIG. 9 is a sectional view of the power transmission mechanism according to the first embodiment.
Figure 10:
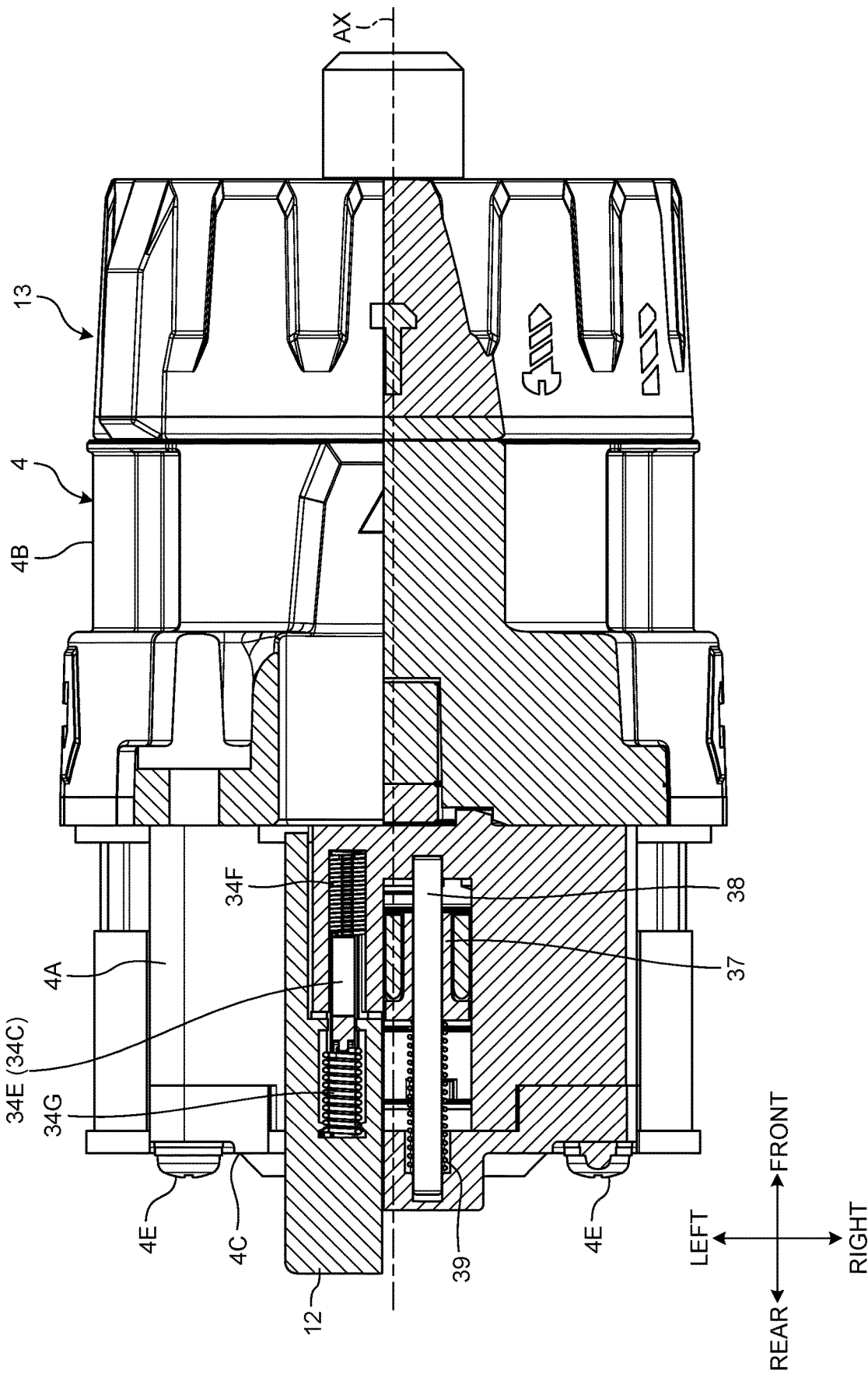
FIG. 10 is a sectional view of the power transmission mechanism according to the first embodiment.

FIG. 6 is a front perspective view of a part of the driver drill 1 according to the embodiment. FIG. 7 is a front view of a part of the driver drill 1 according to the embodiment. FIG. 8 is a sectional view of the power transmission mechanism 7 according to the embodiment and corresponds to a sectional view taken along line A-A of FIG. 7. FIG. 9 is a sectional view of the power transmission mechanism 7 according to the embodiment and corresponds to a sectional view taken along line D-D of FIG. 7. FIG. 10 is a sectional view of the power transmission mechanism 7 according to the embodiment and corresponds to a sectional view taken along line R-R of FIG. 7.

The casing 4 accommodates therein the power transmission mechanism 7. The casing 4 includes the first casing 4A, the second casing 4B, the bracket plate 4C, and the stop plate 4D. The second casing 4B is disposed in front of the first casing 4A. The speed switch lever 12 is disposed above the first casing 4A. The mode switch ring 13 is disposed in front of the second casing 4B.

The first casing 4A is fixed to the rear end portion of the second casing 4B. The bracket plate 4C is disposed covering the rear end opening of the first casing 4A. The bracket plate 4C is fixed to the rear end portion of the first casing 4A with the screw 4E. The stop plate 4D is disposed covering the front end opening of the second casing 4B. The stop plate 4D is fixed to a front end portion of the second casing 4B with the screw 4F.

As described above with reference to FIG. 5, the pinion gear 31S has the larger-diameter portion 311S, and the smaller-diameter portion 312S located forward of the larger-diameter portion 311S.

The first planetary gear mechanism 31 includes the planetary gears 311P, the planetary gears 312P disposed forward of the planetary gears 311P, the first carrier 31C supporting each of the planetary gears 311P and the planetary gears 312P, the internal gear 311R disposed around the planetary gears 311P, and the internal gear 312R disposed around the planetary gears 312P.

The planetary gears 311P (first planetary gears) are disposed around the larger-diameter portion 311S of the pinion gear 31S. The planetary gears 312P (second planetary gears) are disposed around the smaller-diameter portion 312S of the pinion gear 31S. The first carrier 31C supports each of the planetary gears 311P and the planetary gears 312P. The internal gear 311R (first internal gear) is disposed around the planetary gears 311P. The internal gear 312R (second internal gear) is disposed around the planetary gears 312P. The outer diameter of the planetary gear 311P is smaller than the outer diameter of the planetary gear 312P. The first carrier 31C is provided with pins 31A. The planetary gears 311P and the planetary gears 312P are rotatably supported on the pins 31A. The first carrier 31C rotatably supports each of the planetary gears 311P and the planetary gears 312P through the pins 31A. The first carrier 31C has gear teeth on its outer circumferential portion.

The second planetary gear mechanism 32 includes the sun gear 32S, the planetary gears 32P disposed around the sun gear 32S, the second carrier 32C supporting the planetary gears 32P, and the internal gear 32R disposed around the planetary gears 32P. The sun gear 32S is disposed in front of the first carrier 31C. The diameter of the sun gear 32S is smaller than the diameter of the first carrier 31C. The first carrier 31C and the sun gear 32S are integral with each other. The first carrier 31C and the sun gear 32S rotate together. The second carrier 32C is provided with pins 32A. The planetary gears 32P are rotatably supported on the pins 32A. The second carrier 32C supports the planetary gears 32P in a rotatable manner through the pins 32A.

The third planetary gear mechanism 33 includes the sun gear 33S, the planetary gears 33P disposed around the sun gear 33S, the third carrier 33C supporting the planetary gears 33P, and the internal gear 33R disposed around the planetary gears 33P. The sun gear 33S is disposed in front of the second carrier 32C. The diameter of the sun gear 33S is smaller than the diameter of the second carrier 32C. The second carrier 32C and the sun gear 33S are integral with each other. The second carrier 32C and the sun gear 33S rotate together. The third carrier 33C is provided with pins 33A. The planetary gears 33P are rotatably supported on the pins 33A. The third carrier 33C supports the planetary gears 33P in a rotatable manner through the pins 33A.

Figure 12:
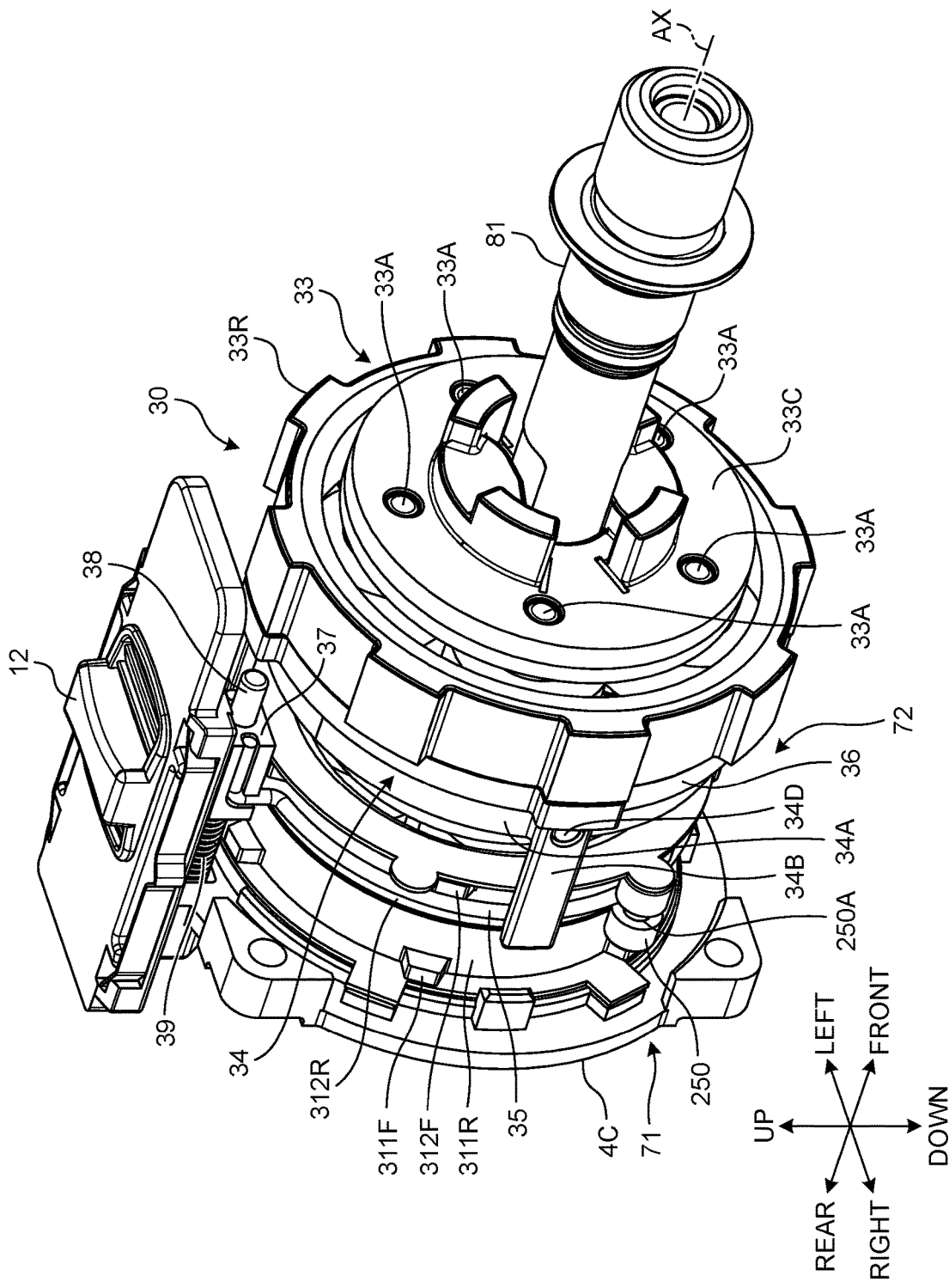
FIG. 12 is a front right perspective view of the speed reducing mechanism according to the first embodiment.
Figure 13:
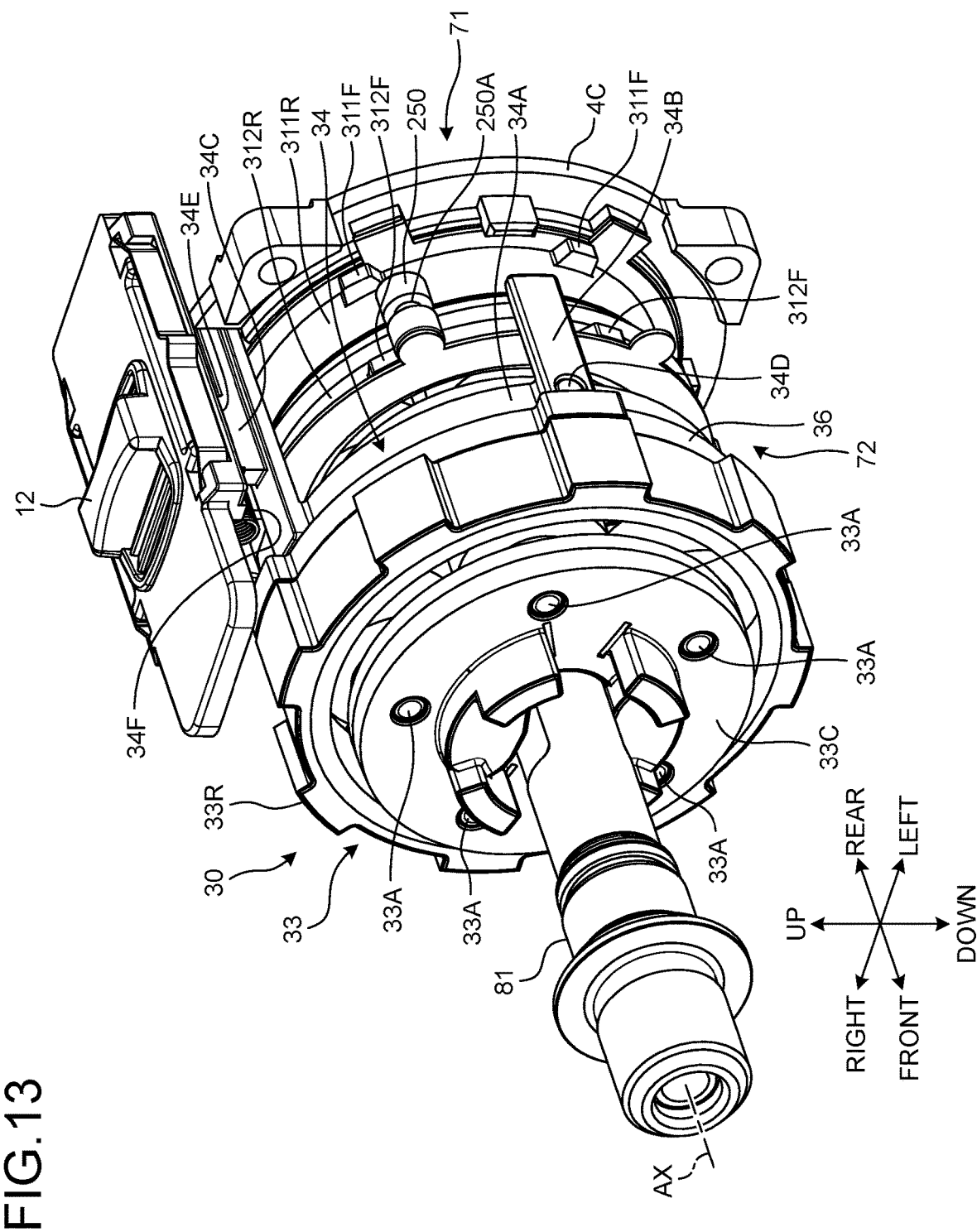
FIG. 13 is a front left perspective view of the speed reducing mechanism according to the first embodiment.

FIG. 11 is a sectional view of the speed reducing mechanism 30 according to the embodiment and corresponds to a sectional view taken along line C-C of FIG. 8. FIG. 12 is a front right perspective view of the speed reducing mechanism 30 according to the embodiment. FIG. 13 is a front left perspective view of the speed reducing mechanism 30 according to the embodiment.

As illustrated in FIGS. 8, 9, 10, 11, and 12, the speed reducing mechanism 30 includes a first speed switch mechanism 71 and a second speed switch mechanism 72.

The first speed switch mechanism 71 performs switching between a first speed reducing mode in which rotation of the internal gear 312R of the first planetary gear mechanism 31 is prevented and rotation of the internal gear 311R thereof is allowed and a second speed reducing mode in which the rotation of the internal gear 311R of the first planetary gear mechanism 31 is prevented and the rotation of the internal gear 312R thereof is allowed.

The first speed switch mechanism 71 includes an annular member 35 and a cam pin 250.

The annular member 35 is coupled to the cam pin 250. The annular member 35 is movable in the front-rear direction inside the first casing 4A. The annular member 35 moving forward puts the first planetary gear mechanism 31 into the first speed reducing mode, whereas the annular member 35 moving rearward puts the first planetary gear mechanism 31 into the second speed reducing mode.

In the embodiment, a reduction ratio of a rear stage unit (first stage unit) of the first planetary gear mechanism 31 including the planetary gears 311P and the internal gear 311R is different from a reduction ratio of a front stage unit (second stage unit) of the first planetary gear mechanism 31 including the planetary gears 312P and the internal gear 312R. The reduction ratio of the front stage unit including the planetary gears 312P and the internal gear 312R is larger than the reduction ratio of the rear stage unit including the planetary gears 311P and the internal gear 311R. When the pinion gear 31S rotates at a constant rotation speed, a rotation speed of the first carrier 31C in the first speed reducing mode is lower than a rotation speed of the first carrier 31C in the second speed reducing mode.

The annular member 35 includes wires disposed around at least one of the internal gear 311R and the internal gear 312R. An upper portion of the annular member 35 is fixed to a lever member 37. The lever member 37 is connected to the speed switch lever 12. The lever member 37 is guided by a guide rod 38 in the front-rear direction. The guide rod 38 is fixed to at least a part of the first casing 4A. In the embodiment, a rear end portion of the guide rod 38 is fixed to the bracket plate 4C. The guide rod 38 supports a coil spring 39. A rear end portion of the coil spring 39 is supported on the bracket plate 4C. A front end portion of the coil spring 39 is connected to the lever member 37. The coil spring 39 biases the annular member 35 forward through the lever member 37.

The cam pin 250 is put on the annular member 35. The cam pin 250 has a groove 250A in which the annular member 35 is disposed. A plurality of the cam pins 250 are provided. The internal gear 311R and the internal gear 312R are each accommodated in the first casing 4A. As illustrated in FIG. 11, the first casing 4A has, on its inner face, guide grooves 4G that guide the cam pins 250. The cam pin 250 is disposed in the guide groove 4G of the first casing 4A. The guide groove 4G is long in the front-rear direction. The cam pins 250 can move in the front-rear direction while being guided by the guide groove 4G. The cam pin 250 is disposed in the guide groove 4G and thus does not move in the circumferential direction.

The internal gear 311R has a plurality of cam teeth 311F on its outer circumferential face. The internal gear 312R has a plurality of cam teeth 312F on its outer circumferential face. The cam pin 250 is a contact member that comes into contact with either the cam tooth 311F of the internal gear 311R or the cam tooth 312F of the internal gear 312R. The cam pin 250 moves to a position facing the outer circumferential face of the internal gear 311R and a position facing the outer circumferential face of the internal gear 312R while being guided by the guide groove 4G. Contact between the cam tooth 311F and the cam pin 250 prevents the rotation of the internal gear 311R. Contact between the cam tooth 312F and the cam pin 250 prevents the rotation of the internal gear 312R.

The annular member 35 is connected to the speed switch lever 12. By operating the speed switch lever 12 to be moved in the front-rear direction, the annular member 35 moves in the front-rear direction. The annular member 35 moving in the front-rear direction causes the cam pin 250 to move together with the annular member 35 in the front-rear direction.

When the annular member 35 moves forward so that the annular member 35 is placed around the internal gear 312R and the cam pin 250 faces the outer circumferential face of the internal gear 312R, the cam pin 250 comes into contact with the cam tooth 312F. This prevents the rotation of the internal gear 312R. That is, the annular member 35 moving forward to prevent the rotation of the internal gear 312R puts the first planetary gear mechanism 31 into the first speed reducing mode.

When the annular member 35 moves rearward so that the annular member 35 is placed around the internal gear 311R and the cam pin 250 faces the outer circumferential face of the internal gear 311R, the cam pin 250 comes into contact with the cam tooth 311F. This prevents the rotation of the internal gear 311R. That is, the annular member 35 moving rearward to prevent the rotation of the internal gear 311R puts the first planetary gear mechanism 31 into the second speed reducing mode.

The second speed switch mechanism 72 performs switching between an enabled mode in which a speed reducing function of the second planetary gear mechanism 32 is enabled and a disabled mode in which the speed reducing function of the second planetary gear mechanism 32 is disabled. Putting the second planetary gear mechanism 32 into the enabled mode includes preventing the rotation of the internal gear 32R. Putting the second planetary gear mechanism 32 into the disabled mode includes allowing the rotation of the internal gear 32R. Preventing the rotation of the internal gear 32R puts the second planetary gear mechanism 32 into the enabled mode. Allowing the rotation of the internal gear 32R puts the second planetary gear mechanism 32 into the disabled mode.

The second speed switch mechanism 72 includes a speed switch member 34 connected to each of the speed switch lever 12 and the internal gear 32R, and a cam ring 36 that receives the internal gear 32R inserted thereinto to prevent the rotation of the internal gear 32R.

The speed switch member 34 is moveable in the front-rear direction inside the first casing 4A. The speed switch member 34 moving forward puts the second planetary gear mechanism 32 into the enabled mode, whereas the speed switch member 34 moving rearward puts the second planetary gear mechanism 32 into the disabled mode.

The speed switch member 34 includes a ring portion 34A, a slider portion 34B, and a lever portion 34C. The ring portion 34A is disposed around the internal gear 32R. The ring portion 34A is coupled to the internal gear 32R through a pin 34D. The internal gear 32R has, on its outer circumferential face, a recess 32D that receives the pin 34D inserted thereinto. Inserting the pin 34D into the recess 32D of the internal gear 32R causes the ring portion 34A and the internal gear 32R to couple to each other. The slider portion 34B is disposed extending rearward from the ring portion 34A. A plurality of the slider portions 34B are provided and spaced in the circumferential direction. The slider portion 34B is guided in the front-rear direction by a guide groove provided on the inner face of the first casing 4A. The lever portion 34C is provided on an upper portion of the ring portion 34A. The lever portion 34C is connected to the speed switch lever 12. The lever portion 34C has a projection 34E projecting upward from the upper face of the lever portion 34C. A coil spring 34F is disposed in front of the projection 34E. A coil spring 34G is disposed behind the projection 34E. A front end portion of the coil spring 34F is supported on at least a part of the first casing 4A. A rear end portion of the coil spring 34F is connected to the projection 34E. A rear end portion of the coil spring 34G is supported on at least a part of the speed switch lever 12. A front end portion of the coil spring 34G is connected to the projection 34E. The coil spring 34F biases the speed switch member 34 rearward. The coil spring 34G biases the speed switch member 34 forward.

The cam ring 36 is disposed in front of the internal gear 32R. The cam ring 36 is fixed to the first casing 4A. The cam ring 36 has a plurality of cam teeth on its inner circumferential face. The cam teeth are provided and spaced in the circumferential direction. The internal gear 32R has cam teeth 32F on its outer circumferential face. The cam teeth 32F are meshable with the cam teeth of the cam ring 36.

By operating the speed switch lever 12 to move in the front-rear direction, the speed switch member 34 moves in the front-rear direction. The speed switch member 34 moving in the front-rear direction causes the internal gear 32R coupled to the ring portion 34A through the pin 34D to move in the front-rear direction. The internal gear 32R moving in the front-rear direction causes switching between a state in which the internal gear 32R is inserted into the cam ring 36 and a state in which the internal gear 32R is removed from the cam ring 36.

When the internal gear 32R is moved forward and at least partially inserted into the inside of the cam ring 36 so that the cam teeth 32F of the internal gear 32R mesh with the cam teeth of the cam ring 36; the rotation of the internal gear 32R is prevented. That is, the speed switch member 34 moving forward to prevent the rotation of the internal gear 32R puts the second planetary gear mechanism 32 into the enabled mode.

When the internal gear 32R is moved rearward and removed from the inside of the cam ring 36 so that the cam teeth 32F of the internal gear 32R separate from the cam teeth of the cam ring 36; the rotation of the internal gear 32R is allowed. That is, the speed switch member 34 moving rearward to allow the rotation of the internal gear 32R puts the second planetary gear mechanism 32 into the disabled mode.

When the second planetary gear mechanism 32 is in the enabled mode, the internal gear 32R meshes with only the planetary gears 32P. When the second planetary gear mechanism 32 is in the disabled mode, the internal gear 32R meshes with both the planetary gears 32P and the first carrier 31C.

As described above, in the embodiment, the speed mode of the speed reducing mechanism 30 includes the low speed mode, the medium speed mode, and the high speed mode.

The movable range of the speed switch lever 12 is defined in the front-rear direction. By operating the speed switch lever 12 to move to the front position in the movable range, the speed mode of the speed reducing mechanism 30 is set to the low speed mode. By operating the speed switch lever 12 to move to the middle position in the movable range, the speed mode of the speed reducing mechanism 30 is set to the medium speed mode. By operating the speed switch lever 12 to move to the rear position in the movable range, the speed mode of the speed reducing mechanism 30 is set to the high speed mode.

The low speed mode includes setting the first planetary gear mechanism 31 to the first speed reducing mode and setting the second planetary gear mechanism 32 to the enabled mode. By operating the speed switch lever 12 to move to the front position in the movable range, the first planetary gear mechanism 31 is set to the first speed reducing mode and the second planetary gear mechanism 32 is set to the enabled mode.

The medium speed mode includes setting the first planetary gear mechanism 31 to the first speed reducing mode and setting the second planetary gear mechanism 32 to the disabled mode. By operating the speed switch lever 12 to move to the middle position in the movable range, the first planetary gear mechanism 31 is set to the first speed reducing mode and the second planetary gear mechanism 32 is set to the disabled mode.

The high speed mode includes setting the first planetary gear mechanism 31 to the second speed reducing mode and setting the second planetary gear mechanism 32 to the disabled mode. By operating the speed switch lever 12 to move to the rear position in the movable range, the first planetary gear mechanism 31 is set to the second speed reducing mode and the second planetary gear mechanism 32 is set to the disabled mode.

FIGS. 6 to 13 illustrate a state in which the speed reducing mechanism 30 is set to the low speed mode.

Figure 14:
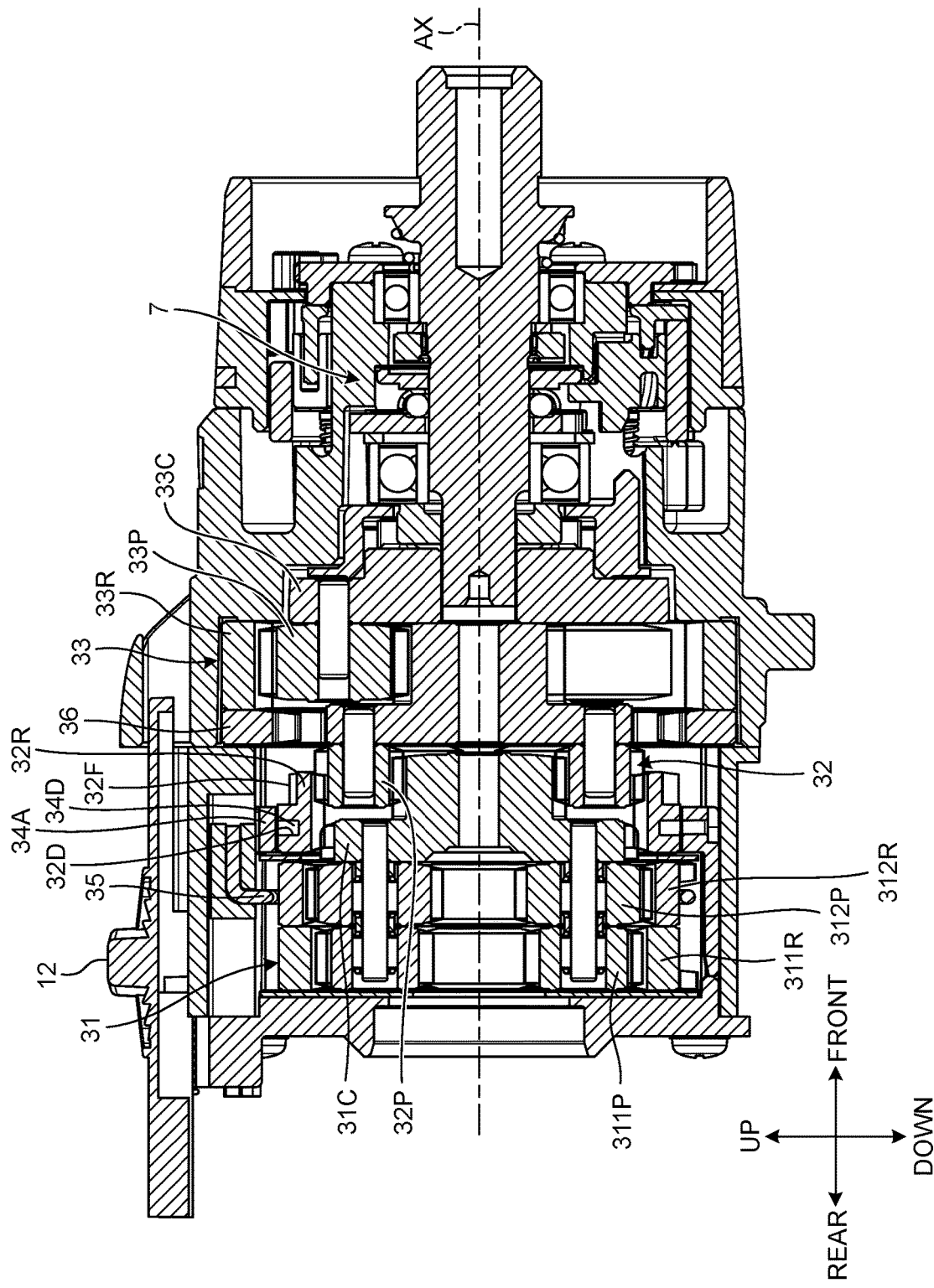
FIG. 14 is a sectional view of the power transmission mechanism according to the first embodiment.
Figure 15:
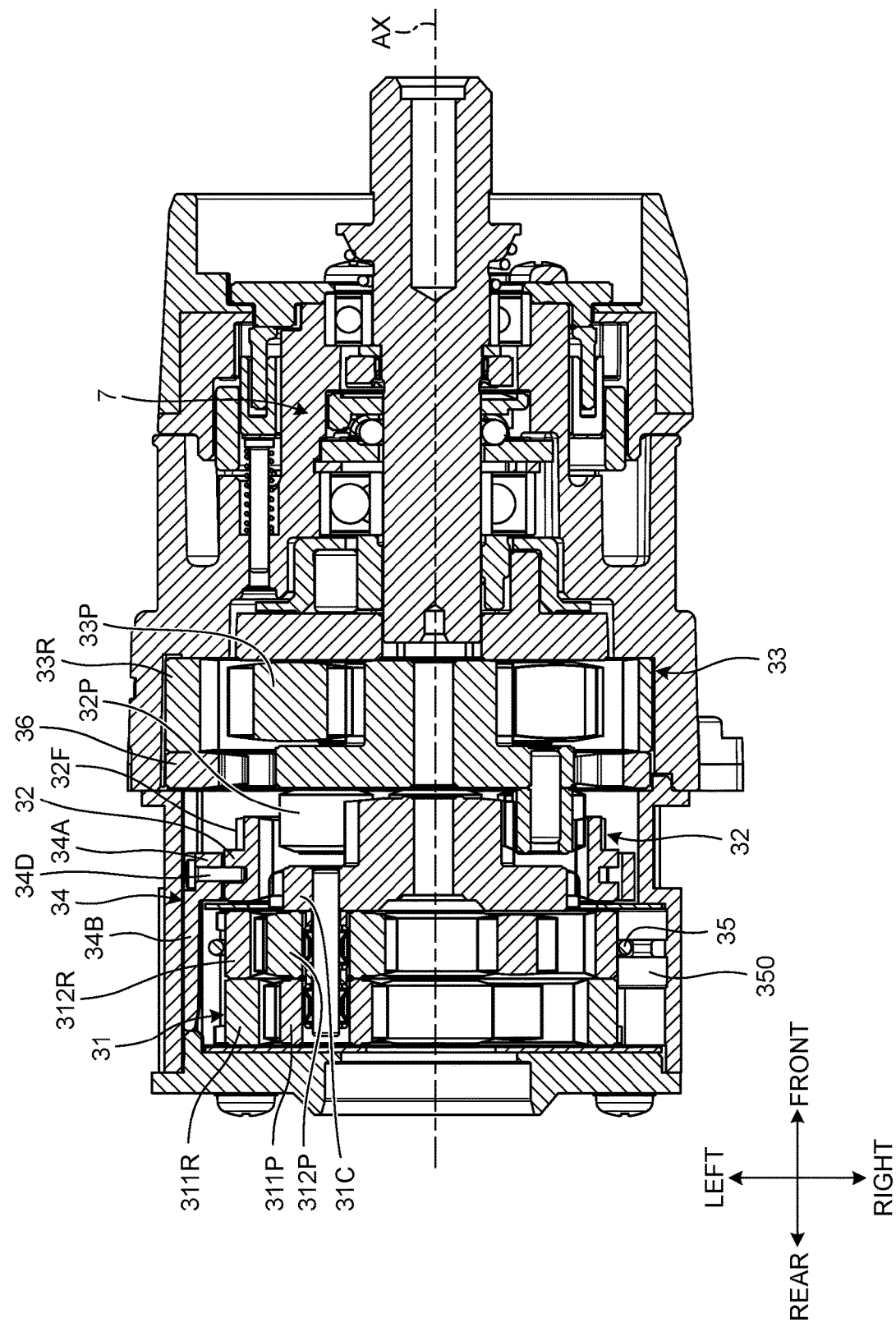
FIG. 15 is a sectional view of the power transmission mechanism according to the first embodiment.
Figure 16:
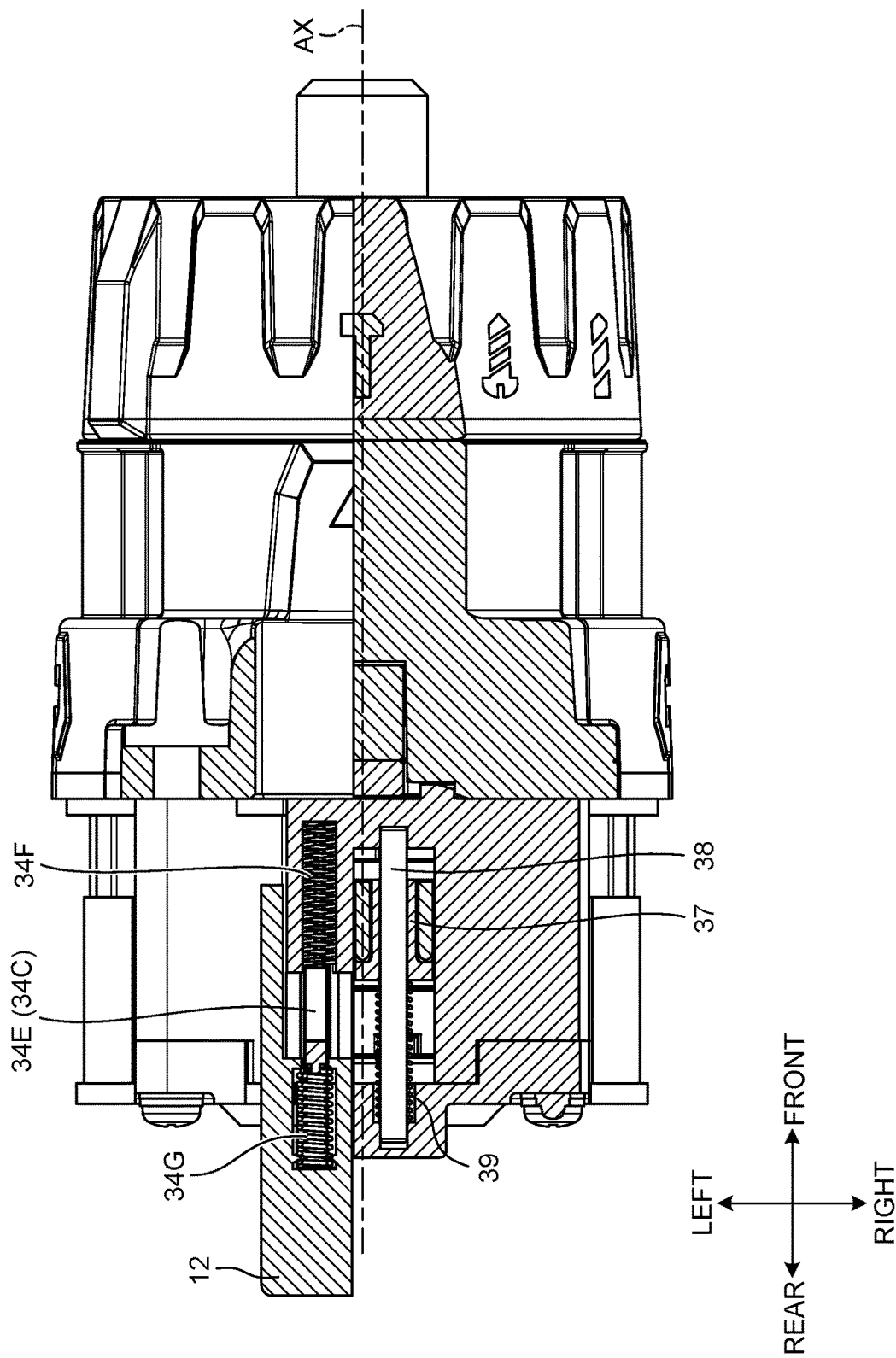
FIG. 16 is a sectional view of the power transmission mechanism according to the first embodiment.

FIG. 14 is a sectional view of the power transmission mechanism 7 according to the embodiment and corresponds to a sectional view taken along A-A of FIG. 7. FIG. 15 is a sectional view of the power transmission mechanism 7 according to the embodiment and corresponds to a sectional view taken along D-D of FIG. 7. FIG. 16 is a sectional view of the power transmission mechanism 7 according to the embodiment and corresponds to a sectional view taken along R-R of FIG. 7. FIGS. 14 to 16 illustrate a state in which the speed reducing mechanism 30 is set to the medium speed mode.

The speed switch lever 12 is moved to the middle position in the movable range so that the speed reducing mechanism 30 is put into the medium speed mode. When the speed switch lever 12 is moved to the middle position, the lever portion 34C moves rearward by the biasing force of the coil spring 34F. This causes the speed switch member 34 to move rearward. The speed switch member 34 moving rearward causes the internal gear 32R coupled to the ring portion 34A through the pin 34D to move rearward. The internal gear 32R moving rearward is removed from the cam ring 36 and meshes with the planetary gears 32P and the first carrier 31C.

In a state in which the speed switch lever 12 is placed at the middle position in the movable range, the annular member 35 remains placed around the internal gear 312R. In the first planetary gear mechanism 31, the rotation of the internal gear 312R is prevented, and the rotation of the internal gear 311R is allowed.

Figure 17:
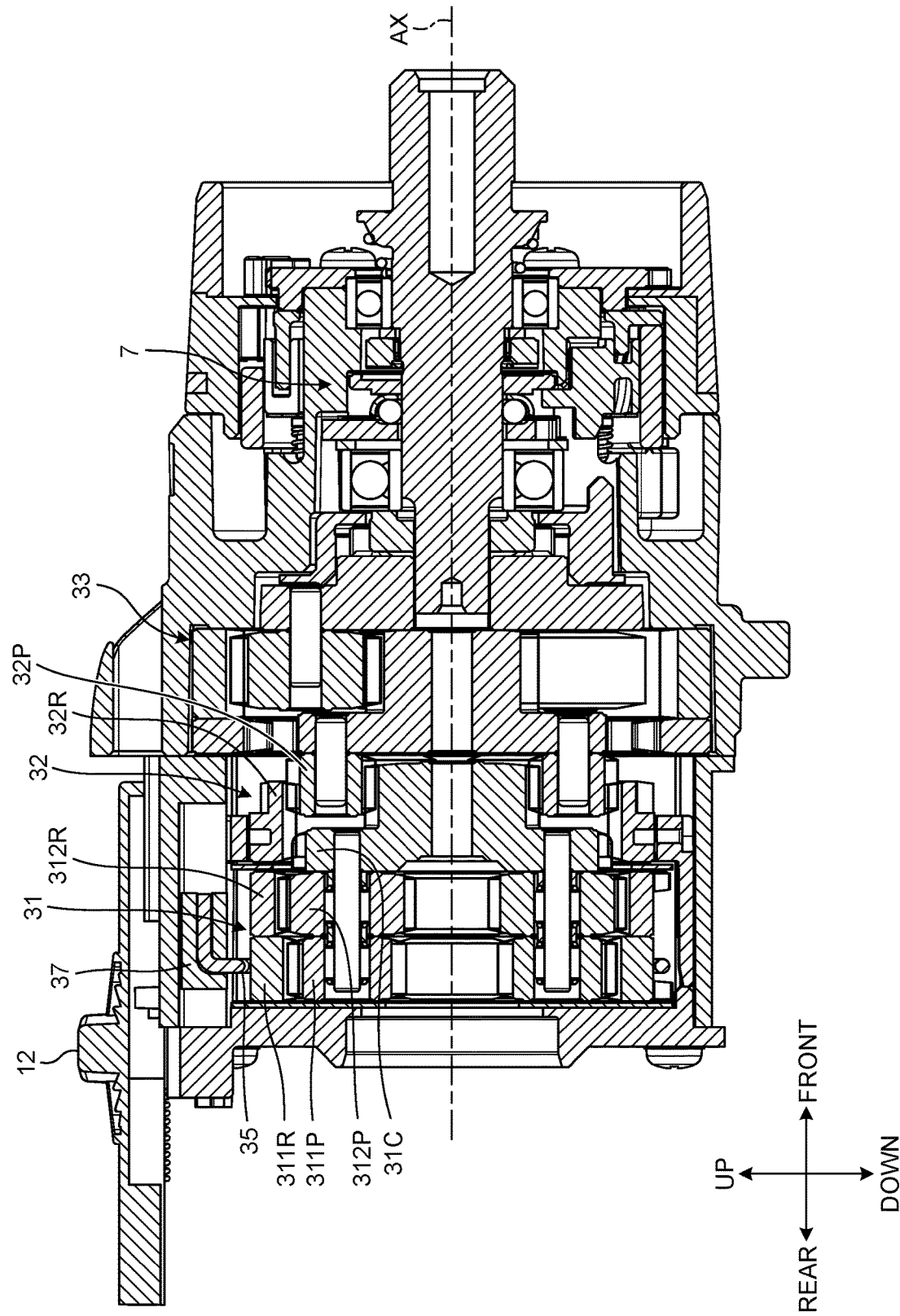
FIG. 17 is a sectional view of the power transmission mechanism according to the first embodiment.
Figure 18:
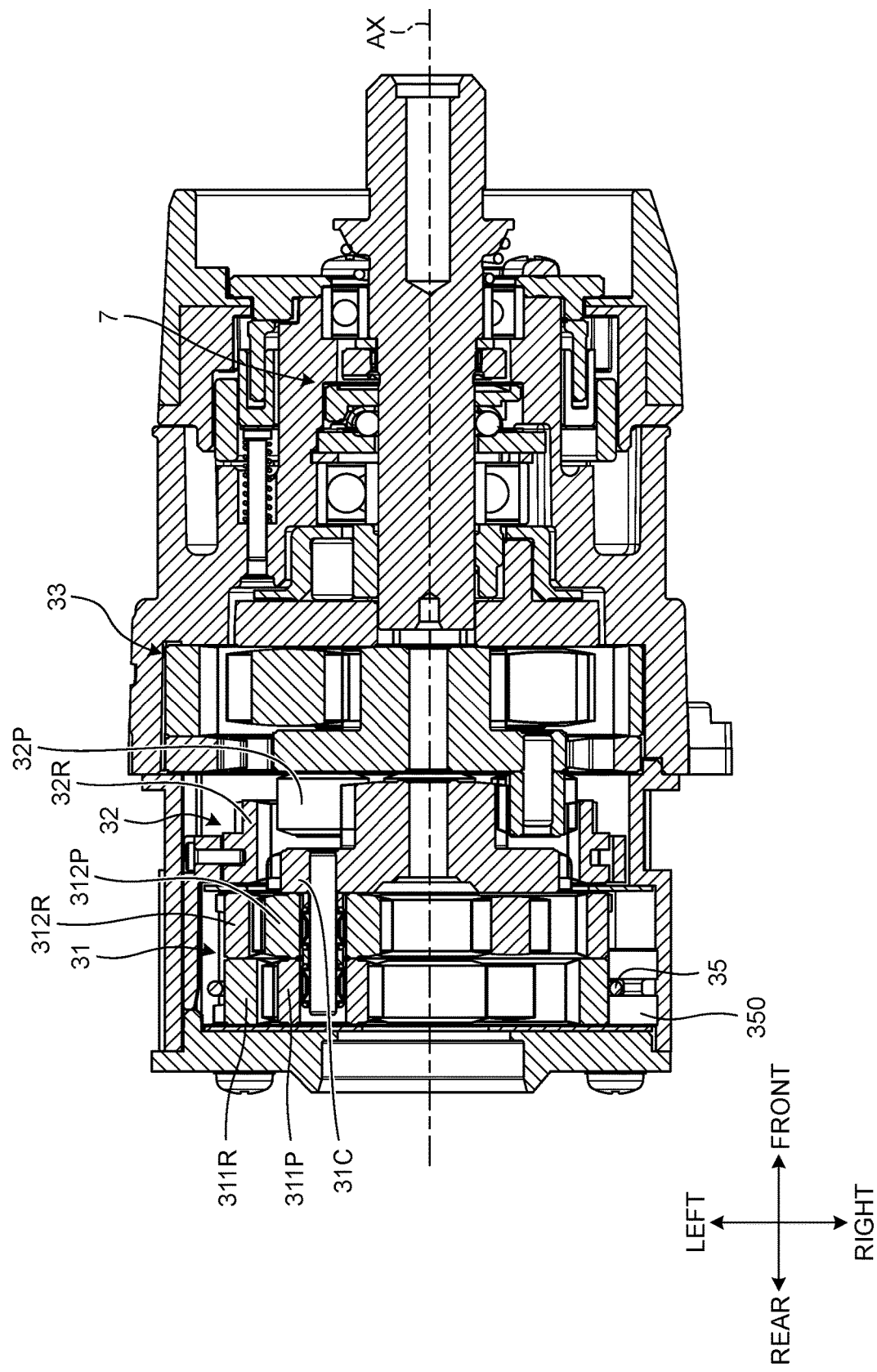
FIG. 18 is a sectional view of the power transmission mechanism according to the first embodiment.
Figure 19:
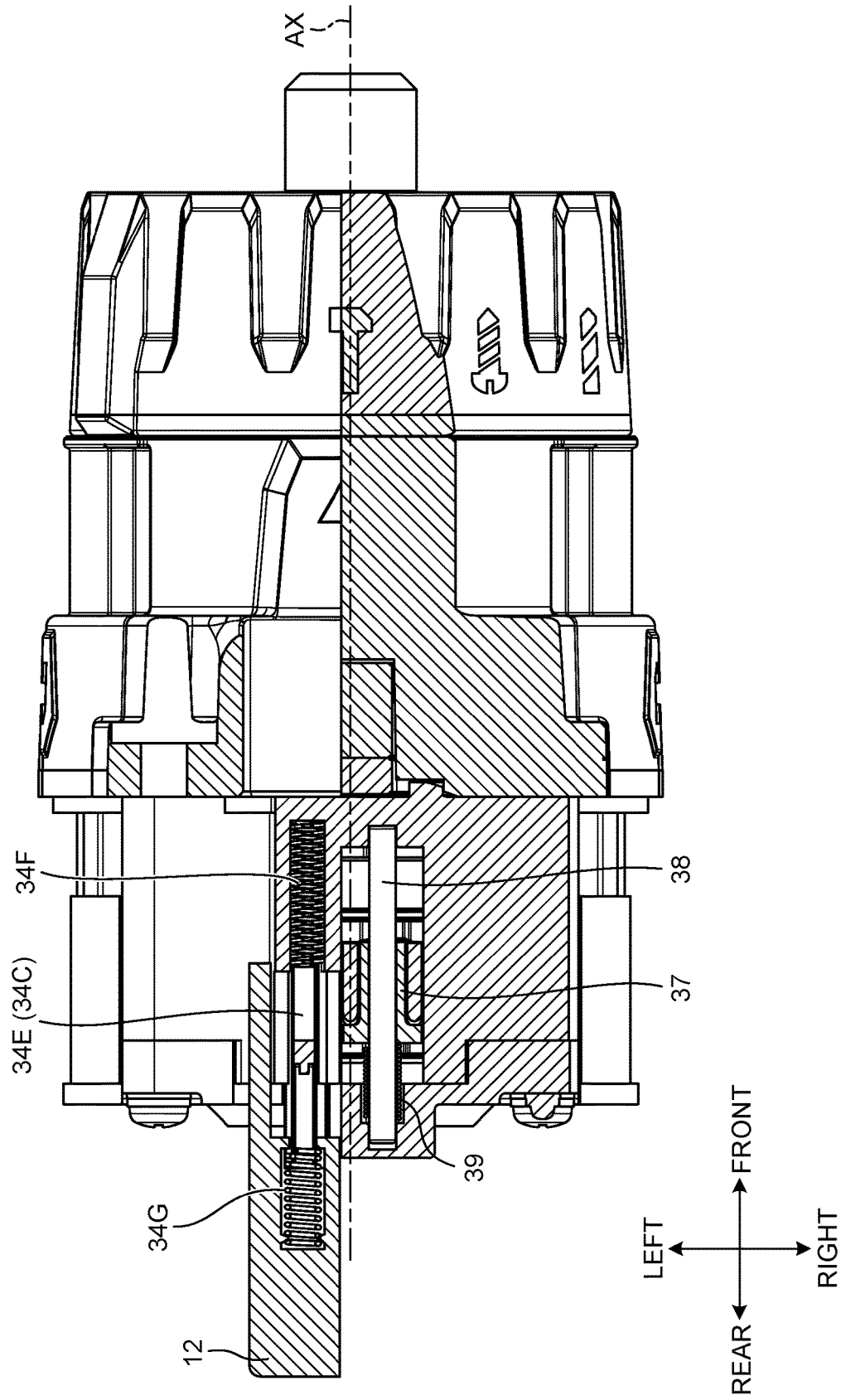
FIG. 19 is a sectional view of the power transmission mechanism according to the first embodiment.

FIG. 17 is a sectional view of the power transmission mechanism 7 according to the embodiment and corresponds to a sectional view taken along A-A of FIG. 7. FIG. 18 is a sectional view of the power transmission mechanism 7 according to the embodiment and corresponds to a sectional view taken along D-D of FIG. 7. FIG. 19 is a sectional view of the power transmission mechanism 7 according to the embodiment and corresponds to a sectional view taken along R-R of FIG. 7. FIGS. 17 to 19 illustrate a state in which the speed reducing mechanism 30 is set to the high speed mode.

The speed switch lever 12 is moved to the rear position in the movable range so that the speed reducing mechanism 30 is put into the high speed mode. When the speed switch lever 12 is moved to the rear, the lever member 37 moves rearward while being guided by the guide rod 38. The lever member 37 moving rearward causes the annular member 35 to move rearward together with the cam pin 250. Accordingly, the annular member 35 is placed around the internal gear 311R. Further, the cam pin 250 comes into contact with the cam tooth 311F provided on the outer circumferential face of the internal gear 311R. This prevents the rotation of the internal gear 311R. The cam pin 250 moving rearward separates from the cam tooth 312F on the outer circumferential face of the internal gear 312R. This allows the rotation of the internal gear 312R.

In a state in which the speed switch lever 12 is placed at the rear position in the movable range, the rotation of the internal gear 32R of the second planetary gear mechanism 32 is allowed.

Operation of Speed Reducing Mechanism

When the motor 6 is driven to rotate the rotor shaft 63 in a state in which the speed reducing mechanism 30 is set to the low speed mode, the pinion gear 31S rotates, and the planetary gears 312P revolve around the smaller-diameter portion 312S of the pinion gear 31S. The revolution of the planetary gears 312P causes the first carrier 31C and the sun gear 32S to rotate at a rotation speed lower than the rotation speed of the rotor shaft 63. In response to the rotation of the sun gear 32S, the planetary gears 32P revolve around the sun gear 32S. The revolution of the planetary gears 32P causes the second carrier 32C and the sun gear 33S to rotate at a rotation speed lower than the rotation speed of the first carrier 31C. In this manner, when the motor 6 is driven in a state in which the internal gear 32R is placed at the low speed mode position, the speed reducing function of the first planetary gear mechanism 31 and the speed reducing function of the second planetary gear mechanism 32 are both exhibited, and the second carrier 32C and the sun gear 33S rotate in the low speed mode.

When the motor 6 is driven to rotate the rotor shaft 63 in a state in which the speed reducing mechanism 30 is set to the medium speed mode, the pinion gear 31S rotates, and the planetary gears 312P revolve around the smaller-diameter portion 312S of the pinion gear 31S. The revolution of the planetary gears 312P causes the first carrier 31C and the sun gear 32S to rotate at a rotation speed lower than the rotation speed of the rotor shaft 63. Since the internal gear 32R meshes with both the planetary gears 32P and the first carrier 31C, the internal gear 32R and the first carrier 31C rotate together. The rotation of the internal gear 32R causes the planetary gears 32P to revolve at the same revolution speed as the rotation speed of the internal gear 32R. The revolution of the planetary gears 32P causes the second carrier 32C and the sun gear 33S to rotate at the same rotation speed as the rotation speed of the first carrier 31C. In this manner, when the motor 6 is driven in a state in which the second planetary gear mechanism 32 is set to the disabled mode, while the speed reducing function of the first planetary gear mechanism 31 is exhibited, the speed reducing function of the second planetary gear mechanism 32 is not exhibited, and the second carrier 32C and the sun gear 33S rotate in the medium speed mode.

When the motor 6 is driven to rotate the rotor shaft 63 in a state in which the speed reducing mechanism 30 is set to the high speed mode, the pinion gear 31S rotates, and the planetary gears 311P revolve around the larger-diameter portion 311S of the pinion gear 31S. The revolution of the planetary gears 311P causes the first carrier 31C and the sun gear 32S to rotate at a rotation speed lower than the rotation speed of the rotor shaft 63. Since the internal gear 32R meshes with both the planetary gears 32P and the first carrier 31C, the internal gear 32R and the first carrier 31C rotate together. The rotation of the internal gear 32R causes the planetary gears 32P to revolve at the same revolution speed as the rotation speed of the internal gear 32R. The revolution of the planetary gears 32P causes the second carrier 32C and the sun gear 33S to rotate at the same rotation speed as the rotation speed of the first carrier 31C. In this manner, when the motor 6 is driven in a state in which the second planetary gear mechanism 32 is set to the disabled mode, while the speed reducing function of the first planetary gear mechanism 31 is exhibited, the speed reducing function of the second planetary gear mechanism 32 is not exhibited, and the second carrier 32C and the sun gear 33S rotate in the high speed mode.

The rotations of the second carrier 32C and the sun gear 33S cause the planetary gears 33P to revolve around the sun gear 33S. The revolution of the planetary gear 33P causes the third carrier 33C to rotate. The rotation of the third carrier 33C causes the spindle 81 to rotate.

Effects

As described above, in the embodiment, the driver drill 1 includes the motor 6, the first planetary gear mechanism 31, and the second planetary gear mechanism 32. The first planetary gear mechanism 31 includes the rear stage unit including the planetary gears 311P disposed around the pinion gear 31S rotated by the motor 6 and the internal gear 311R disposed around the planetary gears 311P, and the front stage unit including the planetary gears 312P disposed around the pinion gear 31S and the internal gear 312R disposed around the planetary gears 312P. The reduction ratio of the rear stage unit is different from the reduction ratio of the front stage unit. The second planetary gear mechanism 32 is disposed forward of the first planetary gear mechanism 31 and operated by the rotational force of the first planetary gear mechanism 31. The driver drill 1 includes the spindle 81 rotated by the rotational force of the motor 6 transmitted through the second planetary gear mechanism 32. The driver drill 1 includes the first speed switch mechanism 71 that performs switching between the first speed reducing mode in which the rotation of the internal gear 312R is prevented and the rotation of the internal gear 311R is allowed and the second speed reducing mode in which the rotation of the internal gear 311R is prevented and the rotation of the internal gear 312R is allowed. The driver drill 1 includes the second speed switch mechanism 72 that performs switching between the enabled mode in which the rotation of the internal gear 32R of the second planetary gear mechanism 32 is prevented and the disabled mode in which the rotation of the internal gear 32R is allowed.

In the above configuration, the first planetary gear mechanism 31 includes the rear stage unit and the front stage unit. The reduction ratio of the rear stage unit is different from the reduction ratio of the front stage unit. The speed mode of the driver drill 1 is switched between the low speed mode, the medium speed mode, and the high speed mode by switching the first planetary gear mechanism 31 to one of the first speed reducing mode and the second speed reducing mode and by setting the second planetary gear mechanism 32 to one of the enabled mode and the disabled mode. This enables the operator to set the driver drill 1 to an appropriate speed mode in accordance with details of an operation.

In the embodiment, the pinion gear 31S has the larger-diameter portion 311S, and the smaller-diameter portion 312S located forward of the larger-diameter portion 311S. The planetary gears 311P are disposed around the larger-diameter portion 311S. The planetary gears 312P are disposed around the smaller-diameter portion 312S.

In the above configuration, since the pinion gear 31S has the larger-diameter portion 311S and the smaller-diameter portion 312S, the difference between the reduction ratio of the rear stage unit and the reduction ratio of the front stage unit can be created.

In the embodiment, the internal gear 311R has the cam tooth 311F on its outer circumferential face, and the internal gear 312R has the cam tooth 312F on its outer circumferential face. The first speed switch mechanism 71 has the cam pin 250 coming into contact with either the cam tooth 311F of the internal gear 311R or the cam tooth 312F of the internal gear 312R.

In the above configuration, the cam pin 250 coming into contact with the cam tooth 311F of the internal gear 311R prevents the rotation of the internal gear 311R. The cam pin 250 coming into contact with the cam tooth 312F of the internal gear 312R prevents the rotation of the internal gear 312R.

In the embodiment, the internal gear 311R and the internal gear 312R are each accommodated in the casing 4. The casing 4 has the guide groove 4G that guides the cam pin 250. The cam pin 250 moves to the position facing the outer circumferential face of the internal gear 311R and the position facing the outer circumferential face of the internal gear 312R while being guided by the guide groove 4G.

In the above configuration, the cam pin 250 can smoothly move in the front-rear direction while being guided by the guide groove 4G. Further, the cam pin 250 disposed in the guide groove 4G is prevented from moving in the circumferential direction.

In the embodiment, the first speed switch mechanism 71 includes the annular member 35 coupled to the cam pin 250 and disposed around at least one of the internal gear 311R and the internal gear 312R. The annular member 35 moving in the front-rear direction causes the cam pin 250 to move.

In the above configuration, when a plurality of the cam pins 250 are provided and spaced in the circumferential direction, the annular member 35 is coupled to each of the cam pins 250. Moving the annular member 35 simultaneously moves the cam pins 250.

In the embodiment, the driver drill 1 includes the speed switch lever 12 connected to the annular member 35. Operating the speed switch lever 12 to be moved in the front-rear direction causes the annular member 35 to move.

In the above configuration, by operating the speed switch lever 12 in the front-rear direction, the speed mode is switched.

In the embodiment, the second speed switch mechanism 72 includes the speed switch member 34 connected to each of the speed switch lever 12 and the internal gear 32R of the second planetary gear mechanism 32, and the cam ring 36 that receives the internal gear 32R inserted thereinto to prevent the rotation of the internal gear 32R. Operating the speed switch lever 12 to be moved in the front-rear direction causes switching between a state in which the internal gear 32R is inserted into the cam ring 36 and a state in which the internal gear 32R is removed from the cam ring 36.

In the above configuration, by operating the speed switch lever 12 in the front-rear direction, the speed mode is switched.

In the embodiment, the motor 6 includes the stator 61, and the rotor 62 including the rotor shaft 63 and rotating relative to the stator 61. The pinion gear 31S is provided on the front end portion of the rotor shaft 63.

In the above configuration, the rotational force of the rotor shaft 63 is directly transmitted to the first planetary gear mechanism 31.

In the embodiment, the driver drill 1 includes the third planetary gear mechanism 33 disposed forward of the second planetary gear mechanism 32 and operated by the rotational force of the second planetary gear mechanism 32. The spindle 81 is coupled to the third planetary gear mechanism 33.

In the above configuration, the rotation speed of the spindle 81 is reduced by the third planetary gear mechanism 33.

Second Embodiment

A second embodiment will be described. Elements identical or equivalent to those in the embodiment described above are designated by the same reference signs as in the above embodiment, and description for these elements will be simplified or omitted.

Speed Reducing Mechanism

Figure 20:
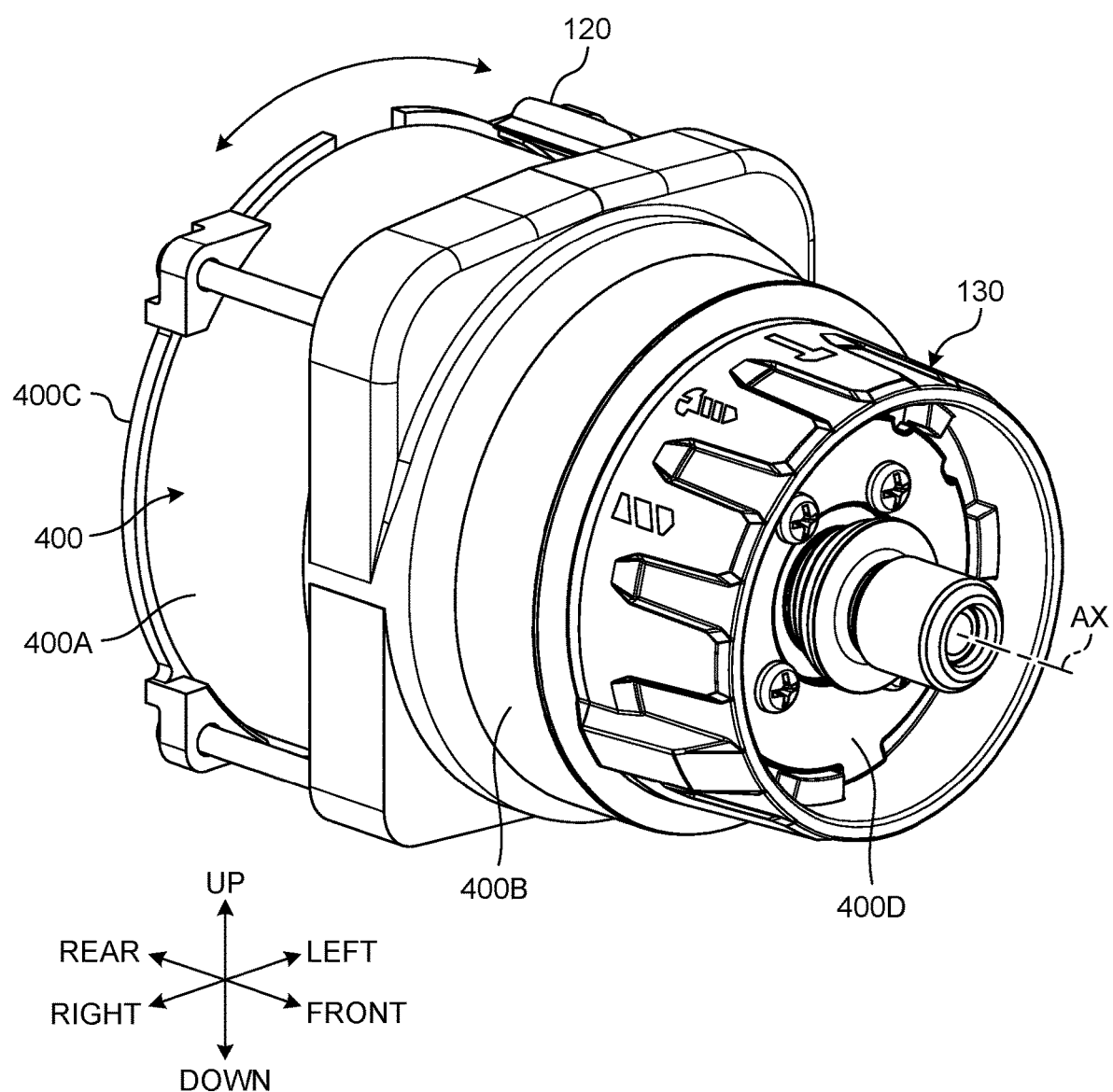
FIG. 20 is a front perspective view of a part of a driver drill according to a second embodiment.

FIG. 20 is a front perspective view of a part of a driver drill 1 according to the embodiment. As illustrated in FIG. 20, a casing 400 includes a first casing 400A, a second casing 400B disposed in front of the first casing 400A, a bracket plate 400C disposed on a rear end portion of the first casing 400A, and a stop plate 400D disposed on a front end portion of the second casing 400B. A mode switch ring 130 is disposed in front of the second casing 400B.

In the embodiment described above, the speed switch lever 12 movable in the front-rear direction is operated to thereby change the speed mode of the speed reducing mechanism 30. In the second embodiment, a speed switch lever 120 movable in the circumferential direction is operated to change a speed mode of a speed reducing mechanism 300. By moving the speed switch lever 120 to the left position in a movable range of the speed switch lever 120, the speed reducing mechanism 300 is set to a low speed mode. By moving the speed switch lever 120 to the middle position in the movable range of the speed switch lever 120, the speed reducing mechanism 300 is set to a medium speed mode. By moving the speed switch lever 120 to the right position in the movable range of the speed switch lever 120, the speed reducing mechanism 300 is set to a high speed mode.

Figure 21:
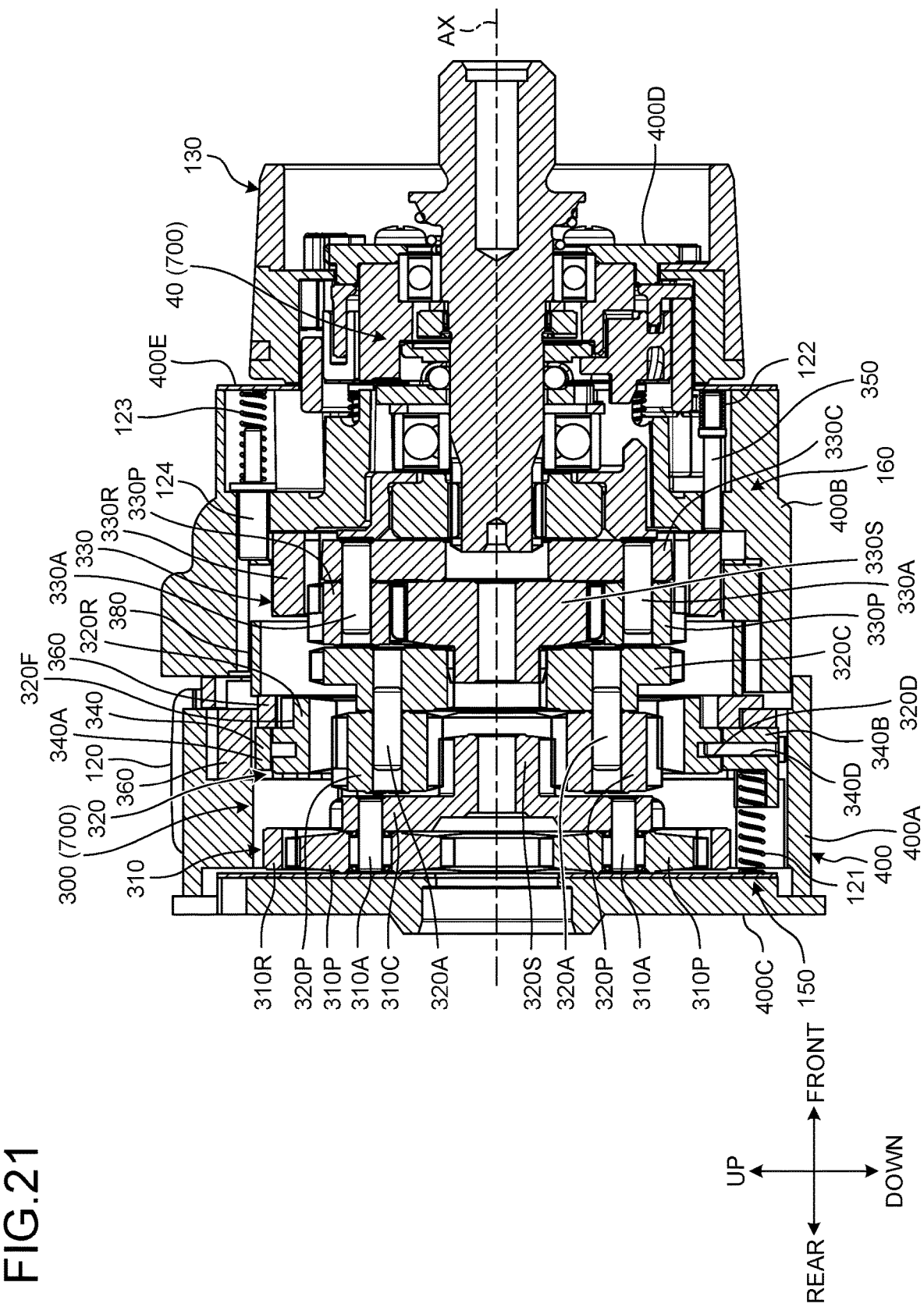
FIG. 21 is a sectional view of a power transmission mechanism according to the second embodiment.
Figure 22:
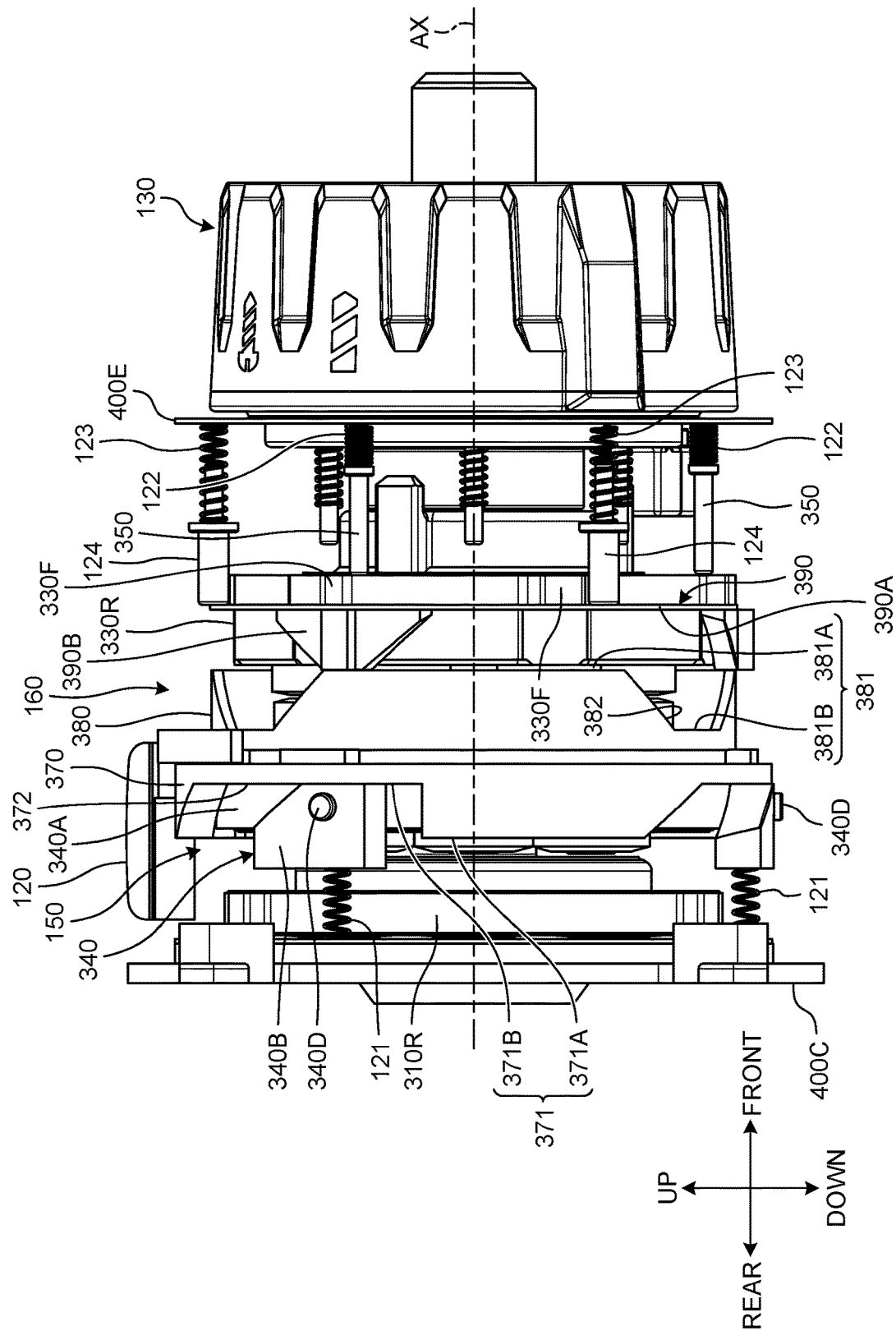
FIG. 22 is a side view of the power transmission mechanism according to the second embodiment.

FIG. 21 is a sectional view of a power transmission mechanism 700 according to the embodiment. FIG. 22 is a side view of the power transmission mechanism 700 according to the embodiment. FIGS. 21 and 22 illustrate a state in which the speed reducing mechanism 300 is set to the low speed mode.

Figure 23:
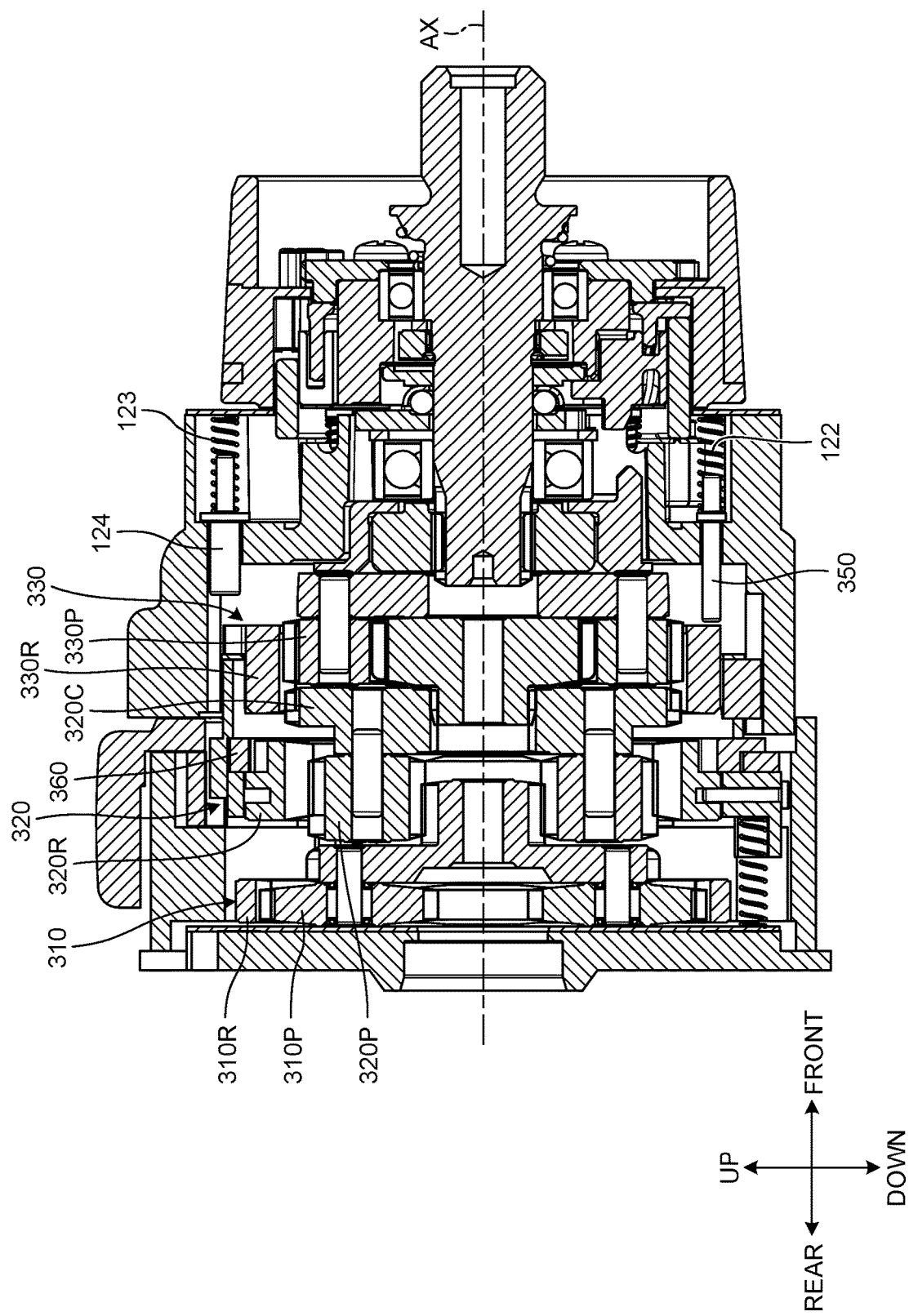
FIG. 23 is a sectional view of the power transmission mechanism according to the second embodiment.
Figure 24:
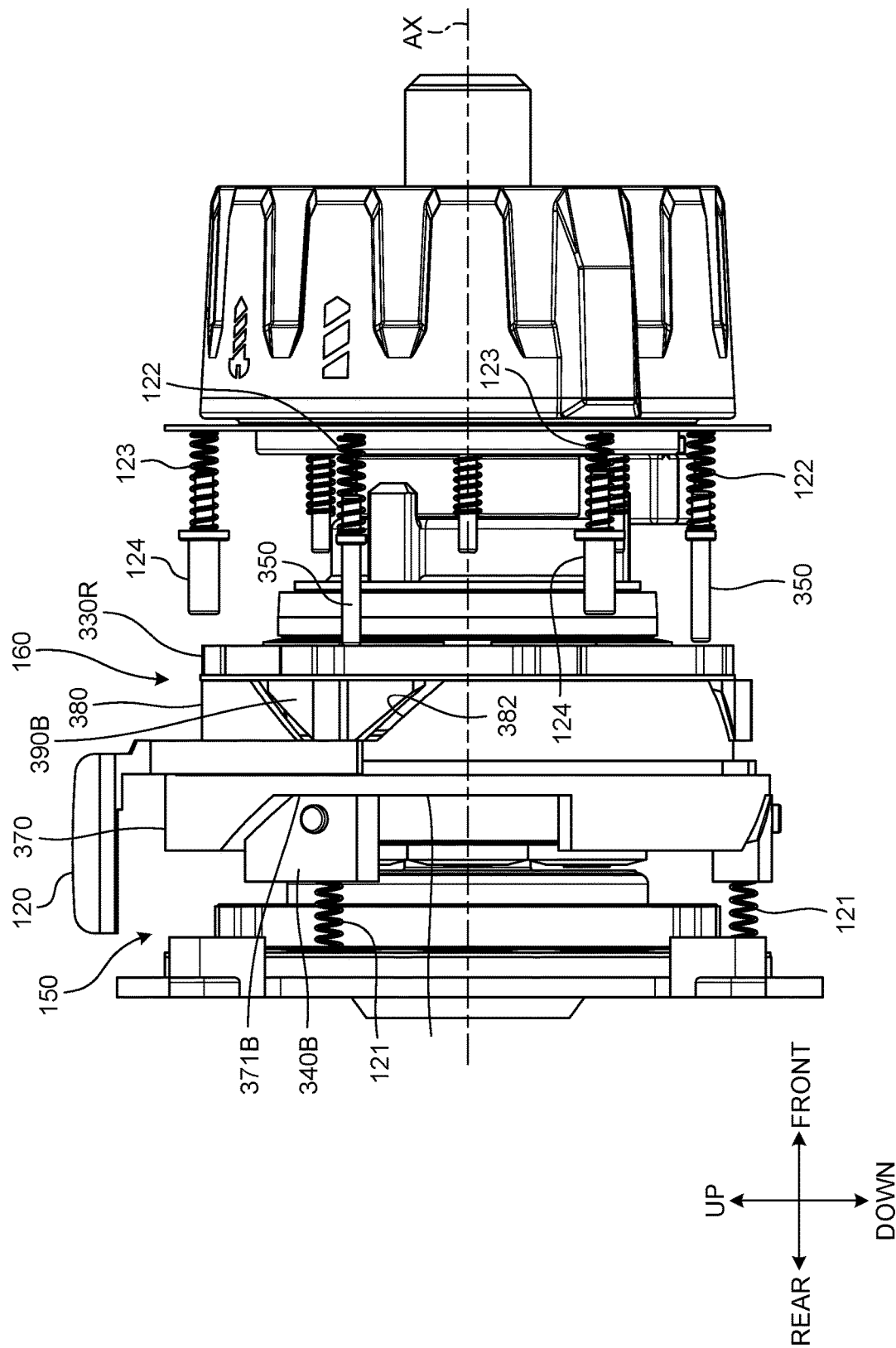
FIG. 24 is a side view of the power transmission mechanism according to the second embodiment.

FIG. 23 is a sectional view of the power transmission mechanism 700 according to the embodiment. FIG. 24 is a side view of the power transmission mechanism 700 according to the embodiment. FIGS. 23 and 24 illustrate a state in which the speed reducing mechanism 300 is set to the medium speed mode.

Figure 25:
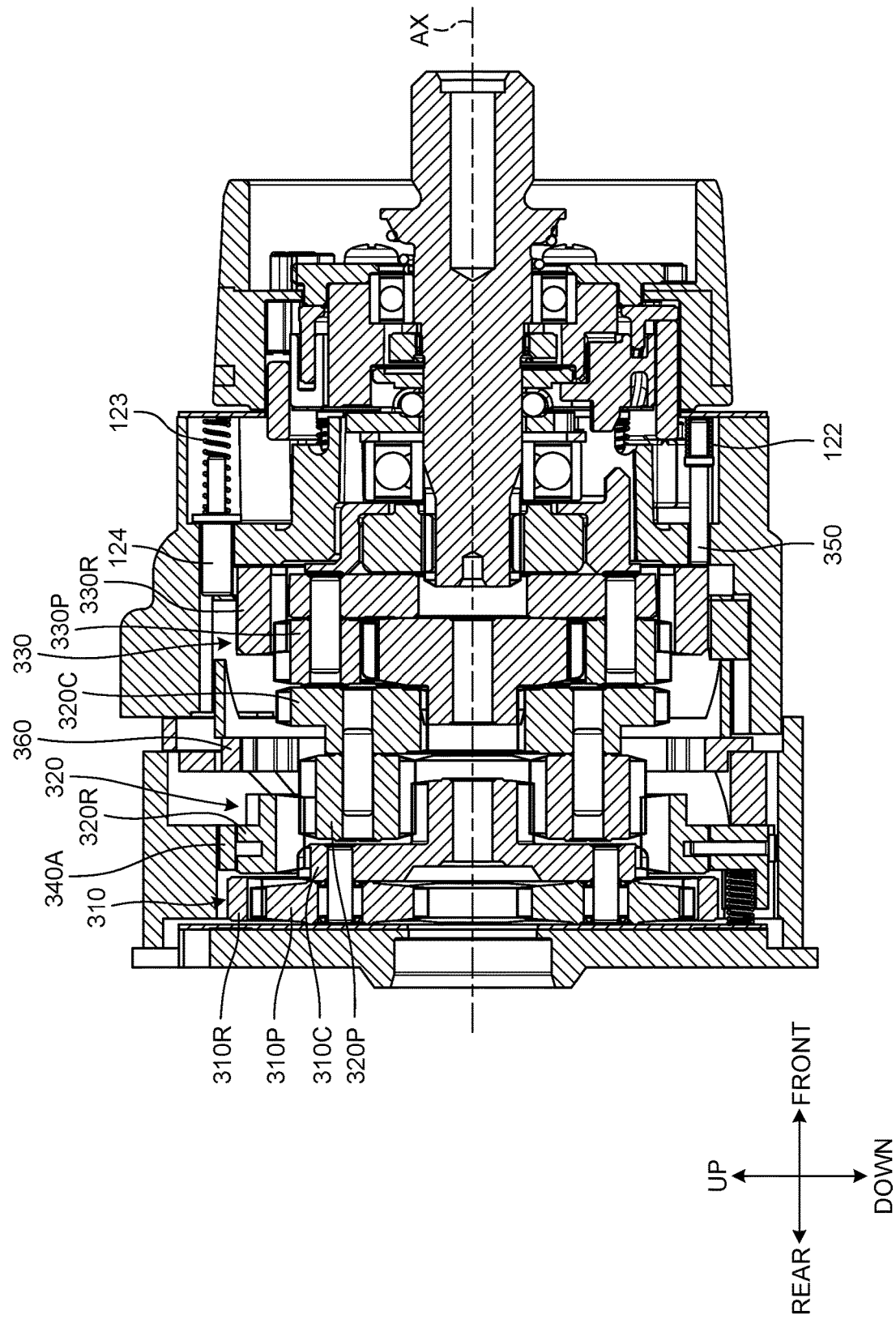
FIG. 25 is a sectional view of the power transmission mechanism according to the second embodiment.
Figure 26:
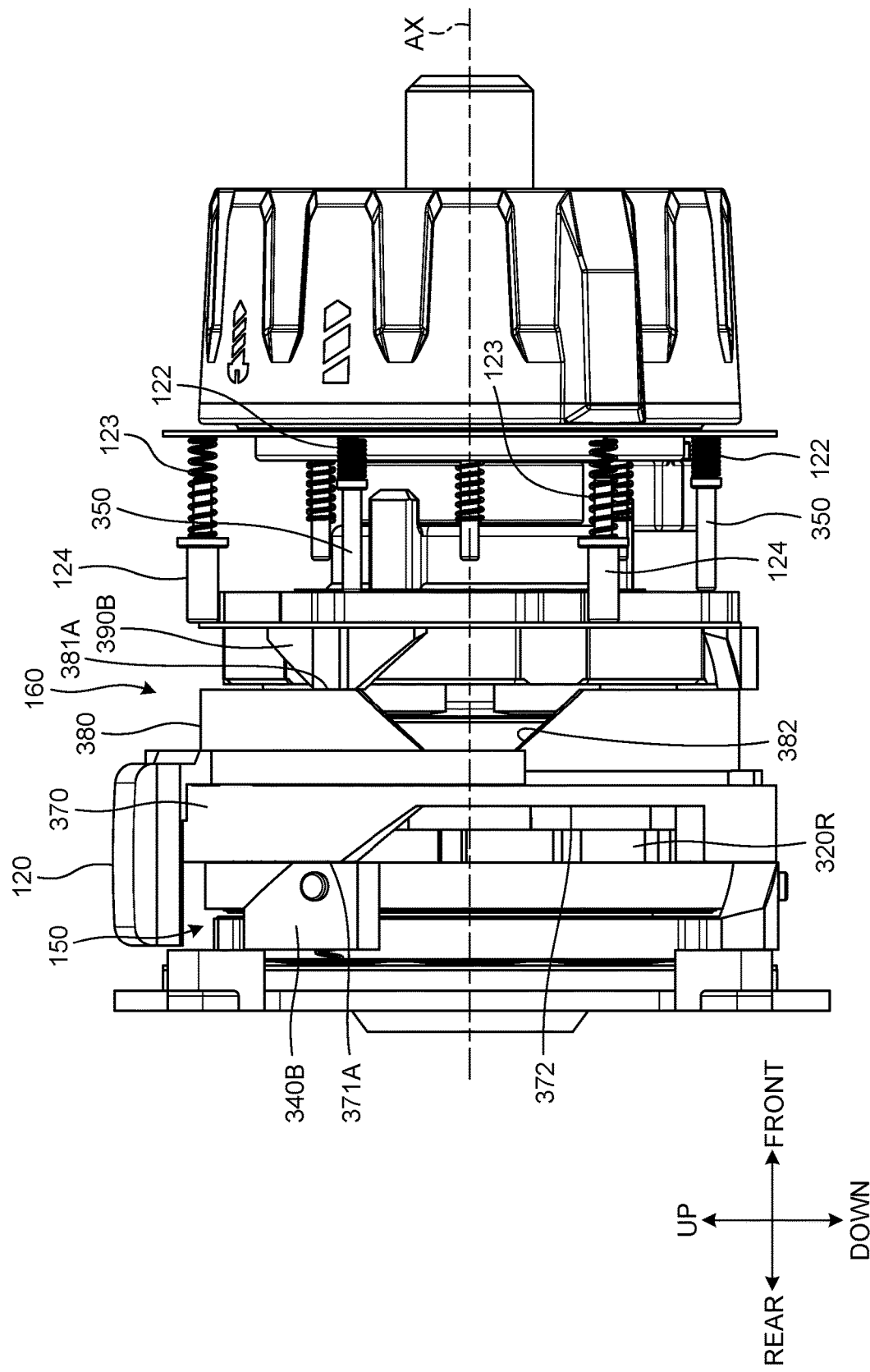
FIG. 26 is a side view of the power transmission mechanism according to the second embodiment.

FIG. 25 is a sectional view of the power transmission mechanism 700 according to the embodiment. FIG. 26 is a side view of the power transmission mechanism 700 according to the embodiment. FIGS. 25 and 26 illustrate a state in which the speed reducing mechanism 300 is set to the high speed mode.

The speed reducing mechanism 300 includes a first planetary gear mechanism 310, a second planetary gear mechanism 320, and a third planetary gear mechanism 330.

The first planetary gear mechanism 310 includes a plurality of planetary gears 310P, a first carrier 310C rotatably supporting each of the planetary gears 310P through a pin 310A, an internal gear 310R disposed around the planetary gears 310P. The planetary gears 310P are disposed around a sun gear (not illustrated) disposed on a front end portion of a rotor shaft 63.

The second planetary gear mechanism 320 includes a sun gear 320S, a plurality of planetary gears 320P disposed around the sun gear 320S, a second carrier 320C rotatably supporting each of the planetary gears 320P through a pin 320A, and an internal gear 320R disposed around the planetary gears 320P. The sun gear 320S is disposed in front of the first carrier 310C. The diameter of the sun gear 320S is smaller than the diameter of the first carrier 310C. The first carrier 310C and the sun gear 320S are integral with each other. The first carrier 310C and the sun gear 320S rotate together.

The third planetary gear mechanism 330 includes a sun gear 330S, a plurality of planetary gears 330P disposed around the sun gear 330S, a third carrier 330C supporting each of the planetary gears 330P in a rotatable manner through a pin 330A, and an internal gear 330R disposed around the planetary gears 330P. In the embodiment, the second carrier 320C and the sun gear 330S are separate bodies. The second carrier 320C has a hole in its central portion. The second carrier 320C has a ring-like shape. The second carrier 320C has gear teeth on its inner circumferential face. A rear portion of the sun gear 330S is inserted into the hole of the second carrier 320C and meshes with the gear teeth provided on the inner circumferential face of the second carrier 320C. Rotation of the second carrier 320C causes the sun gear 330S to rotate. A front portion of the sun gear 330S is disposed in front of the second carrier 320C. The planetary gears 330P are disposed around the front portion of the sun gear 330S.

The internal gear 310R of the first planetary gear mechanism 310 is fixed to the first casing 400A. In each of the low speed mode, the medium speed mode, and the high speed mode, the internal gear 310R does not rotate relative to the first casing 400A. In each of the low speed mode, the medium speed mode, and the high speed mode, a speed reducing function of the first planetary gear mechanism 310 is always enabled.

The second planetary gear mechanism 320 is switched between an enabled mode in which a speed reducing function of the second planetary gear mechanism 320 is enabled and a disabled mode in which the speed reducing function of the second planetary gear mechanism 320 is disabled. Putting the second planetary gear mechanism 320 into the enabled mode includes preventing rotation of the internal gear 320R. Putting the second planetary gear mechanism 320 into the disabled mode includes allowing the rotation of the internal gear 320R. By preventing the rotation of the internal gear 320R, the second planetary gear mechanism 320 is put into the enabled mode. By allowing the rotation of the internal gear 320R, the second planetary gear mechanism 320 is put into the disabled mode.

The third planetary gear mechanism 330 is switched between an enabled mode in which a speed reducing function of the third planetary gear mechanism 330 is enabled and a disabled mode in which the speed reducing function of the third planetary gear mechanism 330 is disabled. Putting the third planetary gear mechanism 330 into the enabled mode includes preventing rotation of the internal gear 330R. Putting the third planetary gear mechanism 330 into the disabled mode includes allowing the rotation of the internal gear 330R. By preventing the rotation of the internal gear 330R, the third planetary gear mechanism 330 is put into the enabled mode. By allowing the rotation of the internal gear 330R, the third planetary gear mechanism 330 is put into the disabled mode.

In the embodiment, a reduction ratio of the second planetary gear mechanism 320 is larger than a reduction ratio of the third planetary gear mechanism 330.

In the embodiment, the low speed mode includes the second planetary gear mechanism 320 being set to the enabled mode and the third planetary gear mechanism 330 being set to the enabled mode. That is, the low speed mode includes a state in which the rotation of the internal gear 320R and the rotation of the internal gear 330R are both prevented.

The medium speed mode includes the second planetary gear mechanism 320 being set to the enabled mode and the third planetary gear mechanism 330 being set to the disabled mode. That is, the medium speed mode includes a state in which the rotation of the internal gear 320R is prevented and the rotation of the internal gear 330R is allowed.

The high speed mode includes the second planetary gear mechanism 320 being set to the disabled mode and the third planetary gear mechanism 330 being set to the enabled mode. That is, the high speed mode includes a state in which the rotation of the internal gear 320R is allowed and the rotation of the internal gear 330R is prevented.

As illustrated in FIGS. 21, 22, 23, 24, 25, and 26, the speed reducing mechanism 300 includes a first moving mechanism 150 and a second moving mechanism 160.

The first moving mechanism 150 moves the internal gear 320R of the second planetary gear mechanism 320 in the front-rear direction. A cam ring 360 is fixed to the first casing 400A. The cam ring 360 is disposed in front of the internal gear 320R. The cam ring 360 has a plurality of cam teeth on its inner circumferential face. The cam teeth are provided and spaced in the circumferential direction. The internal gear 320R has cam teeth 320F on its outer circumferential face. The cam teeth 320F are meshable with the cam teeth of the cam ring 360.

When the internal gear 320R is moved forward by the first moving mechanism 150 and at least partially inserted into the inside of the cam ring 360 so that the cam teeth 320F of the internal gear 320R mesh with the cam teeth of the cam ring 360; the rotation of the internal gear 320R is prevented. That is, the first moving mechanism 150 moving the internal gear 320R forward to prevent the rotation of the internal gear 320R puts the second planetary gear into the enabled mode.

When the internal gear 320R is moved rearward by the first moving mechanism 150 and removed from the inside of the cam ring 360 so that the cam teeth 320F of the internal gear 320R separate from the cam teeth of the cam ring 360; the rotation of the internal gear 320R is allowed. That is, the first moving mechanism 150 moving the internal gear 320R rearward to allow the rotation of the internal gear 320R puts the second planetary gear mechanism 320 into the disabled mode.

When the second planetary gear mechanism 320 is in the enabled mode, the internal gear 320R meshes with only the planetary gears 320P. When the second planetary gear mechanism 320 is in the disabled mode, the internal gear 320R meshes with both the planetary gears 320P and the first carrier 310C.

The first moving mechanism 150 includes a speed switch member 340 and a cam ring 370.

The speed switch member 340 is moveable in the front-rear direction inside the first casing 400A. The speed switch member 340 is coupled to the internal gear 320R. The speed switch member 340 includes a ring portion 340A and a cam portion 340B. The ring portion 340A is disposed around the internal gear 320R. The cam portion 340B is fixed to a part of the outer circumferential face of the ring portion 340A. The speed switch member 340 is coupled to the internal gear 320R through a pin 340D. The internal gear 320R has, on its outer circumferential face, a recess 320D that receives the pin 340D inserted thereinto. Inserting the pin 340D into the recess 320D of the internal gear 320R causes the speed switch member 340 and the internal gear 320R to couple to each other.

A coil spring 121 is connected to the speed switch member 340. A rear end portion of the coil spring 121 is supported on at least a part of the bracket plate 400C. A front end portion of the coil spring 121 is connected to the speed switch member 340. The coil spring 121 biases the speed switch member 340 forward.

The cam ring 370 is rotatably supported on the casing 400. The cam ring 370 is connected to the speed switch lever 120. The cam ring 370 is disposed around the ring portion 340A. When the speed switch lever 120 is operated to be moved in the rotation direction, the cam ring 370 rotates together with the speed switch lever 120.

The cam ring 370 has a cam surface 371 that comes in contact with the cam portion 340B. The cam ring 370 has a recess 372 in which the cam portion 340B can be placed. The cam surface 371 includes a cam surface 371A on a rear end portion of the cam ring 370, and a cam surface 371B inside the recess 372. The speed switch member 340 is biased forward by the coil spring 121. Thus, the cam portion 340B is pressed against the cam surface 371. The cam ring 370 rotates to change the shape of the cam surface 371 in contact with the cam portion 340B, which causes the cam portion 340B to move in the front-rear direction. The cam portion 340B moving in the front-rear direction causes each of the speed switch member 340 and the internal gear 320R to move in the front-rear direction.

As illustrated in FIG. 22, the cam ring 370 rotates to bring the cam portion 340B into contact with the cam surface 371B of the recess 372, so that the speed switch member 340 and the internal gear 320R move forward. The cam ring 370 rotates to bring the cam portion 340B into contact with the cam surface 371A, so that the speed switch member 340 and the internal gear 320R move rearward.

The second moving mechanism 160 moves the internal gear 330R of the third planetary gear mechanism 330 in the front-rear direction. In the embodiment, the casing 400 includes a support plate 400E. The support plate 400E is fixed to the second casing 400B. The support plate 400E is disposed forward of the internal gear 330R. The support plate 400E supports a rotation stop pin 124 through a coil spring 123. The internal gear 330R has a plurality of cam teeth 330F on its outer circumferential face. The cam tooth 330F is contactable with the rotation stop pin 124. The contact between the cam tooth 330F and the rotation stop pin 124 prevents the rotation of the internal gear 330R.

When the internal gear 330R is moved forward by the second moving mechanism 160 and the cam tooth 330F comes into contact with the rotation stop pin 124, the rotation of the internal gear 330R is prevented. That is, the second moving mechanism 160 moving the internal gear 330R forward to prevent the rotation of the internal gear 330R puts the third planetary gear mechanism 330 into the enabled mode.

When the internal gear 330R is moved rearward by the second moving mechanism 160 and the cam tooth 330F separates from the rotation stop pin 124, the rotation of the internal gear 330R is allowed. That is, the second moving mechanism 160 moving the internal gear 330R rearward to allow the rotation of the internal gear 330R puts the third planetary gear mechanism 330 into the disabled mode.

When the third planetary gear mechanism 330 is in the enabled mode, the internal gear 330R meshes with only the planetary gears 330P. When the third planetary gear mechanism 330 is in the disabled mode, the internal gear 330R meshes with both the planetary gears 330P and the second carrier 320C.

The second moving mechanism 160 includes a speed switch member 350 and a cam ring 380.

The speed switch member 350 is in contact with the front face of the internal gear 330R. The speed switch member 350 includes a pin disposed forward of the internal gear 330R. A coil spring 122 is connected to the speed switch member 350. A front end portion of the coil spring 122 is supported on at least a part of the support plate 400E. A rear end portion of the coil spring 122 is connected to the speed switch member 350. The coil spring 122 biases the speed switch member 350 forward.

The cam ring 380 is rotatably supported on the casing 400. The cam ring 380 is connected to the speed switch lever 120. When the speed switch lever 120 is operated to be moved in the rotation direction, the cam ring 380 rotates together with the speed switch lever 120.

A speed switch member 390 is disposed around the internal gear 330R. The speed switch member 390 includes an annular plate portion 390A fixed to the outer circumferential face of the internal gear 330R, and a cam portion 390B fixed to the annular plate portion 390A.

The cam ring 380 has a cam surface 381 that comes in contact with the cam portion 390B. The cam ring 380 has a recess 382 in which the cam portion 390B can be placed. The cam surface 381 includes a cam surface 381A on a front end portion of the cam ring 380, and a cam surface 381B inside the recess 382. The internal gear 330R is biased rearward by the coil spring 122 through the speed switch member 350. Thus, the cam portion 390B is pressed against the cam surface 381. The cam ring 380 rotates to change the shape of the cam surface 381 in contact with the cam portion 390B, which causes the cam portion 390B to move in the front-rear direction. The cam portion 390B moving in the front-rear direction causes each of the speed switch member 390 and the internal gear 330R to move in the front-rear direction.

As illustrated in FIG. 22, the cam ring 380 rotates to bring the cam portion 390B into contact with the cam surface 381B, so that the speed switch member 390 and the internal gear 330R move forward. The cam ring 380 rotates to bring the cam portion 390B into contact with the cam surface 381A, the speed switch member 390 and the internal gear 330R move rearward.

As illustrated in FIGS. 23 and 24, when the speed switch lever 120 is moved to the middle position in the movable range so that the speed reducing mechanism 300 is put into the middle speed mode, the cam ring 380 rotates to place the cam portion 390B in the recess 382 of the cam ring 380. The cam ring 380 rotates to bring the cam portion 390B into contact with the cam surface 381B of the recess 382, so that the speed switch member 390 and the internal gear 330R move forward. Accordingly, the third planetary gear mechanism 330 is put into the disabled mode. In a state in which the speed switch lever 120 is placed at the middle position in the movable range, the cam portion 340B is placed in the recess 372 of the cam ring 370. Thus, the second planetary gear mechanism 320 is put into the enabled mode.

As illustrated in FIGS. 25 and 26, when the speed switch lever 120 is moved to the right position in the movable range so that the speed reducing mechanism 300 is put into the high speed mode, the cam ring 370 rotates to bring the cam portion 340B into contact with the cam surface 371A of the cam ring 370 outside the recess 372. The cam ring 370 rotates to bring the cam portion 340B into contact with the cam surface 371A, so that the speed switch member 340 and the internal gear 320R move rearward. Accordingly, the second planetary gear mechanism 320 is put into the disabled mode. When the speed switch lever 120 is moved to the right position in the movable range so that the speed reducing mechanism 300 is put into the high speed mode, the cam ring 380 rotates to bring the cam portion 390B into contact with the cam surface 381A outside the recess 382. The cam ring 380 rotates to bring the cam portion 390B into contact with the cam surface 381A, the speed switch member 390 and the internal gear 330R move forward. Accordingly, the third planetary gear mechanism 330 is put into the enabled mode.

Effect

As described above, the speed mode of the speed reducing mechanism 300 is switched between the low speed mode, the medium speed mode, and the high speed mode. This enables an operator to set the speed reducing mechanism 300 to an appropriate speed mode in accordance with details of an operation.

Third Embodiment

A third embodiment will be described. Elements identical or equivalent to those in the embodiments described above are designated by the same reference signs as in the above embodiments, and description for these elements will be simplified or omitted.

Figure 29:
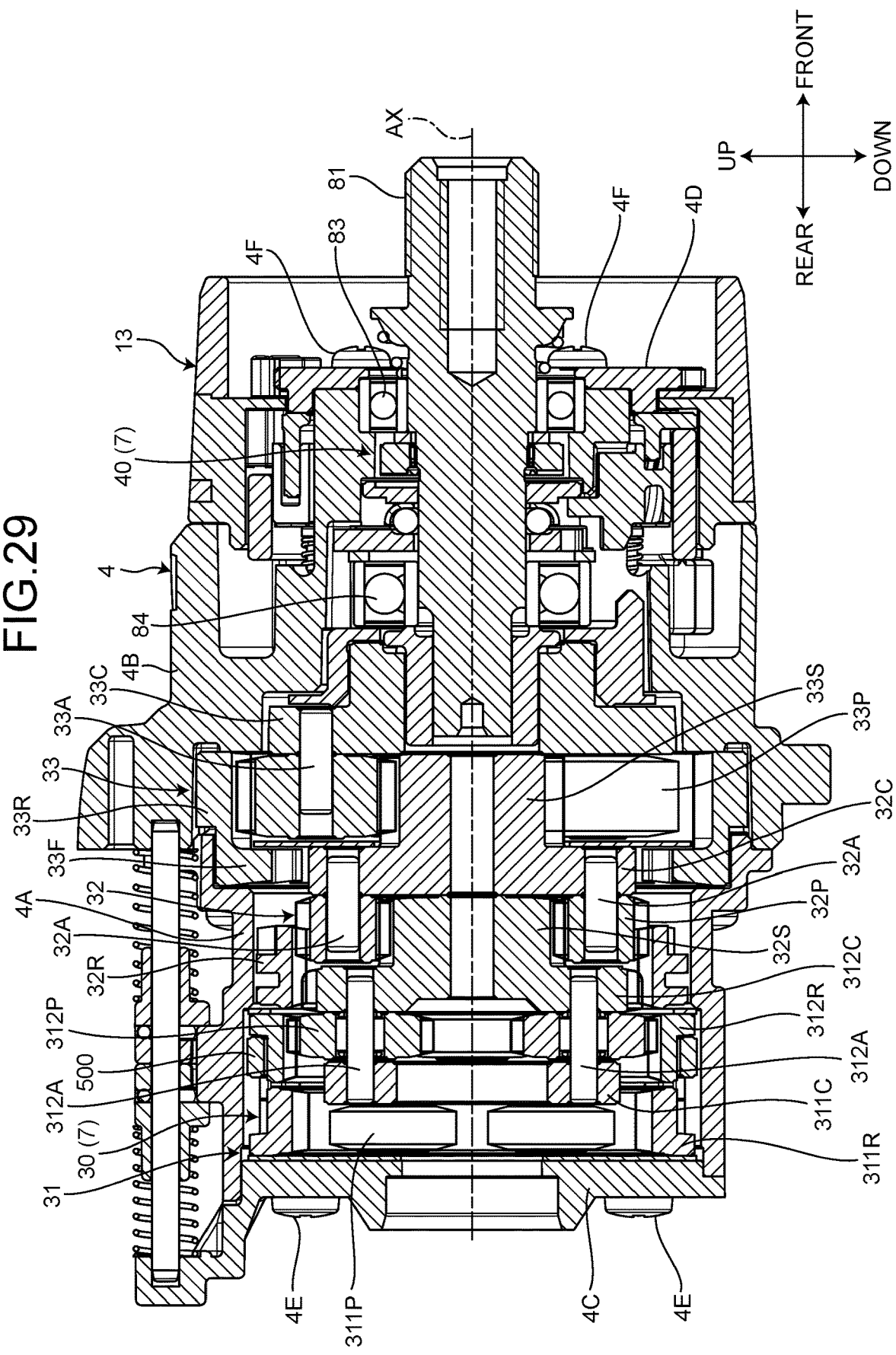
FIG. 29 is a sectional view of a part of the driver drill according to the third embodiment.

FIG. 27 is a front perspective view of a part of a driver drill 1 according to the embodiment. FIG. 28 is a side view of a part of the driver drill 1 according to the embodiment. FIG. 29 is a sectional view of a part of the driver drill 1 according to the embodiment. As with the embodiments described above, the driver drill 1 is an electric driver drill. As illustrated in FIGS. 27, 28, and 29, a casing 4 accommodates therein a power transmission mechanism 7. The casing 4 includes a first casing 4A, a second casing 4B, a bracket plate 4C, and a stop plate 4D. The second casing 4B is disposed in front of the first casing 4A. A mode switch ring 13 is disposed in front of the second casing 4B. The first casing 4A is made of a synthetic resin. The second casing 4B is made of metal. In the embodiment, the second casing 4B is made of aluminum. The casing 4 is disposed in front of a motor housing 21. The first casing 4A and the second casing 4B each have a cylindrical shape.

The first casing 4A is fixed to a rear end portion of the second casing 4B. The bracket plate 4C is disposed covering a rear end opening of the first casing 4A. The bracket plate 4C is fixed to a rear end portion of the first casing 4A with a screw 4E. The stop plate 4D is disposed covering a front end opening of the second casing 4B. The stop plate 4D is fixed to a front end portion of the second casing 4B with a screw 4F.

The power transmission mechanism 7 includes a speed reducing mechanism 30. The speed reducing mechanism 30 includes a first planetary gear mechanism 31, a second planetary gear mechanism 32, and a third planetary gear mechanism 33. At least a part of the first planetary gear mechanism 31 is disposed forward of a motor 6. The second planetary gear mechanism 32 is disposed forward of the first planetary gear mechanism 31. The third planetary gear mechanism 33 is disposed forward of the second planetary gear mechanism 32. The first planetary gear mechanism 31 is operated by a rotational force of the motor 6. The second planetary gear mechanism 32 is operated by a rotational force of the first planetary gear mechanism 31. The third planetary gear mechanism 33 is operated by a rotational force of the second planetary gear mechanism 32. The first planetary gear mechanism 31 may be referred to as the first planetary gear speed change mechanism. The second planetary gear mechanism 32 may be referred to as the second planetary gear speed change mechanism. The third planetary gear mechanism 33 may be referred to as the third planetary gear speed change mechanism.

A speed switch lever 12 is operated to change a speed mode of the speed reducing mechanism 30. The speed switch lever 12 is provided above the casing 4. The speed switch lever 12 is movable in the front-rear direction. The speed switch lever 12 is operated by an operator. The speed mode of the speed reducing mechanism 30 includes a low speed mode (first speed), a medium speed mode (second speed), and a high speed mode (third speed). By operating the speed switch lever 12 to be moved to the front position in a movable range, the speed mode of the speed reducing mechanism 30 is set to the low speed mode (first speed). By operating the speed switch lever 12 to be moved to the middle position in the movable range, the speed mode of the speed reducing mechanism 30 is set to the medium speed mode (second speed). By operating the speed switch lever 12 to be moved to the rear position in the movable range, the speed mode of the speed reducing mechanism 30 is set to the high speed mode (third speed).

Figure 30:
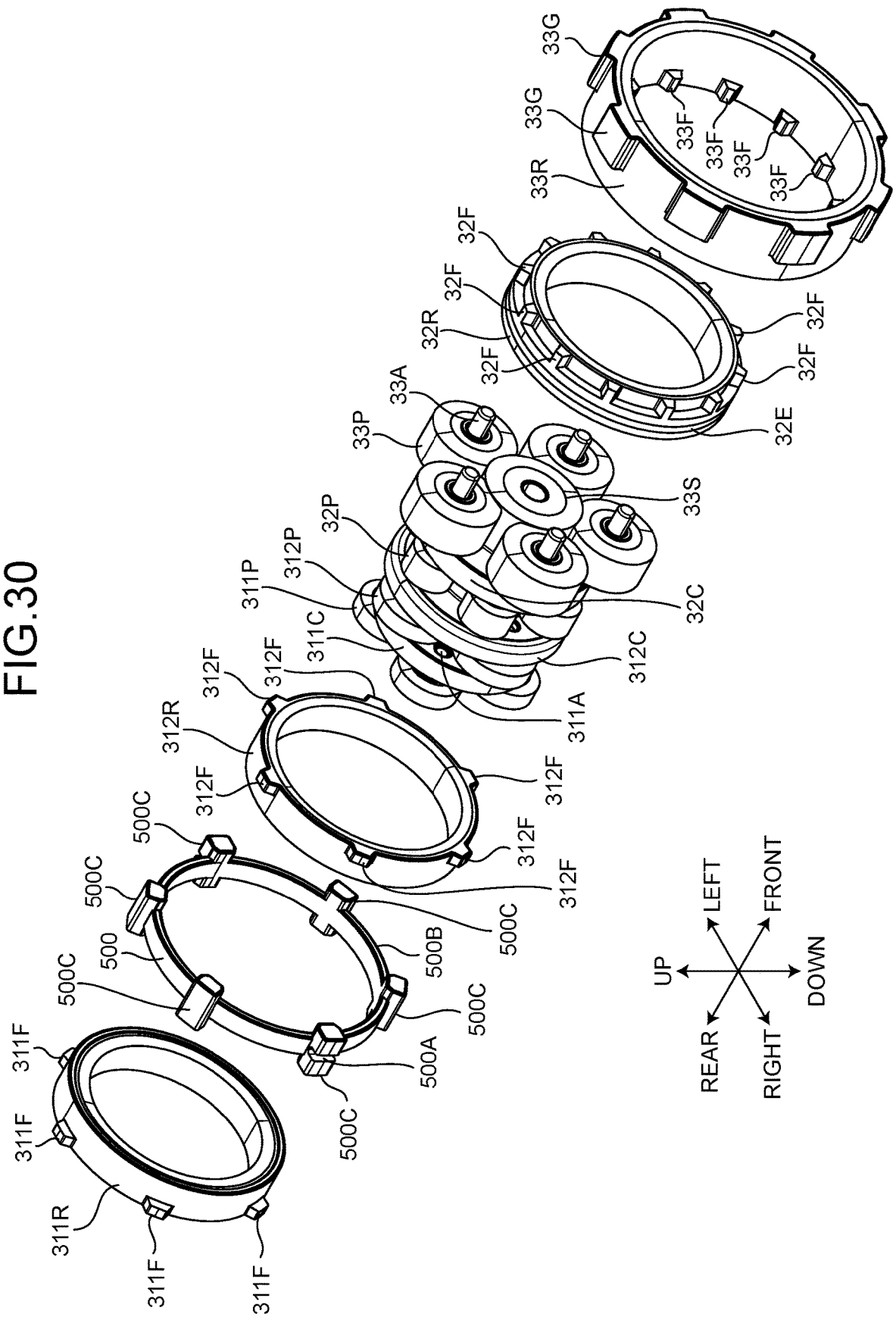
FIG. 30 is an exploded perspective view of a speed reducing mechanism according to the third embodiment.

FIG. 30 is an exploded front perspective view of the speed reducing mechanism 30 according to the embodiment. FIG. 31 is a rear perspective view of a part of the speed reducing mechanism 30 according to the embodiment. FIG. 32 is a cutaway rear perspective view of a part of the speed reducing mechanism 30 according to the embodiment.

The first planetary gear mechanism 31 includes a plurality of planetary gears 311P, a plurality of planetary gears 312P disposed forward of the planetary gears 311P, a first stage carrier 311C supporting each of the planetary gears 311P and the planetary gears 312P, a second stage carrier 312C supporting each of the planetary gears 312P, an internal gear 311R disposed around the planetary gears 311P, and an internal gear 312R disposed around the planetary gears 312P. Although not illustrated in FIGS. 30, 31, and 32, as with the above embodiments, a pinion gear 31S is provided on a front end portion of a rotor shaft 63. The pinion gear 31S functions as a sun gear of the first planetary gear mechanism 31. The pinion gear 31S is disposed in front of a stator 61. The pinion gear 31S may be directly or indirectly rotated by a rotor 62. The planetary gears 311P mesh with the pinion gear 31S. The internal gear 311R meshes with the planetary gears 311P.

The second planetary gear mechanism 32 includes a sun gear 32S, a plurality of planetary gears 32P disposed around the sun gear 32S, a second carrier 32C supporting the planetary gears 32P, and an internal gear 32R disposed around the planetary gears 32P. The sun gear 32S is disposed in front of the internal gear 311R and the internal gear 312R. The sun gear 32S may be directly or indirectly rotated by the planetary gears 311P and the planetary gears 312P. The planetary gears 32P mesh with the sun gear 32S. The internal gear 32R meshes with the planetary gears 32P.

The third planetary gear mechanism 33 includes a sun gear 33S, a plurality of planetary gears 33P disposed around the sun gear 33S, a third carrier 33C supporting the planetary gears 33P, and an internal gear 33R disposed around the planetary gears 33P.

As with the above embodiments, the planetary gears 311P are disposed around a larger-diameter portion 311S of the pinion gear 31S. The planetary gears 312P are disposed around a smaller-diameter portion 312S of the pinion gear 31S.

The casing 4 (gear case) is disposed in front of the stator 61. The casing 4 accommodates therein the pinion gear 31S, the planetary gears 311P, the planetary gears 312P, the internal gear 311R, the internal gear 312R, the sun gear 32S, and the planetary gears 32P. As with the above embodiments, a spindle 81 is disposed in front of the internal gear 32R. The spindle 81 may be directly or indirectly rotated by the planetary gears 32P. A chuck 82 is fixed to a front portion of the spindle 81.

The planetary gear 311P is rotatably supported on a first pin 311A. The first pin 311A is supported on the first stage carrier 311C. The first pin 311A projects rearward from the rear face of the first stage carrier 311C. A plurality of the first pins 311A are provided and spaced in the circumferential direction. In the embodiment, four first pins 311A are evenly spaced in the circumferential direction. Each of the planetary gears 311P is supported on a corresponding one of the (four) first pins 311A. The planetary gears 311P are disposed rearward of the first stage carrier 311C. The first stage carrier 311C rotatably supports the planetary gears 311P through the first pins 311A.

The planetary gear 312P is rotatably supported on a second pin 312A. The second pin 312A is supported on each of the first stage carrier 311C and the second stage carrier 312C. The first stage carrier 311C is disposed rearward of the second stage carrier 312C. A rear end portion of the second pin 312A is supported on the first stage carrier 311C. A front end portion of the second pin 312A is supported on the second stage carrier 312C. A plurality of the second pins 312A are provided and spaced in the circumferential direction. In the embodiment, four second pins 312A are evenly spaced in the circumferential direction. In the circumferential direction, the positions of the first pins 311A differ from the positions of the second pins 312A. In the circumferential direction, each of the second pins 312A is disposed between the first pins 311A adjacent to each other. Each of the planetary gears 312P is supported on a corresponding one of the (four) second pins 312A. In the front-rear direction (axial direction), the planetary gears 312P are disposed between the first stage carrier 311C and the second stage carrier 312C. Each of the first stage carrier 311C and the second stage carrier 312C supports the planetary gears 312P in a rotatable manner through the second pins 312A. The second stage carrier 312C has gear teeth on its outer circumferential portion.

The internal gear 311R is disposed around the planetary gears 311P. The internal gear 312R is disposed around the planetary gears 312P. The outer diameter of the planetary gear 311P is smaller than the outer diameter of the planetary gear 312P.

The second planetary gear mechanism 32 includes the sun gear 32S, the planetary gears 32P disposed around the sun gear 32S, the second carrier 32C supporting the planetary gears 32P, and the internal gear 32R disposed around the planetary gears 32P. The sun gear 32S is disposed in front of the second stage carrier 312C. The diameter of the sun gear 32S is smaller than the diameter of the second stage carrier 312C. The second stage carrier 312C and the sun gear 32S are integral with each other. The second stage carrier 312C and the sun gear 32S rotate together. The second carrier 32C is provided with pins 32A. Each of the planetary gears 32P is rotatably supported on a corresponding one of the pins 32A. The second carrier 32C supports the planetary gears 32P in a rotatable manner through the pins 32A.

The third planetary gear mechanism 33 includes the sun gear 33S, the planetary gears 33P disposed around the sun gear 33S, the third carrier 33C supporting the planetary gears 33P, and the internal gear 33R disposed around the planetary gears 33P. The sun gear 33S is disposed in front of the second carrier 32C. The diameter of the sun gear 33S is smaller than the diameter of the second carrier 32C. The second carrier 32C and the sun gear 33S are integral with each other. The second carrier 32C and the sun gear 33S rotate together. The third carrier 33C is provided with pins 33A. Each of the planetary gears 33P is rotatably supported on a corresponding one of the pins 33A. The third carrier 33C supports the planetary gears 33P in a rotatable manner through the pins 33A.

Figure 34:
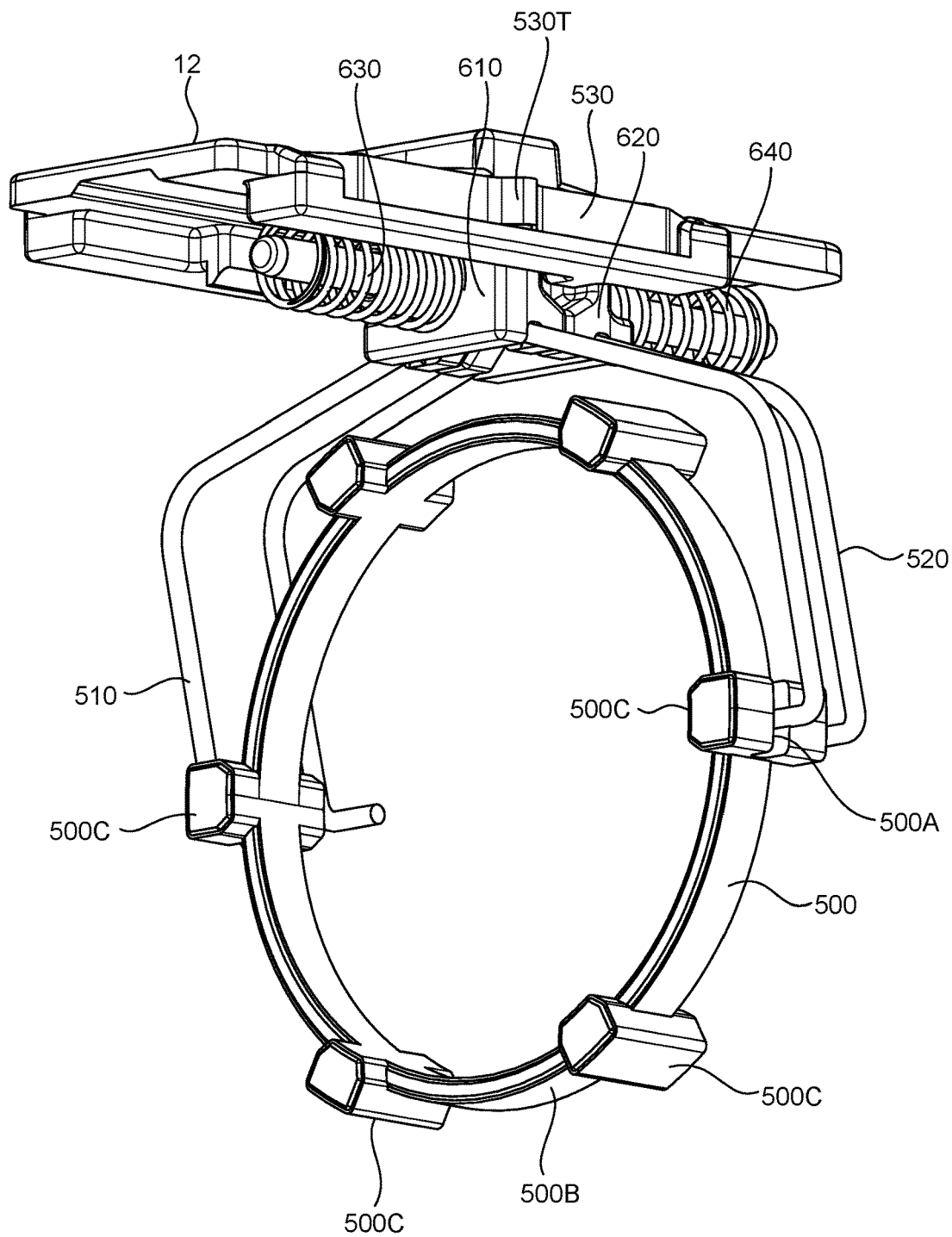
FIG. 34 is a lower right rear perspective view of the first speed switch mechanism and the second speed switch mechanism according to the third embodiment.

FIG. 33 is a side view of a first speed switch mechanism 71 and a second speed switch mechanism 72 according to the embodiment. FIG. 34 is a lower right rear perspective view of the first speed switch mechanism 71 and the second speed switch mechanism 72 according to the embodiment. As with the above embodiments, the speed reducing mechanism 30 includes the first speed switch mechanism 71 and the second speed switch mechanism 72.

The first speed switch mechanism 71 performs switching between a first speed reducing mode in which rotation of the internal gear 312R of the first planetary gear mechanism 31 is prevented and rotation of the internal gear 311R thereof is allowed and a second speed reducing mode in which the rotation of the internal gear 311R of the first planetary gear mechanism 31 is prevented and the rotation of the internal gear 312R thereof is allowed.

The first speed switch mechanism 71 includes a change ring 500, a first switch wire 510, a first movable member 610, and a first spring 630.

The change ring 500 has a ring portion 500B and a plurality of projections 500C fixed to the ring portion 500B. The projections 500C are disposed in guide grooves provided on the inner circumferential face of the first casing 4A. The guide grooves on the inner circumferential face of the first casing 4A extend in the front-rear direction. The projections 500C disposed in the guide grooves of the first casing 4A prevent rotation of the change ring 500 relative to the first casing 4A. The change ring 500 is movable in the front-rear direction inside the first casing 4A. The change ring 500 can move in the front-rear direction with the projections 500C guided by the guide grooves provided on the inner circumferential face of the first casing 4A. The change ring 500 is disposed around at least one of the internal gear 311R and the internal gear 312R.

The change ring 500 is coupled to the first switch wire 510. The change ring 500 is movable in the front-rear direction inside the first casing 4A. The change ring 500 moving forward puts the first planetary gear mechanism 31 into the first speed reducing mode, whereas the change ring 500 moving rearward puts the first planetary gear mechanism 31 into the second speed reducing mode.

In the embodiment, a reduction ratio of a rear stage unit (first stage unit) of the first planetary gear mechanism 31 including the planetary gears 311P and the internal gear 311R is different from a reduction ratio of a front stage unit (second stage unit) of the first planetary gear mechanism 31 including the planetary gears 312P and the internal gear 312R. The reduction ratio of the front stage unit including the planetary gears 312P and the internal gear 312R is larger than the reduction ratio of the rear stage unit including the planetary gears 311P and the internal gear 311R. When the pinion gear 31S rotates at a constant rotation speed, a rotation speed of the first carrier 31C in the first speed reducing mode is lower than a rotation speed of the first carrier 31C in the second speed reducing mode.

The first switch wire 510 is disposed outside the first casing 4A. The first switch wire 510 is movable in the front-rear direction outside the first casing 4A. A tip portion of the first switch wire 510 is inserted into a groove 500A provided on the change ring 500. The first casing 4A has a through hole 4H. The tip portion of the first switch wire 510 is disposed inside the first casing 4A through the through hole 4H. The tip portion of the first switch wire 510 is inserted into the groove 500A inside the first casing 4A. An upper portion of the first switch wire 510 is fixed to the first movable member 610. The first movable member 610 is connected to the speed switch lever 12. The first movable member 610 is guided by a guide rod 600 in the front-rear direction. The guide rod 600 is disposed extending in the front-rear direction. The guide rod 600 is fixed to the casing 4. As illustrated in FIG. 29, in the embodiment, a rear end portion of the guide rod 600 is fixed to the bracket plate 4C. A front end portion of the guide rod 600 is fixed to the second casing 4B. The first movable member 610 has a first guide hole extending in the front-rear direction. The guide rod 600 extends through the first guide hole of the first movable member 610. The first spring 630 is a compression spring. A rear end portion of the first spring 630 is supported on the bracket plate 4C. A front end portion of the first spring 630 is connected to the first movable member 610. The first spring 630 generates an elastic force to move the first movable member 610 forward (in one direction). The first spring 630 biases the change ring 500 forward through the first movable member 610 and the first switch wire 510.

The internal gear 311R has a plurality of cam teeth 311F on its outer circumferential face. The internal gear 312R has a plurality of cam teeth 312F on its outer circumferential face. The projection 500C is a contact member that comes into contact with either the cam tooth 311F of the internal gear 311R or the cam tooth 312F of the internal gear 312R. The projection 500C moves to a position facing the outer circumferential face of the internal gear 311R and a position facing the outer circumferential face of the internal gear 312R while being guided by the guide groove provided on the inner circumferential face of the first casing 4A. Contact between the cam tooth 311F and the projection 500C prevents the rotation of the internal gear 311R. Contact between the cam teeth 312F and the projections 500C prevents the rotation of the internal gear 312R.

The change ring 500 is connected to the speed switch lever 12 through the first switch wire 510 and the first movable member 610. The speed switch lever 12 is operated to move the first movable member 610 in the front-rear direction. By operating the speed switch lever 12 to be moved in the front-rear direction, the first movable member 610 and the first switch wire 510 move in the front-rear direction and the change ring 500 move in the front-rear direction.

When the first movable member 610, the first switch wire 510, and the change ring 500 move forward so that the change ring 500 is placed around the internal gear 312R and the projections 500C face the outer circumferential face of the internal gear 312R; the projections 500C come into contact with the cam teeth 312F. This prevents the rotation of the internal gear 312R. That is, the first movable member 610, the first switch wire 510, and the change ring 500 moving forward to prevent the rotation of the internal gear 312R puts the first planetary gear mechanism 31 into the first speed reducing mode.

When the first movable member 610, the first switch wire 510, and the change ring 500 move rearward so that the change ring 500 is placed around the internal gear 311R and the projections 500C face the outer circumferential face of the internal gear 311R; the projections 500C come into contact with the cam teeth 311F. This prevents the rotation of the internal gear 311R. That is, the first movable member 610, the first switch wire 510, and the change ring 500 moving rearward to prevent the rotation of the internal gear 311R puts the first planetary gear mechanism 31 into the second speed reducing mode.

The first movable member 610 is capable of switching the internal gear 311R and the internal gear 312R between a rotation-fixed state and a rotation-allowed state relative to the casing 4 (gear case).

The second speed switch mechanism 72 performs switching between an enabled mode in which a speed reducing function of the second planetary gear mechanism 32 is enabled and a disabled mode in which the speed reducing function of the second planetary gear mechanism 32 is disabled. Putting the second planetary gear mechanism 32 into the enabled mode includes preventing rotation of the internal gear 32R. Putting the second planetary gear mechanism 32 into the disabled mode includes allowing the rotation of the internal gear 32R. By preventing the rotation of the internal gear 32R, the second planetary gear mechanism 32 is put into the enabled mode. By allowing the rotation of the internal gear 32R, the second planetary gear mechanism 32 is put into the disabled mode.

The second speed switch mechanism 72 includes a second switch wire 520 coupled to the internal gear 32R, cam teeth 33F on the internal gear 33R, a second movable member 620, and a second spring 640.

The second switch wire 520 is disposed outside the first casing 4A. The second switch wire 520 is movable in the front-rear direction outside the first casing 4A. A tip portion of the second switch wire 520 is inserted into a groove 32E on the internal gear 32R. The first casing 4A has a through hole 4J. The tip portion of the second switch wire 520 is disposed inside the first casing 4A through the through hole 4J. The tip portion of the second switch wire 520 is inserted into the groove 32E inside the first casing 4A. An upper portion of the second switch wire 520 is fixed to the second movable member 620. The second movable member 620 is connected to the speed switch lever 12. The second movable member 620 is disposed forward of the first movable member 610. The second movable member 620 is guided by the guide rod 600 in the front-rear direction. The second movable member 620 has a second guide hole extending in the front-rear direction. The guide rod 600 extends through the second guide hole of the second movable member 620. The second spring 640 is a compression spring. A front end portion of the second spring 640 is supported on the second casing 4B. A rear end portion of the second spring 640 is connected to the second movable member 620. The second spring 640 generates an elastic force to move the second movable member 620 rearward (in another direction). The second spring 640 biases the internal gear 32R rearward through the second movable member 620 and the second switch wire 520.

The internal gear 32R has a plurality of cam teeth 32F on its outer circumferential face. The cam teeth 32F are meshable with the cam teeth 33F of the internal gear 33R. Inserting the internal gear 32R into the inside of the internal gear 33R causes the cam teeth 33F of the internal gear 33R to prevent the rotation of the internal gear 32R.

The internal gear 33R is disposed in front of the internal gear 32R. The internal gear 33R is fixed to the second casing 4B. The internal gear 33R has cam teeth 33G on its outer circumferential face. The cam teeth 33G are inserted into recesses provided on the inner circumferential face of the second casing 4B. Inserting the cam teeth 33G into the recesses on the inner circumferential face of the second casing 4B prevents relative movement between the internal gear 33R and the second casing 4B.

The speed switch lever 12 is operated to move the second movable member 620 in the front-rear direction. By operating the speed switch lever 12 to be moved in the front-rear direction, the second movable member 620 and the second switch wire 520 move in the front-rear direction and the internal gear 32R move in the front-rear direction. The internal gear 32R moving in the front-rear direction causes switching between a state in which the internal gear 32R is inserted into the internal gear 33R and a state in which the internal gear 32R is removed from the internal gear 33R.

When the second movable member 620, the second switch wire 520, and the internal gear 32R move forward so that at least a part of the internal gear 32R is inserted into the inside of the internal gear 33R and the cam teeth 32F of the internal gear 32R mesh with the cam teeth 33F of the internal gear 33R; the rotation of the internal gear 32R is prevented. That is, the second movable member 620, the second switch wire 520, and the internal gear 32R moving forward to prevent the rotation of the internal gear 32R puts the second planetary gear mechanism 32 into the enabled mode.

When the second movable member 620, the second switch wire 520, and the internal gear 32R move rearward so that the internal gear 32R is removed from the inside of the internal gear 33R and the cam teeth 32F of the internal gear 32R separate from the cam teeth 33F of the internal gear 33R; the rotation of the internal gear 32R is allowed. That is, the second movable member 620, the second switch wire 520, and the internal gear 32R moving rearward to allow the rotation of the internal gear 32R puts the second planetary gear mechanism 32 into disabled mode.

The second movable member 620 is capable of switching the internal gear 32R between a rotation-fixed state and a rotation-allowed state relative to the casing 4 (gear case).

When the second planetary gear mechanism 32 is in the enabled mode, the internal gear 32R meshes with only the planetary gears 32P. When the second planetary gear mechanism 32 is in the disabled mode, the internal gear 32R meshes with both the planetary gears 32P and the first carrier 31C.

As described above, in the embodiment, the speed mode of the speed reducing mechanism 30 includes the low speed mode (first speed), the medium speed mode (second speed), and the high speed mode (third speed).

The movable range of the speed switch lever 12 is defined in the front-rear direction. By operating the speed switch lever 12 to be moved to the front position in the movable range, the speed mode of the speed reducing mechanism 30 is set to the low speed mode (first speed). By operating the speed switch lever 12 to be moved to the middle position in the movable range, the speed mode of the speed reducing mechanism 30 is set to the medium speed mode (second speed). By operating the speed switch lever 12 to be moved to the rear position in the movable range, the speed mode of the speed reducing mechanism 30 is set to the high speed mode (third speed).

The low speed mode includes setting the first planetary gear mechanism 31 to the first speed reducing mode and setting the second planetary gear mechanism 32 to the enabled mode. By operating the speed switch lever 12 to be moved to the front position in the movable range to move the second movable member 620 forward, the first planetary gear mechanism 31 is set to the first speed reducing mode and the second planetary gear mechanism 32 is set to the enabled mode.

The medium speed mode includes setting the first planetary gear mechanism 31 to the first speed reducing mode and setting the second planetary gear mechanism 32 to the disabled mode. By operating the speed switch lever 12 to be moved to the middle position in the movable range, the first planetary gear mechanism 31 is set to the first speed reducing mode and the second planetary gear mechanism 32 is set to the disabled mode.

The high speed mode includes setting the first planetary gear mechanism 31 to the second speed reducing mode and setting the second planetary gear mechanism 32 to the disabled mode. By operating the speed switch lever 12 to be moved to the rear position in the movable range to move the first movable member 610 rearward, the first planetary gear mechanism 31 is set to the second speed reducing mode and the second planetary gear mechanism 32 is set to the disabled mode.

Figure 35:
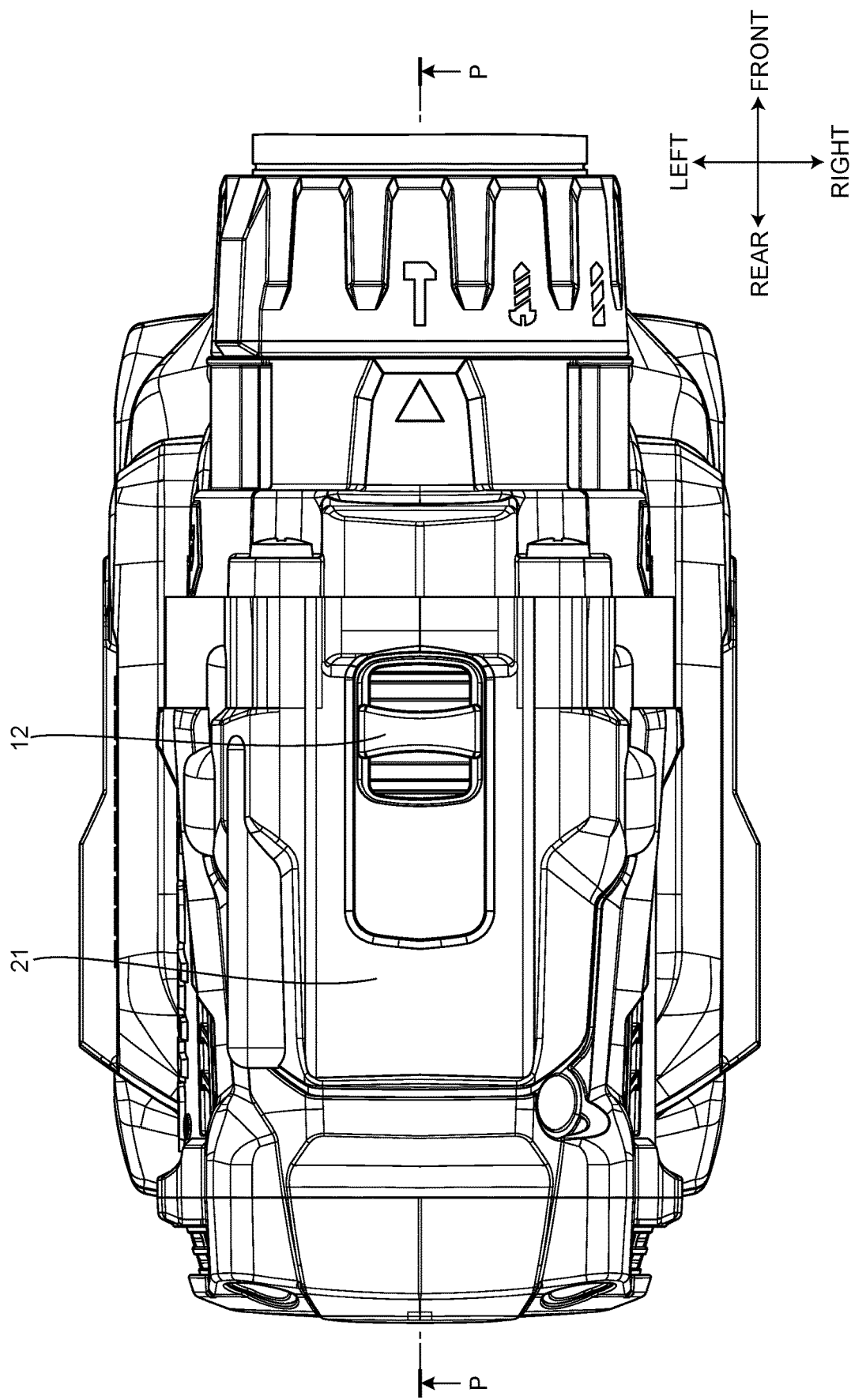
FIG. 35 is a top view of the driver drill when the speed reducing mechanism according to the third embodiment is set to a low speed mode (first speed)
Figure 36:
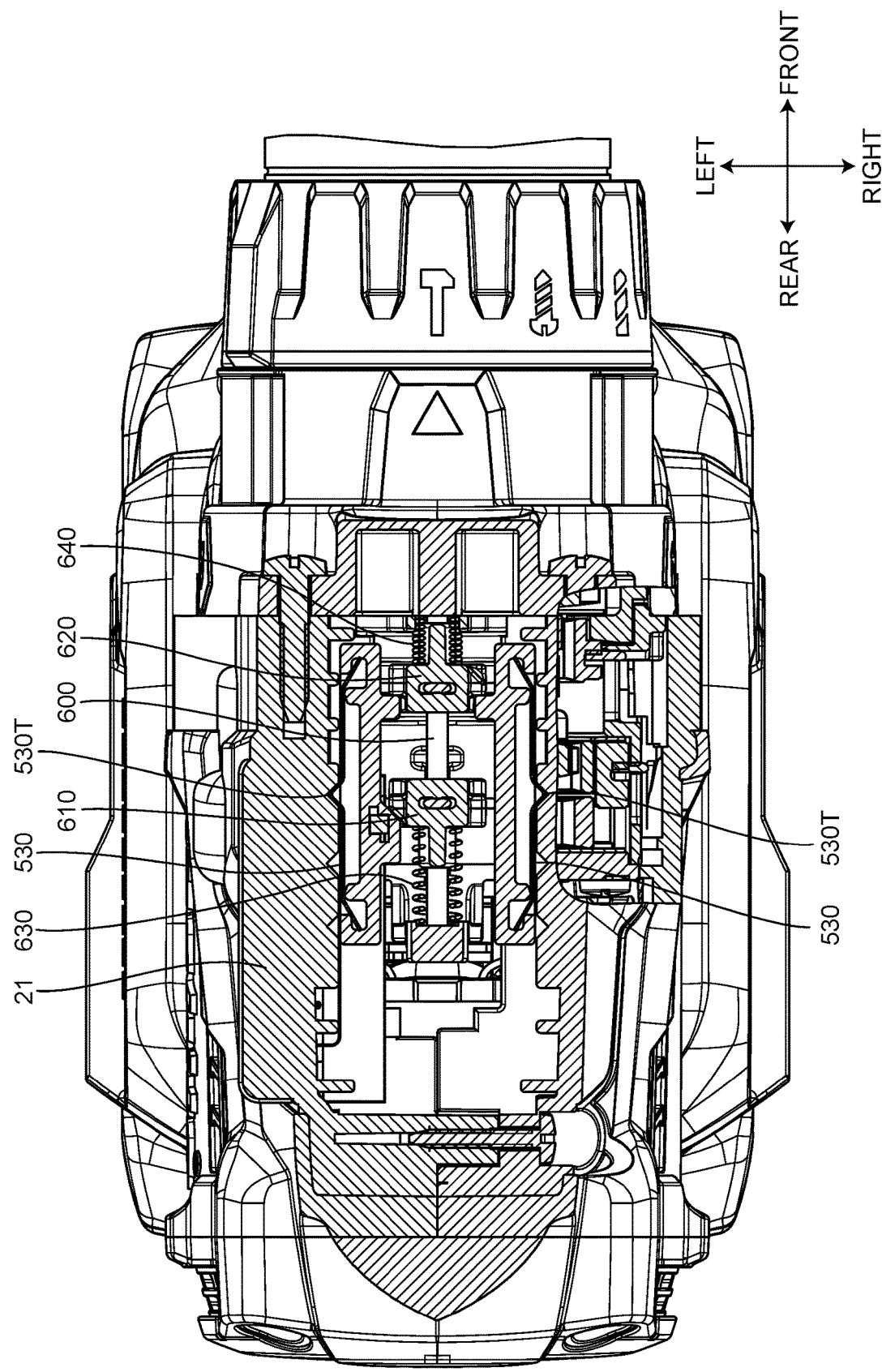
FIG. 36 is a sectional view of the driver drill when the speed reducing mechanism according to the third embodiment is set to the low speed mode (first speed)
Figure 37:
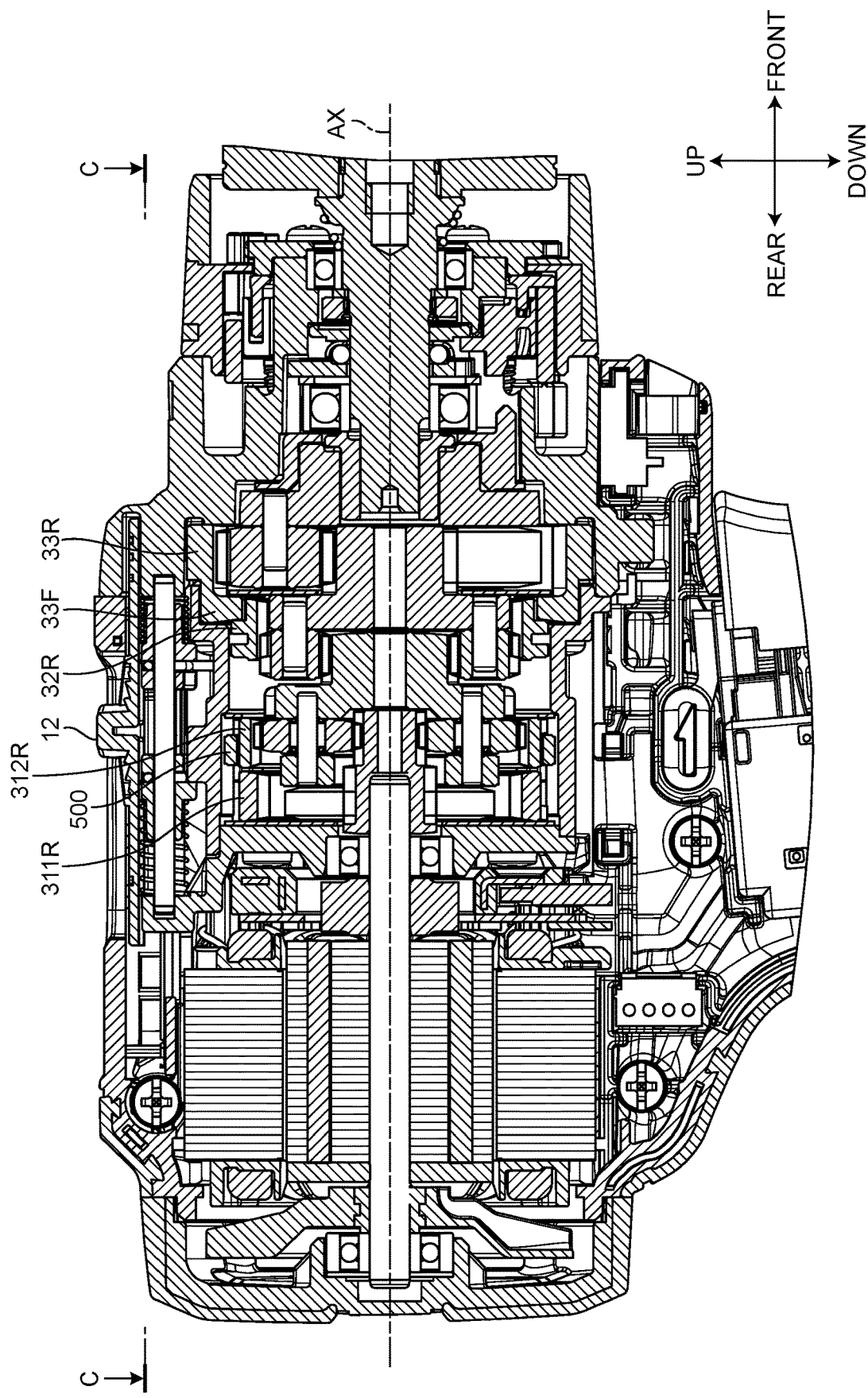
FIG. 37 is a sectional view of the driver drill when the speed reducing mechanism according to the third embodiment is set to the low speed mode (first speed)
Figure 38:
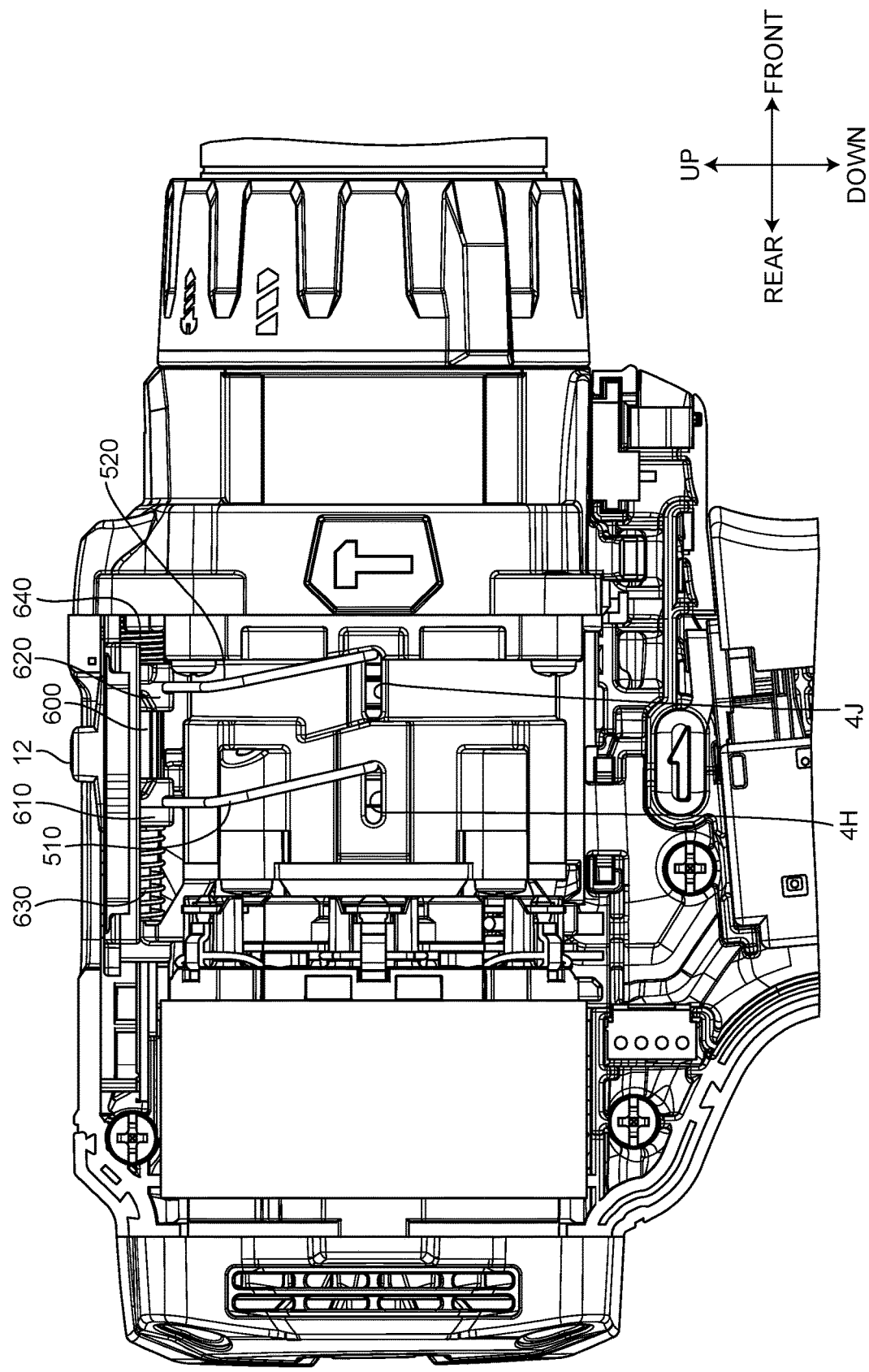
FIG. 38 is a diagram illustrating the internal structure of the driver drill when the speed reducing mechanism according to the third embodiment is set to the low speed mode (first speed)

FIG. 35 is a top view of the driver drill 1 when the speed reducing mechanism 30 according to the embodiment is set to the low speed mode (first speed). FIG. 36 is a sectional view of the driver drill 1 when the speed reducing mechanism 30 according to the embodiment is set to the low speed mode (first speed) and corresponds to a sectional view taken along line C-C of FIG. 37. FIG. 37 is a sectional view of the driver drill 1 when the speed reducing mechanism 30 according to the embodiment is set to the low speed mode (first speed) and corresponds to a sectional view taken along line P-P of FIG. 35. FIG. 38 is a diagram illustrating the internal structure of the driver drill 1 when the speed reducing mechanism 30 according to the embodiment is set to the low speed mode (first speed).

Figure 39:
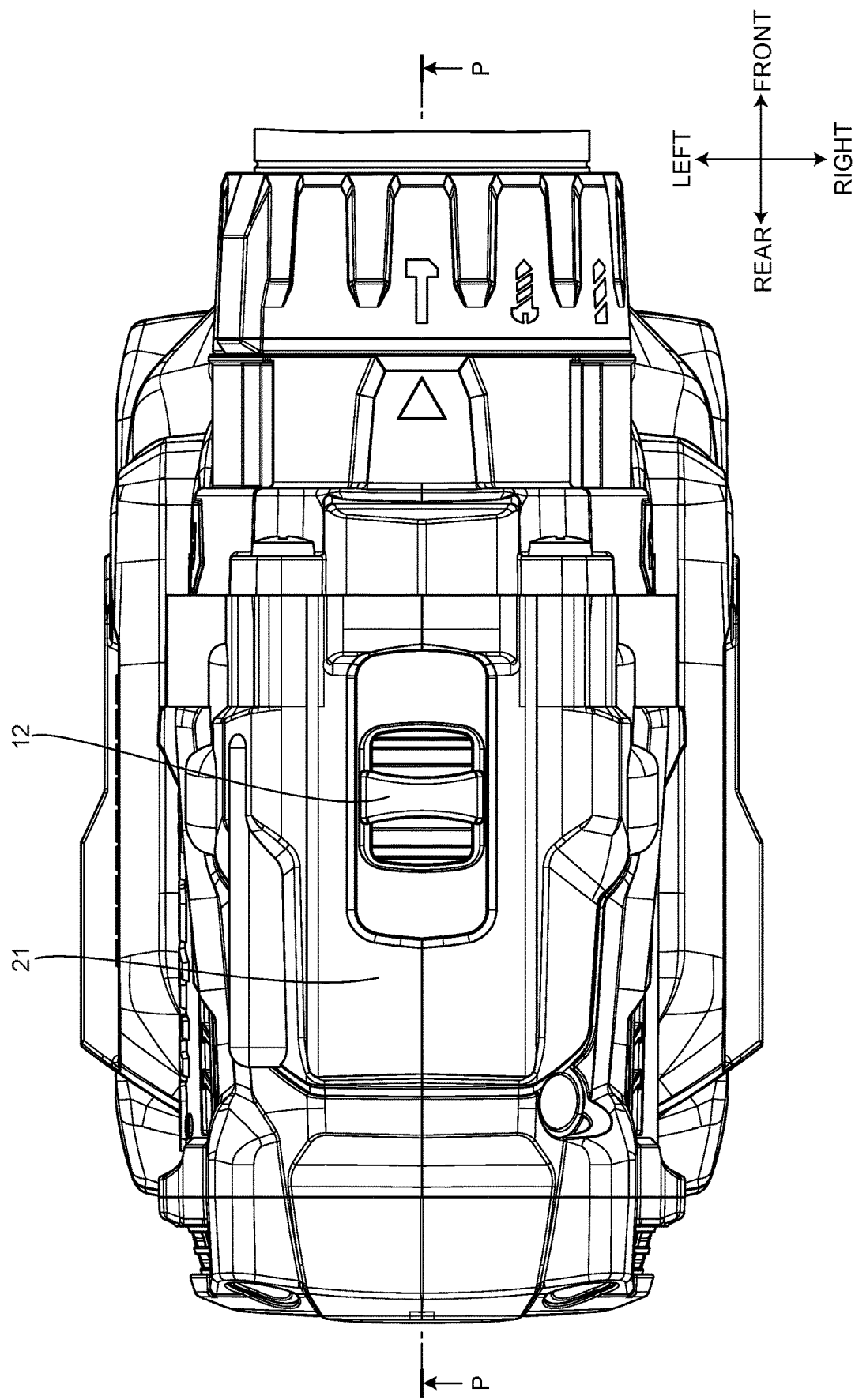
FIG. 39 is a top view of the driver drill when the speed reducing mechanism according to the third embodiment is set to a medium speed mode (second speed)
Figure 40:
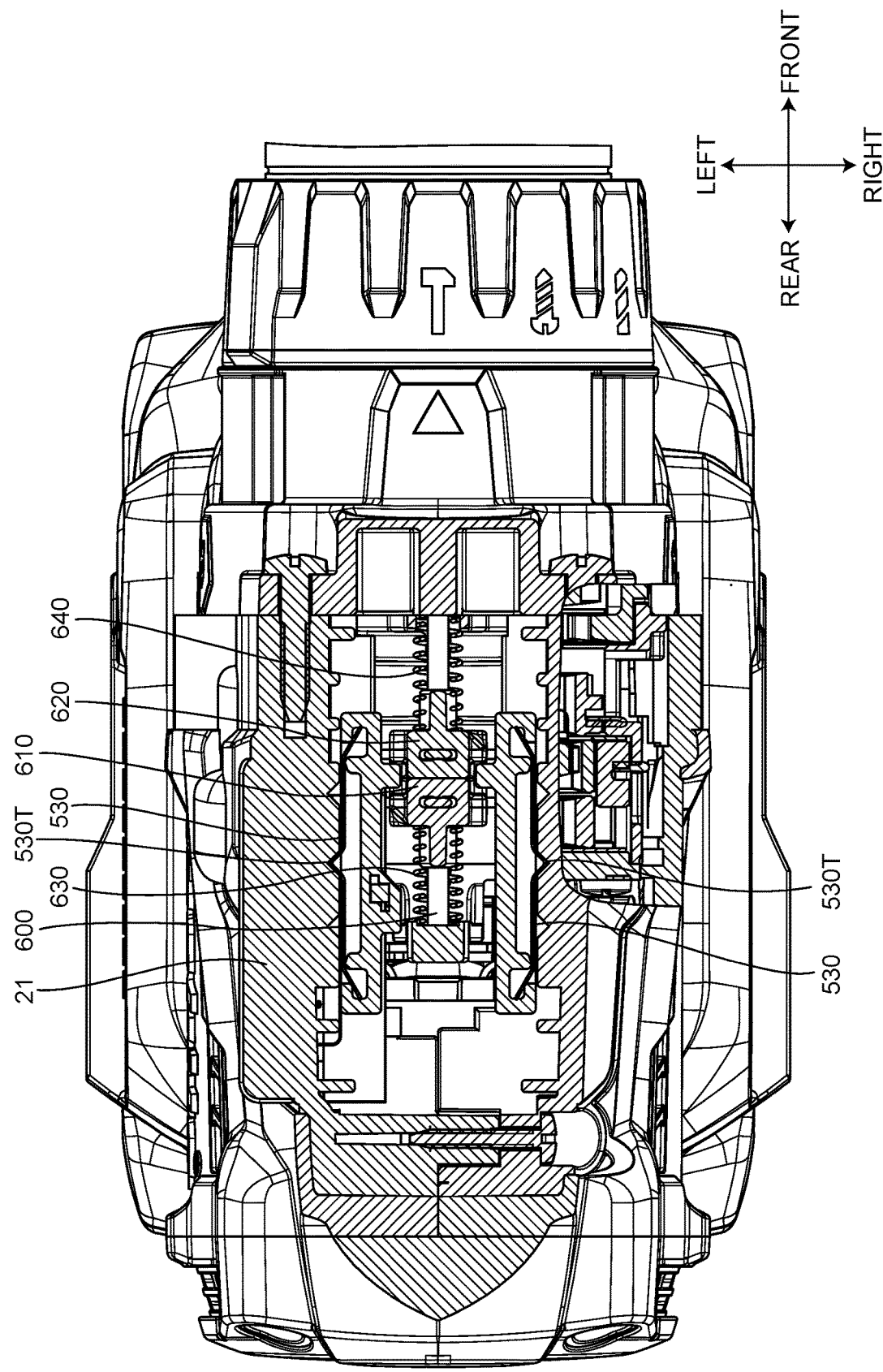
FIG. 40 is a sectional view of the driver drill when the speed reducing mechanism according to the third embodiment is set to the medium speed mode (second speed)
Figure 41:
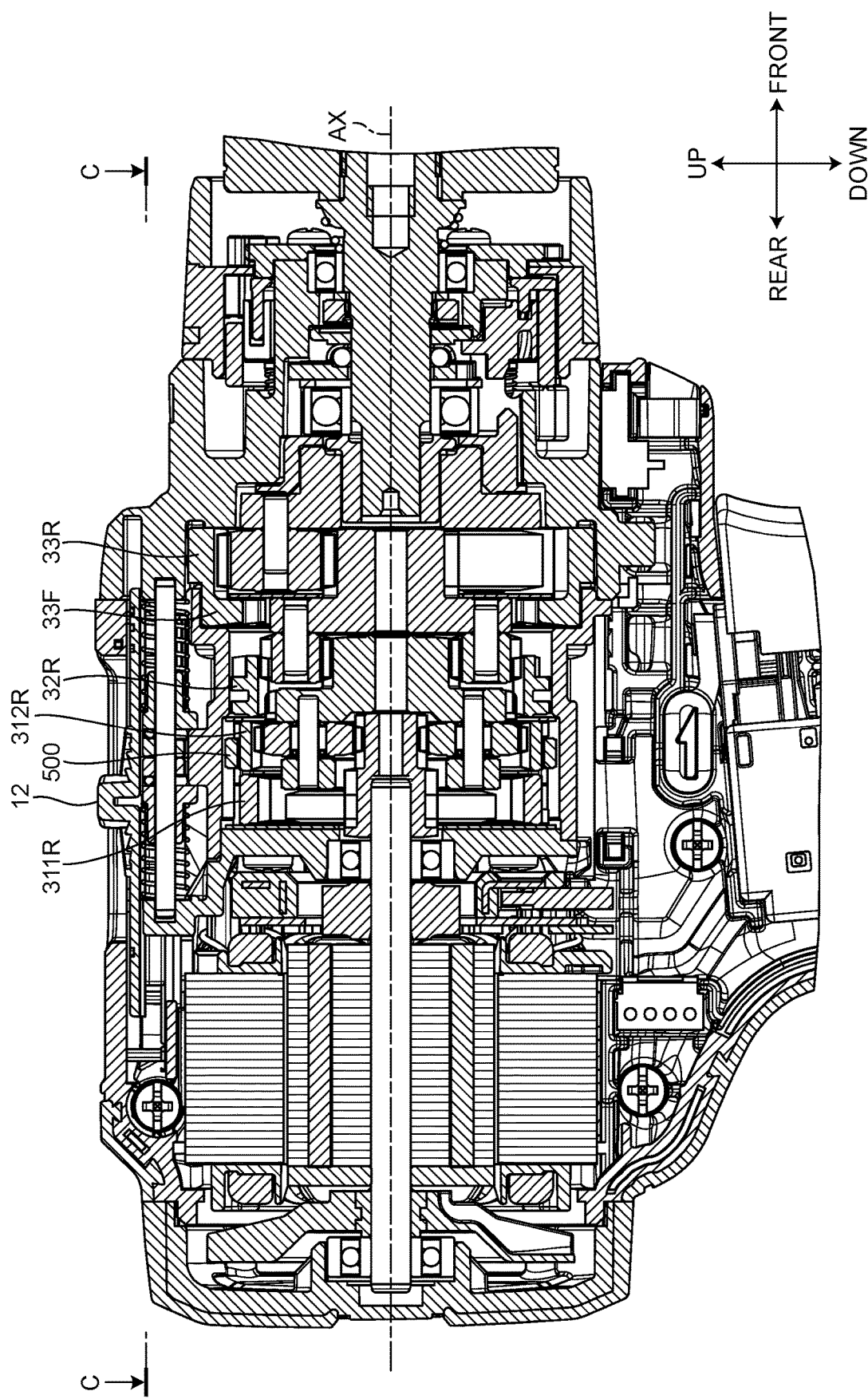
FIG. 41 is a sectional view of the driver drill when the speed reducing mechanism according to the third embodiment is set to the medium speed mode (second speed)
Figure 42:
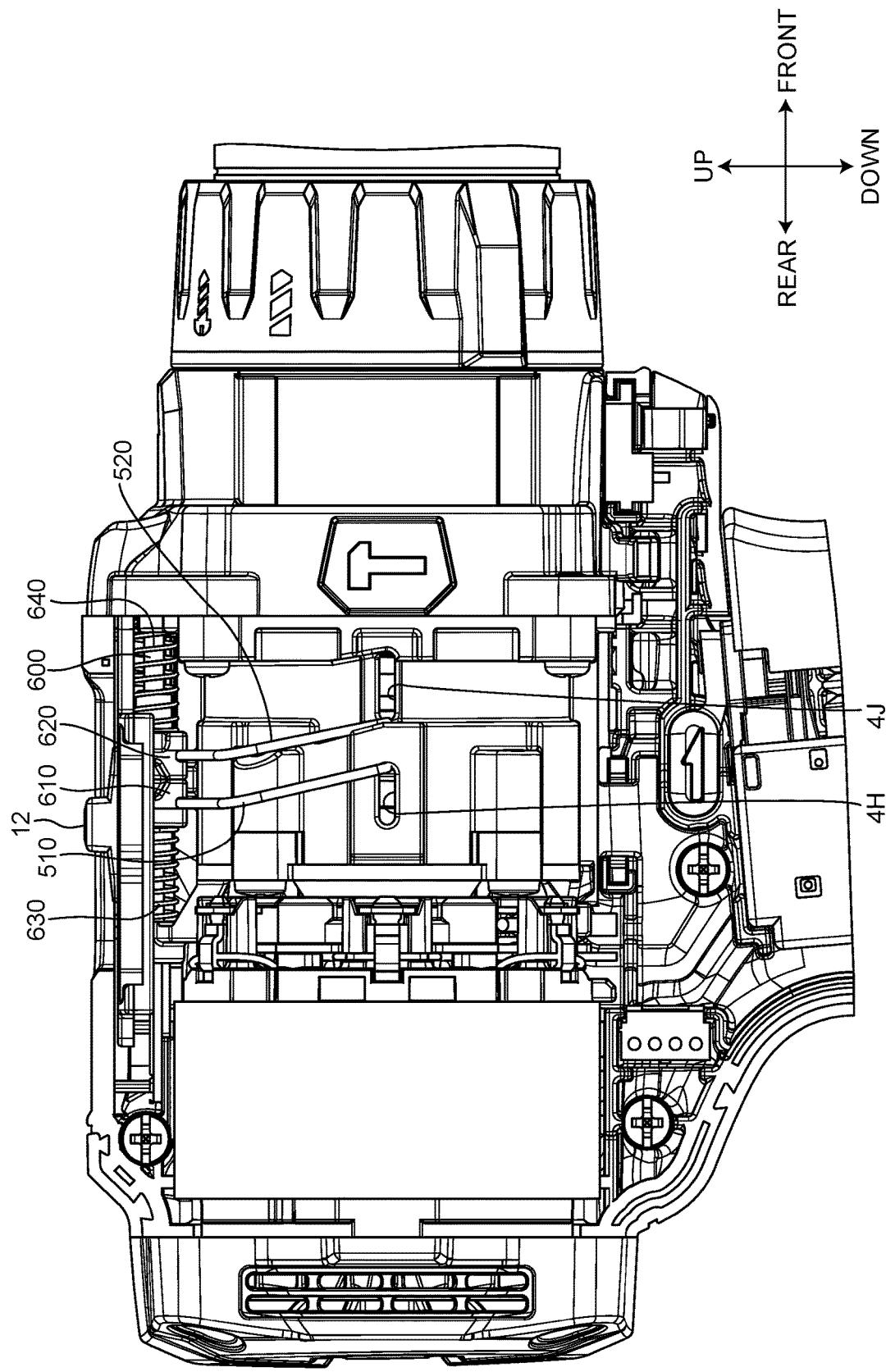
FIG. 42 is a diagram illustrating the internal structure of the driver drill when the speed reducing mechanism according to the third embodiment is set to the medium speed mode (second speed)

FIG. 39 is a top view of the driver drill 1 when the speed reducing mechanism 30 according to the embodiment is set to the medium speed mode (second speed). FIG. 40 is a sectional view of the driver drill 1 when the speed reducing mechanism 30 according to the embodiment is set to the medium speed mode (second speed) and corresponds to a sectional view taken along line C-C of FIG. 41. FIG. 41 is a sectional view of the driver drill 1 when the speed reducing mechanism 30 according to the embodiment is set to the medium speed mode (second speed) and corresponds to a sectional view taken along line P-P of FIG. 39. FIG. 42 is a diagram illustrating the internal structure of the driver drill 1 when the speed reducing mechanism 30 according to the embodiment is set to the medium speed mode (second speed).

Figure 43:
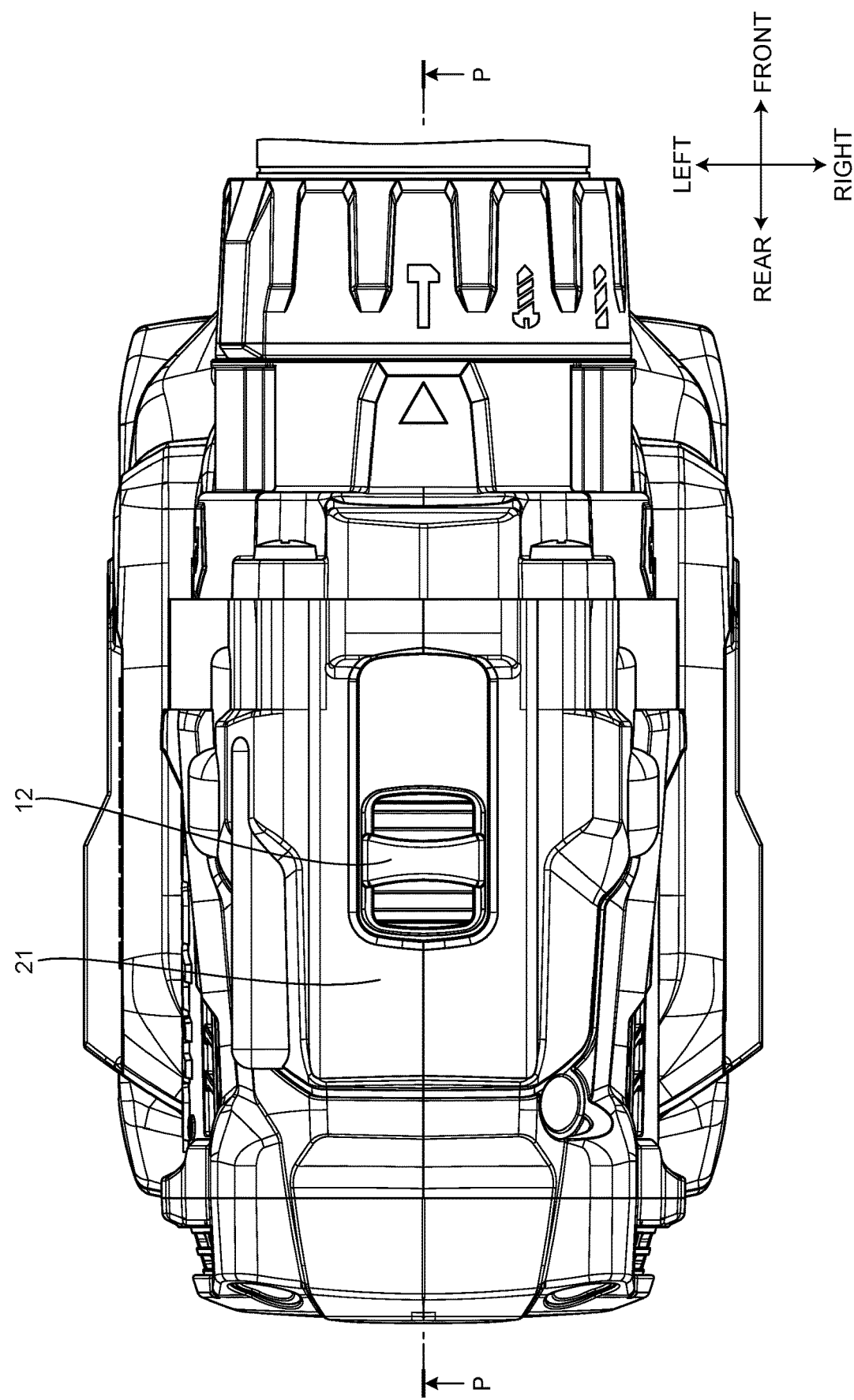
FIG. 43 is a top view of the driver drill when the speed reducing mechanism according to the third embodiment is set to a high speed mode (third speed)
Figure 44:
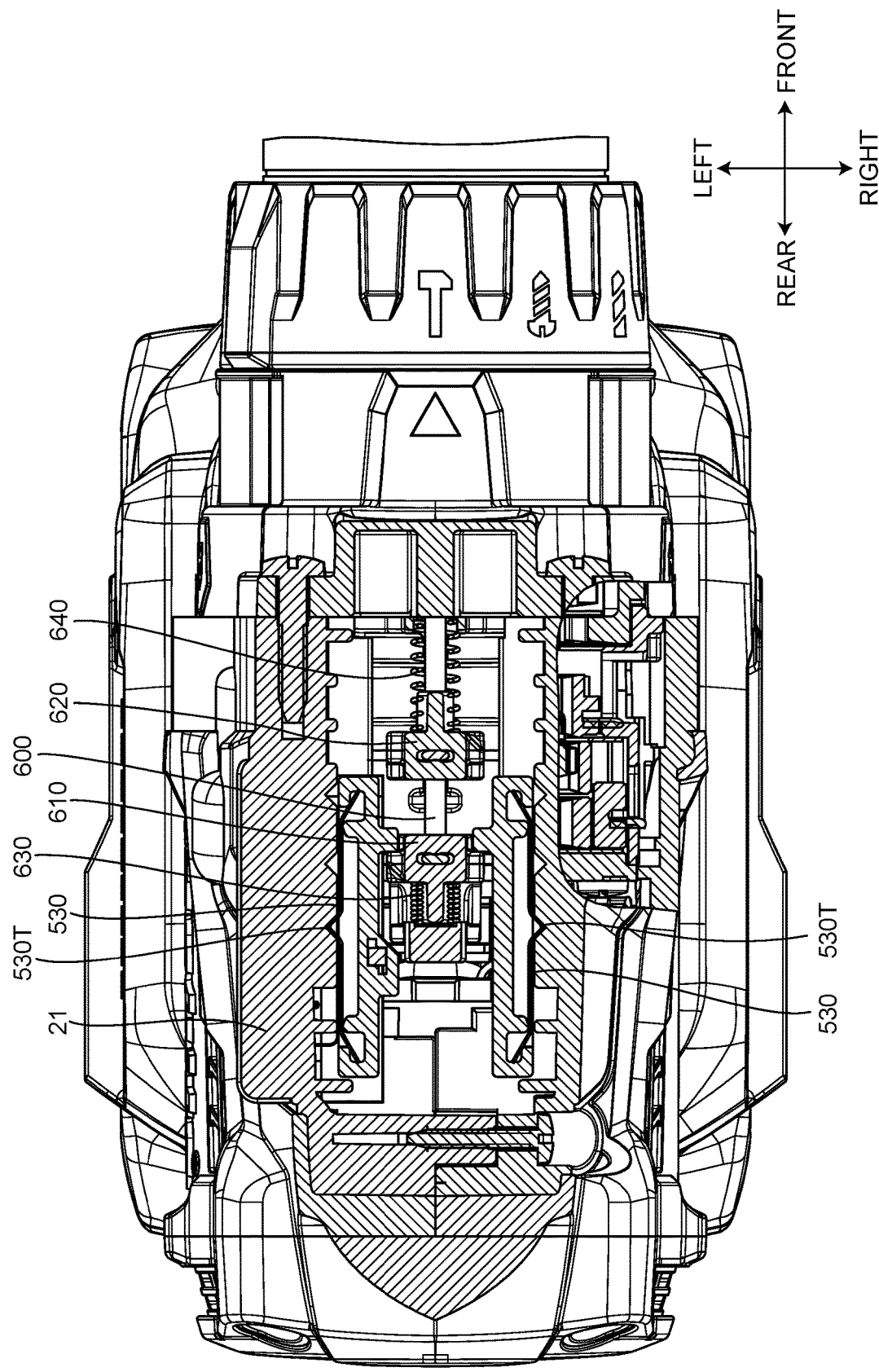
FIG. 44 is a sectional view of the driver drill when the speed reducing mechanism according to the third embodiment is set to the high speed mode (third speed)
Figure 45:
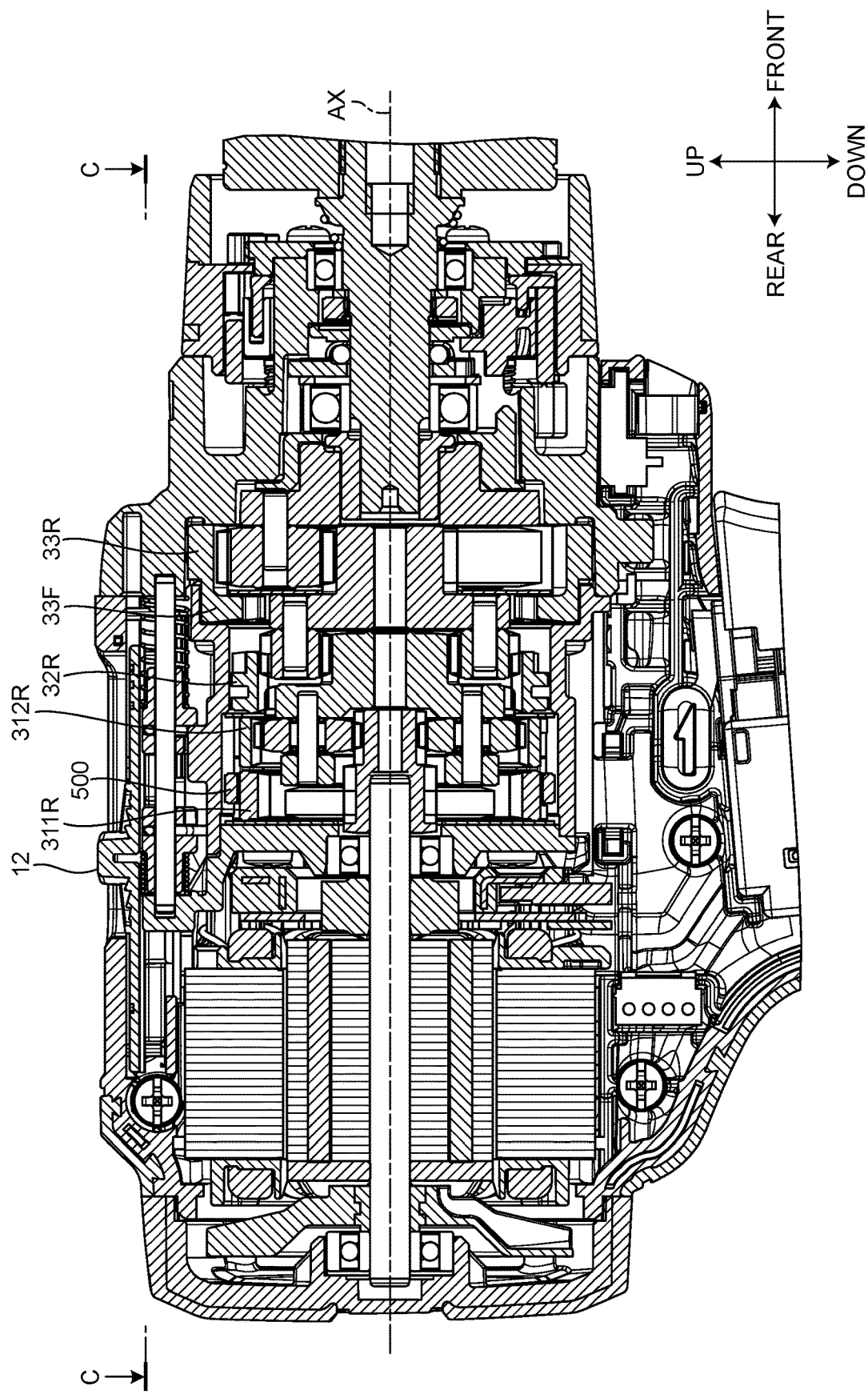
FIG. 45 is a sectional view of the driver drill when the speed reducing mechanism according to the third embodiment is set to the high speed mode (third speed)
Figure 46:
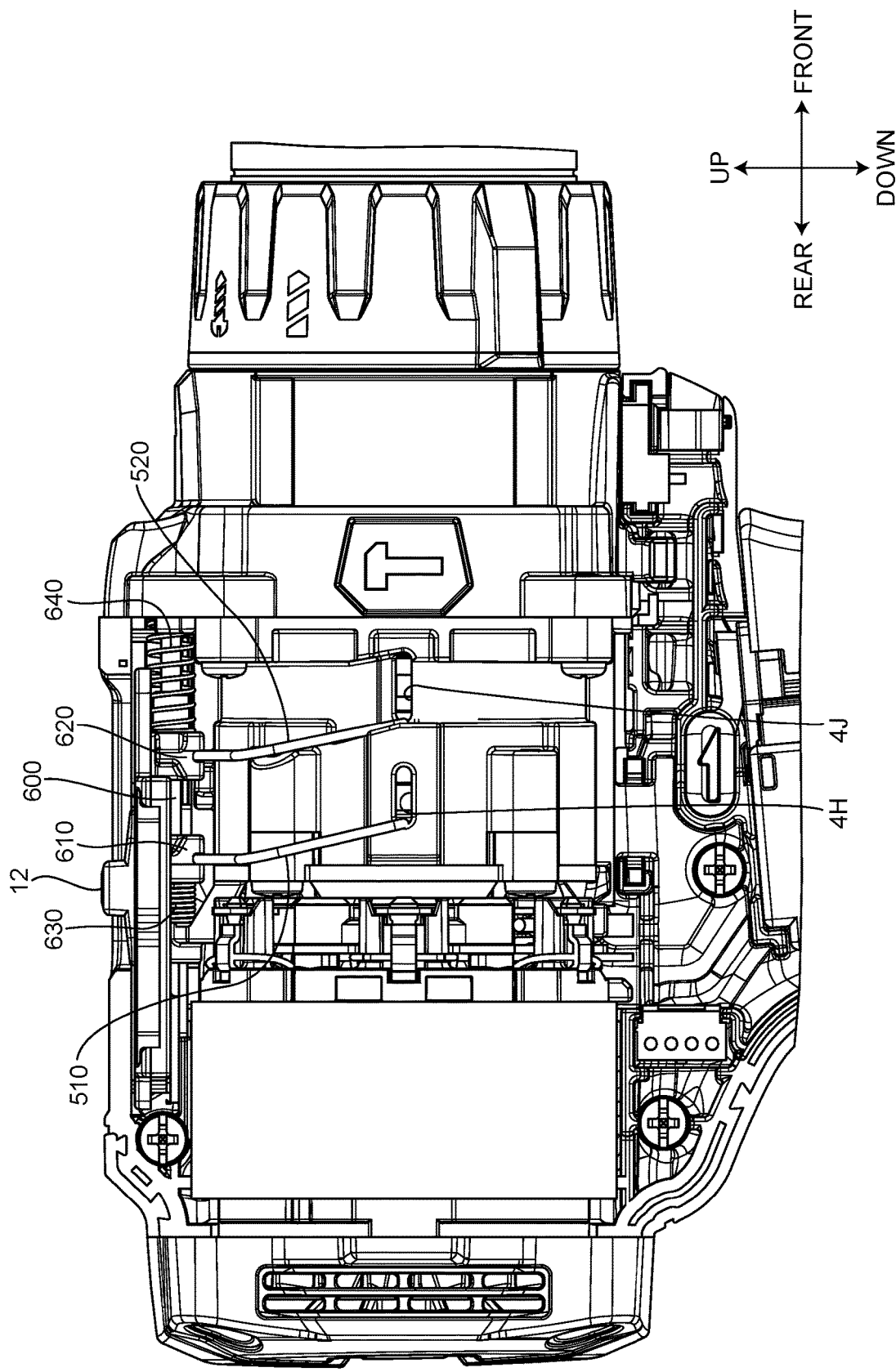
FIG. 46 is a diagram illustrating the internal structure of the driver drill when the speed reducing mechanism according to the third embodiment is set to the high speed mode (third speed).

FIG. 43 is a top view of the driver drill 1 when the speed reducing mechanism 30 according to the embodiment is set to the high speed mode (third speed). FIG. 44 is a sectional view of the driver drill 1 when the speed reducing mechanism 30 according to the embodiment is set to the high speed mode (third speed) and corresponds to a sectional view taken along line C-C of FIG. 45. FIG. 45 is a sectional view of the driver drill 1 when the speed reducing mechanism 30 according to the embodiment is set to the high speed mode (third speed) and corresponds to a sectional view taken along line P-P of FIG. 43. FIG. 46 is a diagram illustrating the internal structure of the driver drill 1 when the speed reducing mechanism 30 according to the embodiment is set to the high speed mode (third speed).

The speed switch lever 12 is operated by the operator to move the first movable member 610 in the front-rear direction. The first movable member 610 moves in the front-rear direction while being guided by the guide rod 600. The speed switch lever 12 is operated by the operator to move the second movable member 620 in the front-rear direction. The second movable member 620 moves in the front-rear direction while being guided by the guide rod 600. The first spring 630 generates an elastic force to move the first movable member 610 forward. The second spring 640 generates an elastic force to move the second movable member 620 rearward.

As illustrated in FIGS. 35, 36, 37, and 38, in switching the speed reducing mechanism 30 from the medium speed mode (second speed) to the low speed mode (first speed), the operator operates the speed switch lever 12 to be moved forward against the elastic force (biasing force) of the second spring 640. The speed switch lever 12 moving forward causes the second movable member 620 to move forward against the elastic force of the second spring 640. Leaf springs 530 are fixed to both right and left sides of the speed switch lever 12. A projection 530T of each leaf spring 530 is inserted into a recess provided on a part of the motor housing 21, which causes the speed switch lever 12 to be positioned at a first-speed position. The second movable member 620 moves to the front position in a movable range of the second movable member 620, so that the first planetary gear mechanism 31 is set to the first speed reducing mode in which the rotation of the internal gear 312R is prevented and the rotation of the internal gear 311R is allowed and the second planetary gear mechanism 32 is set to the enabled mode in which the rotation of the internal gear 32R is prevented.

As illustrated in FIGS. 43, 44, 45, and 46, in switching the speed reducing mechanism 30 from the medium speed mode (second speed) to the high speed mode (third speed), the operator operates the speed switch lever 12 to be moved rearward against the elastic force (biasing force) of the first spring 630. The speed switch lever 12 moving rearward causes the first movable member 610 to move rearward against the elastic force of the first spring 630. The leaf springs 530 are fixed to both right and left sides of the speed switch lever 12. The projection 530T of each leaf spring 530 is inserted into a recess on a part of the motor housing 21, which causes the speed switch lever 12 to be positioned at a third-speed position. The first movable member 610 moves to the rear position in a movable range of the first movable member 610, so that the first planetary gear mechanism 31 is set to the second speed reducing mode in which the rotation of the internal gear 311R is prevented and the rotation of the internal gear 312R is allowed and the second planetary gear mechanism 32 is set to the disabled mode in which the rotation of the internal gear 32R is allowed.

As illustrated in FIGS. 39, 40, 41, and 42, in switching the speed reducing mechanism 30 from the low speed mode (first speed) to the medium speed mode (second speed), the operator operates the speed switch lever 12 to be moved rearward. The speed switch lever 12 and the second movable member 620 can smoothly move rearward due to the elastic force of the second spring 640. In switching the speed reducing mechanism 30 from the high speed mode (third speed) to the medium speed mode (second speed), the operator operates the speed switch lever 12 to be moved forward. The speed switch lever 12 and the first movable member 610 can smoothly move forward due to the elastic force of the first spring 630. The first movable member 610 moves to the front position in a movable range of the first movable member 610 and the second movable member 620 moves to the rear position in a movable range of the second movable member 620, so that the first planetary gear mechanism 31 is set to the first speed reducing mode in which the rotation of the internal gear 312R is prevented and the rotation of the internal gear 311R is allowed and the second planetary gear mechanism 32 is set to the disabled mode in which the rotation of the internal gear 32R is allowed.

Other Embodiments

In the embodiments described above, the battery pack 20 mounted on the battery mount 5 is used as a power source of the driver drill 1. A commercial power supply (AC power supply) may be used as a power source of the driver drill 1.

In the embodiments described above, the electric work machine is a driver drill (vibration driver drill), which is a kind of power tool. The power tool is not limited to a driver drill. Examples of the power tool include an impact driver, an angle drill, a screw driver, a hammer, a hammer drill, a circular saw, and a reciprocating saw.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved impact tools, such as impact wrenches and impact drivers.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

EXPLANATION OF THE REFERENCE NUMBERS

1: Driver drill, 2: Housing, 2L: Left housing, 2R: Right housing, 2S: Screw, 3: Rear cover, 3S: Screw, 4: Casing, 4A: First casing, 4B: Second casing, 4C: Bracket plate, 4D: Stop plate, 4E: Screw, 4F: Screw, 4G: Guide groove, 4H: Through hole, 4J: Through hole, 4S: Screw, 5: Battery mount, 6: Motor, 7: Power transmission mechanism, 8: Output unit, 9: Fan, 10: Trigger lever, 11: Forward-reverse switch lever, 12: Speed switch lever, 13: Mode switch ring, 14: Light, 15: Interface panel, 16: Dial, 17: Controller, 18: Inlet, 19: Outlet, 20: Battery pack, 21: Motor housing, 22: Grip, 23: Battery holder, 24: Operation device, 25: Display device, 26: Controller case, 27: Panel opening, 28: Dial opening, 30: Speed reducing mechanism, 31: First planetary gear mechanism, 31A: Pin, 31C: First carrier, 31S: Pinion gear, 32: Second planetary gear mechanism, 32A: Pin, 32C: Second carrier, 32D: Recess, 32E: Groove, 32F: Cam tooth, 32P: Planetary gear, 32R: Internal gear, 32S: Sun gear, 33: Third planetary gear mechanism, 33A: Pin, 33C: Third carrier, 33F: Cam tooth, 33G: Cam tooth, 33P: Planetary gear, 33R: Internal gear, 33S: Sun gear, 34: Speed switch member, 34A: Ring portion, 34B: Slider portion, 34C: Lever portion, 34D: Pin, 34E: Projection, 34F: Coil spring, 34G: Coil spring, 35: Annular member, 36: Cam ring, 37: Lever member, 38: Guide rod, 39: Coil spring, 40: Vibration mechanism, 41: First cam, 42: Second cam, 43: Vibration switch ring, 43S: Facing portion, 43T: Projection, 44: Stop ring, 45: Support ring, 46: Steel ball, 47: Washer, 48: Cam ring, 50: Spindle lock mechanism, 51: Lock cam, 52: Lock ring, 61: Stator, 61A: Stator core, 61B: Front insulator, 61C: Rear insulator, 61D: Coil, 61E: Sensor circuit board, 61F: Short-circuit member, 62: Rotor, 62A: Rotor core, 62B: Permanent magnet, 71: First speed switch mechanism, 72: Second speed switch mechanism, 63: Rotor shaft, 64: Bearing, 65: Bearing, 81: Spindle, 81F: Flange, 81R: Screw hole, 82: Chuck, 83: Bearing, 84: Bearing, 87: Coil spring, 120: Speed switch lever, 121: Coil spring, 122: Coil spring, 123: Coil spring, 124: Rotation stop pin, 130: Mode switch ring, 150: First moving mechanism, 160: Second moving mechanism, 250: Cam pin, 250A: Groove, 300: Speed reducing mechanism, 310: First planetary gear mechanism, 310A: Pin, 310C: First carrier, 310P: Planetary gear, 310R: Internal gear, 311A: First pin, 311C: First stage carrier, 311P: Planetary gear, 312P: Planetary gear, 311R: Internal gear, 311F: Cam tooth, 312R: Internal gear, 311S: Larger-diameter portion, 312A: Second pin, 312C: Second stage carrier, 312F: Cam tooth, 312S: Smaller-diameter portion, 320: Second planetary gear mechanism, 320A: Pin, 320C: Second carrier, 320D: Recess, 320F: Cam tooth, 320P: Planetary gear, 320R: Internal gear, 320S: Sun gear, 330: Third planetary gear mechanism, 330A: Pin, 330C: Third carrier, 330P: Planetary gear, 330R: Internal gear, 330F: Cam tooth, 330S: Sun gear, 340: Speed switch member, 340A: Ring portion, 340B: Cam portion, 340D: Pin, 350: Speed switch member, 360: Cam ring, 370: Cam ring, 371: Cam surface, 371A: Cam surface, 371B: Cam surface, 372: Recess, 380: Cam ring, 381: Cam surface, 381A: Cam surface, 381B: Cam surface, 382: Recess, 390: Speed switch member, 390A: Annular plate portion, 390B: Cam portion, 400: Casing, 400A: First casing, 400B: Second casing, 400C: Bracket plate, 400D: Stop plate, 400E: Support plate, 500: Change ring, 500A: Groove, 500B: Ring portion, 500C: Projection, 510: First switch wire, 520: Second switch wire, 530: Leaf spring, 530T: Projection, 600: Guide rod, 610: First movable member, 620: Second movable member, 630: First spring, 640: Second spring, 700: Power transmission mechanism, AX: Rotation axis

What is claimed is:

1. An electric work machine comprising:
   a motor;
   a first planetary gear mechanism including:
      a first stage unit including a plurality of first planetary gears disposed around a sun gear rotated by the motor and a first internal gear disposed around the first planetary gears; and
      a second stage unit including a plurality of second planetary gears disposed around the sun gear and a second internal gear disposed around the second planetary gears, the second stage unit having a reduction ratio different from a reduction ratio of the first stage unit;
   a second planetary gear mechanism disposed forward of the first planetary gear mechanism and operated by a rotational force of the first planetary gear mechanism;
   a spindle rotated by a rotational force of the motor transmitted through the second planetary gear mechanism;
   a first speed switch mechanism configured to perform switching between a first speed reducing mode in which rotation of the second internal gear is prevented and rotation of the first internal gear is allowed and a second speed reducing mode in which the rotation of the first internal gear is prevented and the rotation of the second internal gear is allowed; and
   a second speed switch mechanism configured to perform switching between an enabled mode in which rotation of an internal gear of the second planetary gear mechanism is prevented and a disabled mode in which the rotation of the internal gear is allowed.

2. The electric work machine according to claim 1, wherein
   the sun gear has a larger-diameter portion, and a smaller-diameter portion located more forward than the larger-diameter portion,
   the first planetary gears are disposed around the larger-diameter portion, and
   the second planetary gears are disposed around the smaller-diameter portion.

3. The electric work machine according to claim 1, wherein
   the first internal gear has a cam tooth on an outer circumferential face thereof,
   the second internal gear has a cam tooth on an outer circumferential face thereof, and
   the first speed switch mechanism has a contact member coming into contact with either
   the cam tooth of the first internal gear or the cam tooth of the second internal gear.

4. The electric work machine according to claim 3, wherein
   the first internal gear and the second internal gear are each accommodated in a casing,
   the casing has a guide groove configured to guide the contact member, and
   the contact member moves, while being guided by the guide groove, to a position facing the outer circumferential face of the first internal gear and a position facing the outer circumferential face of the second internal gear.

5. The electric work machine according to claim 4, wherein
   the first speed switch mechanism includes an annular member coupled to the contact member and disposed around at least one of the first internal gear and the second internal gear, and
   the annular member moving in a front-rear direction causes the contact member to move.

6. The electric work machine according to claim 5, further comprising a speed switch lever connected to the annular member, wherein
   operating the speed switch lever to be moved in the front-rear direction causes the annular member to move.

7. The electric work machine according to claim 6, wherein
   the second speed switch mechanism includes:
      a speed switch member connected to each of the speed switch lever and the internal gear of the second planetary gear mechanism, and a cam ring configured to receive the internal gear inserted into the cam ring to prevent rotation of the internal gear, and operating the speed switch lever to be moved in the front-rear direction causes switching between a state in which the internal gear is inserted into the cam ring and a state in which the internal gear is removed from the cam ring.

8. The electric work machine according to claim 1, wherein the motor includes a stator, and a rotor including a rotor shaft and rotating relative to the stator, and the sun gear is provided on a front end portion of the rotor shaft.

9. The electric work machine according to claim 1, further comprising a third planetary gear mechanism disposed forward of the second planetary gear mechanism and operated by a rotational force of the second planetary gear mechanism, wherein the spindle is coupled to the third planetary gear mechanism.

10. The electric work machine according to claim 1, further comprising:

a casing accommodating therein the first planetary gear mechanism and the second planetary gear mechanism; and a guide rod fixed to the casing, wherein the first speed switch mechanism includes:
 a first movable member guided by the guide rod; and
 a second movable member guided by the guide rod, movement of the first movable member causes switching between the first speed reducing mode and the second speed reducing mode, and movement of the second movable member causes switching between the enabled mode and the disabled mode.

11. The electric work machine according to claim 10, comprising:

a speed switch lever configured to be operated to move the first movable member in a front-rear direction and operated to move the second movable member in the front-rear direction;

a first spring that generates an elastic force to move the first movable member forward; and a second spring that generates an elastic force to move the second movable member rearward.

12. An electric work machine comprising:

a motor;

a first planetary gear speed change mechanism including a plurality of planetary gears disposed around a sun gear rotated by the motor and an internal gear disposed around the planetary gears;

a second planetary gear speed change mechanism disposed forward of the first planetary gear speed change mechanism and operated by a rotational force of the first planetary gear speed change mechanism;

a spindle rotated by a rotational force of the motor transmitted through the second planetary gear speed change mechanism;

a casing that accommodates therein the first planetary gear speed change mechanism and the second planetary gear speed change mechanism;

a guide rod fixed to the casing;

a first movable member guided by the guide rod; and a second movable member guided by the guide rod, wherein movement of the first movable member causes switching between a first speed reducing mode and a second speed reducing mode, and movement of the second movable member causes switching between an enabled mode in which rotation of an internal gear of the second planetary gear speed change mechanism is prevented and a disabled mode in which rotation of the internal gear is allowed.

13. The electric work machine according to claim 12, comprising:

a speed switch lever configured to be operated to move the first movable member in a front-rear direction and operated to move the second movable member in the front-rear direction;

a first spring that generates an elastic force to move the first movable member in one direction; and a second spring that generates an elastic force to move the second movable member in another direction.

14. An electric driver drill comprising:

a motor including a stator, and a rotor rotatable relative to the stator;

a housing including:
 a motor housing that accommodates therein the motor;
 a grip extending downward from the motor housing; and
 a battery holder disposed on a lower portion of the grip;

a first sun gear disposed in front of the stator and directly or indirectly rotated by the rotor;

a first planetary gear meshing with the first sun gear;

a first internal gear meshing with the first planetary gear;

a second sun gear disposed in front of the first internal gear and directly or indirectly rotated by the first planetary gear;

a second planetary gear meshing with the second sun gear;

a second internal gear meshing with the second planetary gear;

a gear case disposed in front of the stator and accommodating therein the first sun gear, the first planetary gear, the first internal gear, the second sun gear, and the second planetary gear;

a spindle disposed in front of the second internal gear and directly or indirectly rotated by the second planetary gear;

a chuck fixed to a front portion of the spindle;

a first movable member capable of switching the first internal gear between a rotation-fixed state and a rotation-allowed state relative to the gear case;

a second movable member capable of switching the second internal gear between a rotation-fixed state and a rotation-allowed state relative to the gear case;

a first guide hole formed in the first movable member;

a second guide hole formed in the second movable member; and a guide rod extending through the first guide hole and the second guide hole and capable of guiding the first movable member and the second movable member in a front-rear direction.

* * * * *